(12) United States Patent
Fleizach et al.

(10) Patent No.: US 11,460,925 B2
(45) Date of Patent: Oct. 4, 2022

(54) USER INTERFACES FOR NON-VISUAL OUTPUT OF TIME

(71) Applicant: Apple Inc., Cupertino, CA (US)

(72) Inventors: Christopher B. Fleizach, Gilroy, CA (US); Giovanni M. Agnoli, San Mateo, CA (US); Kevin Will Chen, Cupertino, CA (US); Shawn Henning, Cupertino, CA (US); Stephen O. Lemay, Palo Alto, CA (US); Catherine B. B. Morrison, San Francisco, CA (US); Camille Moussette, San Francisco, CA (US); Tu Nguyen, Fountain Valley, CA (US); Matthew J. Sundstrom, Campbell, CA (US); Molly Pray Wiebe, San Francisco, CA (US); Christopher Wilson, Sonoma, CA (US); Alan C. Dye, San Francisco, CA (US); Gary Ian Butcher, Los Gatos, CA (US); Hugo Verweij, San Francisco, CA (US); Jules K. Fennis, Auburn, WA (US); Charles C. Hoyt, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/306,342

(22) Filed: May 3, 2021

(65) Prior Publication Data
US 2021/0255710 A1 Aug. 19, 2021

Related U.S. Application Data

(63) Continuation of application No. 16/814,801, filed on Mar. 10, 2020, now Pat. No. 10,996,761.
(Continued)

(51) Int. Cl.
*G06F 3/01* (2006.01)
*G06F 3/0488* (2022.01)
(Continued)

(52) U.S. Cl.
CPC ............ *G06F 3/016* (2013.01); *G04G 21/06* (2013.01); *G04G 21/08* (2013.01); *G06F 3/0488* (2013.01); *G06F 3/167* (2013.01)

(58) Field of Classification Search
CPC ........ G06F 3/016; G06F 3/0488; G06F 3/167; G04G 21/06; G04G 21/08
See application file for complete search history.

(56) References Cited

U.S. PATENT DOCUMENTS

| 4,185,283 A | 1/1980 | Clark et al. |
| 4,444,515 A | 4/1984 | Clark et al. |

(Continued)

FOREIGN PATENT DOCUMENTS

| AU | 2016231505 A1 | 10/2016 |
| AU | 2018100429 A4 | 5/2018 |

(Continued)

OTHER PUBLICATIONS

Jason Fitzpatrick, "How to Use Your Smart Watch or Fitness Tracker as a Silent Alarm Clock", published on Oct. 30, 2015 to https://www.howtogeek.com/232576/how-to-use-your-smart-watch-or-fitness-tracker-as-a-silent-alarm-clock, retrieved on Mar. 9, 2022. (Year: 2015).*

(Continued)

*Primary Examiner* — Shourjo Dasgupta
(74) *Attorney, Agent, or Firm* — Dentons US LLP

(57) ABSTRACT

The present disclosure generally relates to providing time feedback on an electronic device, and in particular to providing non-visual time feedback on the electronic device. Techniques for providing non-visual time feedback include (Continued)

detecting an input and, in response to detecting the input, initiating output of a first type of non-visual indication of a current time or a second type of non-visual indication of the current time based on the set of non-visual time output criteria met by the input. Techniques for providing non-visual time feedback also include, in response to detecting that a current time has reached a first predetermined time of a set of one or more predetermined times, outputting a first non-visual alert or a second non-visual alert based on a type of watch face that the electronic device is configured to display.

27 Claims, 25 Drawing Sheets

Related U.S. Application Data

(60) Provisional application No. 62/856,018, filed on Jun. 1, 2019.

(51) Int. Cl.
G06F 3/16 (2006.01)
G04G 21/06 (2010.01)
G04G 21/08 (2010.01)

(56) References Cited

U.S. PATENT DOCUMENTS

| | | | |
|---|---|---|---|
| 4,859,100 A | 8/1989 | Carlson et al. | |
| 5,119,079 A | 6/1992 | Hube et al. | |
| 5,204,600 A | 4/1993 | Kahkoska | |
| 5,220,260 A | 6/1993 | Schuler | |
| 5,477,508 A | 12/1995 | Will | |
| 5,488,204 A | 1/1996 | Mead et al. | |
| 5,528,260 A | 6/1996 | Kent | |
| 5,559,761 A * | 9/1996 | Frenkel | G04G 21/06 368/230 |
| 5,563,631 A | 10/1996 | Masunaga | |
| 5,689,628 A | 11/1997 | Robertson | |
| 5,754,348 A | 5/1998 | Soohoo | |
| 5,832,528 A | 11/1998 | Kwatinetz et al. | |
| 5,973,670 A | 10/1999 | Barber et al. | |
| 6,052,339 A * | 4/2000 | Frenkel | G04B 25/02 368/230 |
| 6,073,036 A | 6/2000 | Heikkinen et al. | |
| 6,088,023 A | 7/2000 | Louis et al. | |
| 6,128,007 A | 10/2000 | Seybold | |
| 6,157,381 A | 12/2000 | Bates et al. | |
| 6,192,258 B1 | 2/2001 | Kamada et al. | |
| 6,310,648 B1 | 10/2001 | Miller et al. | |
| 6,339,438 B1 | 1/2002 | Bates et al. | |
| 6,351,657 B2 | 2/2002 | Yamada | |
| 6,384,743 B1 | 5/2002 | Vanderheiden | |
| 6,411,570 B1 * | 6/2002 | Smith | G04G 13/02 368/73 |
| 6,489,951 B1 | 12/2002 | Wong et al. | |
| 6,556,222 B1 | 4/2003 | Narayanaswami | |
| 6,624,803 B1 | 9/2003 | Vanderheiden et al. | |
| 6,661,438 B1 | 12/2003 | Shiraishi et al. | |
| 6,686,911 B1 | 2/2004 | Levin et al. | |
| 6,704,034 B1 | 3/2004 | Rodriguez et al. | |
| 6,809,275 B1 | 10/2004 | Cheng et al. | |
| 6,809,724 B1 | 10/2004 | Shiraishi et al. | |
| 6,809,741 B1 | 10/2004 | Bates et al. | |
| 6,889,337 B1 | 5/2005 | Yee et al. | |
| 6,972,776 B2 | 12/2005 | Davis et al. | |
| 6,999,066 B2 | 2/2006 | Litwiller | |
| 7,020,841 B2 | 3/2006 | Dantzig et al. | |
| 7,024,625 B2 | 4/2006 | Shalit | |
| 7,030,861 B1 | 4/2006 | Westerman et al. | |
| 7,075,512 B1 | 7/2006 | Fabre et al. | |
| 7,098,896 B2 | 8/2006 | Kushler et al. | |
| 7,227,963 B1 | 6/2007 | Yamada et al. | |
| 7,250,938 B2 | 7/2007 | Kirkland et al. | |
| 7,362,312 B2 | 4/2008 | Nurmi | |
| 7,376,523 B2 | 5/2008 | Sullivan et al. | |
| 7,408,538 B2 | 8/2008 | Hinckley et al. | |
| 7,437,670 B2 | 10/2008 | Day et al. | |
| 7,479,949 B2 | 1/2009 | Jobs et al. | |
| 7,484,174 B2 | 1/2009 | Alderson et al. | |
| 7,489,303 B1 | 2/2009 | Pryor | |
| 7,552,397 B2 | 6/2009 | Holecek et al. | |
| 7,603,621 B2 | 10/2009 | Toyama et al. | |
| 7,614,008 B2 | 11/2009 | Ording | |
| 7,637,421 B1 | 12/2009 | Trocme | |
| 7,886,229 B2 | 2/2011 | Pachet | |
| 8,091,038 B1 | 1/2012 | Johnson et al. | |
| 8,132,109 B2 | 3/2012 | Bockus et al. | |
| 8,176,438 B2 | 5/2012 | Zaman et al. | |
| 8,237,666 B2 | 8/2012 | Soo et al. | |
| 8,255,836 B1 | 8/2012 | Gildfind | |
| 8,411,590 B2 | 4/2013 | Wang | |
| 8,448,095 B1 | 5/2013 | Haussila et al. | |
| 8,452,600 B2 | 5/2013 | Fleizach | |
| 8,466,873 B2 | 6/2013 | Vertegaal et al. | |
| 8,468,469 B1 | 6/2013 | Mendis et al. | |
| 8,493,344 B2 | 7/2013 | Fleizach et al. | |
| 8,522,158 B2 | 8/2013 | Beck et al. | |
| 8,656,296 B1 | 2/2014 | Ouyang et al. | |
| 8,681,106 B2 | 3/2014 | Fleizach et al. | |
| 8,717,302 B1 | 5/2014 | Qin et al. | |
| 8,739,040 B2 | 5/2014 | Graham | |
| 8,751,971 B2 | 6/2014 | Fleizach et al. | |
| 9,009,612 B2 | 4/2015 | Hudson et al. | |
| 9,262,067 B1 | 2/2016 | Bell et al. | |
| 9,423,938 B1 | 8/2016 | Morris | |
| 9,454,229 B1 | 9/2016 | Wellen | |
| 9,575,653 B2 | 2/2017 | Barkway | |
| 9,646,471 B2 | 5/2017 | Agarwal | |
| 9,678,571 B1 | 6/2017 | Robert et al. | |
| 9,823,828 B2 | 11/2017 | Zambetti et al. | |
| 9,984,539 B2 | 5/2018 | Moussette et al. | |
| 10,319,116 B1 | 6/2019 | C et al. | |
| 10,339,721 B1 | 7/2019 | Dascola et al. | |
| 10,388,325 B1 * | 8/2019 | Badash | G11B 27/34 |
| 10,417,879 B2 | 9/2019 | Moussette et al. | |
| 10,504,340 B2 | 12/2019 | Moussette et al. | |
| 10,521,507 B2 | 12/2019 | Ishii | |
| 10,977,911 B2 | 4/2021 | Moussette et al. | |
| 2001/0035884 A1 | 11/2001 | Kikinis et al. | |
| 2002/0030665 A1 | 3/2002 | Ano | |
| 2002/0046195 A1 | 4/2002 | Martin et al. | |
| 2002/0120455 A1 | 8/2002 | Nakata | |
| 2002/0126099 A1 | 9/2002 | Engholm | |
| 2002/0156807 A1 | 10/2002 | Dieberger | |
| 2002/0171689 A1 | 11/2002 | Fox et al. | |
| 2003/0025673 A1 | 2/2003 | Ledbetter et al. | |
| 2003/0046082 A1 | 3/2003 | Siegel | |
| 2003/0068088 A1 | 4/2003 | Janakiraman et al. | |
| 2003/0076301 A1 | 4/2003 | Tsuk et al. | |
| 2003/0112278 A1 | 6/2003 | Driskell | |
| 2003/0117440 A1 | 6/2003 | Hellyar et al. | |
| 2003/0142081 A1 | 7/2003 | Iizuka et al. | |
| 2003/0189598 A1 | 10/2003 | Lipstein et al. | |
| 2003/0210259 A1 | 11/2003 | Liu et al. | |
| 2003/0214519 A1 | 11/2003 | Smith et al. | |
| 2004/0042347 A1 * | 3/2004 | Born | G04G 21/08 368/69 |
| 2004/0070612 A1 | 4/2004 | Sinclair et al. | |
| 2004/0170270 A1 | 9/2004 | Takashima et al. | |
| 2004/0263491 A1 | 12/2004 | Ishigaki | |
| 2005/0001821 A1 | 1/2005 | Low et al. | |
| 2005/0047629 A1 | 3/2005 | Farrell et al. | |
| 2005/0116941 A1 | 6/2005 | Wallington et al. | |
| 2005/0168566 A1 | 8/2005 | Tada et al. | |
| 2005/0216867 A1 | 9/2005 | Marvit et al. | |
| 2005/0231489 A1 | 10/2005 | Ladouceur et al. | |
| 2006/0026521 A1 | 2/2006 | Hotelling et al. | |
| 2006/0026535 A1 | 2/2006 | Hotelling et al. | |
| 2006/0026536 A1 | 2/2006 | Hotelling et al. | |
| 2006/0028444 A1 | 2/2006 | Hinckley et al. | |

(56) References Cited

U.S. PATENT DOCUMENTS

| | | |
|---|---|---|
| 2006/0044324 A1 | 3/2006 | Shum et al. |
| 2006/0082554 A1 | 4/2006 | Caine et al. |
| 2006/0095846 A1 | 5/2006 | Nurmi |
| 2006/0119588 A1 | 6/2006 | Yoon et al. |
| 2006/0150084 A1 | 7/2006 | Dietl et al. |
| 2006/0150110 A1 | 7/2006 | Dietl et al. |
| 2006/0161861 A1 | 7/2006 | Holecek et al. |
| 2006/0267994 A1 | 11/2006 | Pfleging et al. |
| 2006/0268019 A1 | 11/2006 | Wang et al. |
| 2006/0268020 A1 | 11/2006 | Han |
| 2006/0290671 A1 | 12/2006 | Bohn et al. |
| 2007/0061755 A1 | 3/2007 | Taboada et al. |
| 2007/0070090 A1 | 3/2007 | Debettencourt et al. |
| 2007/0085841 A1 | 4/2007 | Tsuk et al. |
| 2007/0098395 A1 | 5/2007 | Battles et al. |
| 2007/0174045 A1 | 7/2007 | Kao et al. |
| 2007/0209017 A1 | 9/2007 | Gupta et al. |
| 2007/0211042 A1 | 9/2007 | Kim et al. |
| 2007/0216712 A1 | 9/2007 | Louch |
| 2007/0220444 A1 | 9/2007 | Sunday et al. |
| 2007/0226646 A1 | 9/2007 | Nagiyama et al. |
| 2007/0236475 A1 | 10/2007 | Wherry |
| 2007/0247435 A1 | 10/2007 | Benko et al. |
| 2007/0268270 A1 | 11/2007 | Onodera et al. |
| 2007/0296711 A1 | 12/2007 | Yee et al. |
| 2008/0033256 A1 | 2/2008 | Farhan et al. |
| 2008/0040692 A1 | 2/2008 | Sunday et al. |
| 2008/0055241 A1 | 3/2008 | Goldenberg et al. |
| 2008/0062141 A1 | 3/2008 | Chaudhri |
| 2008/0082909 A1 | 4/2008 | Zuverink et al. |
| 2008/0102786 A1* | 5/2008 | Griffin ............ H04L 12/66 455/404.2 |
| 2008/0120196 A1 | 5/2008 | Reed et al. |
| 2008/0122796 A1 | 5/2008 | Jobs et al. |
| 2008/0126937 A1 | 5/2008 | Pachet |
| 2008/0129520 A1 | 6/2008 | Lee |
| 2008/0130421 A1 | 6/2008 | Akaiwa et al. |
| 2008/0148177 A1 | 6/2008 | Lang et al. |
| 2008/0155461 A1 | 6/2008 | Ozaki et al. |
| 2008/0165140 A1 | 7/2008 | Christie et al. |
| 2008/0165141 A1 | 7/2008 | Christie |
| 2008/0168349 A1 | 7/2008 | Lamiraux et al. |
| 2008/0168404 A1 | 7/2008 | Ording |
| 2008/0259025 A1 | 10/2008 | Eom |
| 2008/0259040 A1 | 10/2008 | Ording et al. |
| 2008/0282173 A1 | 11/2008 | Kim et al. |
| 2009/0007026 A1 | 1/2009 | Scott et al. |
| 2009/0015550 A1 | 1/2009 | Koski et al. |
| 2009/0064031 A1 | 3/2009 | Bull et al. |
| 2009/0070711 A1 | 3/2009 | Kwak et al. |
| 2009/0125811 A1 | 5/2009 | Bethurum |
| 2009/0144654 A1 | 6/2009 | Brouwer et al. |
| 2009/0164937 A1 | 6/2009 | Alviar et al. |
| 2009/0199130 A1 | 8/2009 | Tsern et al. |
| 2009/0231271 A1 | 9/2009 | Heubel et al. |
| 2009/0235203 A1 | 9/2009 | Iizuka |
| 2009/0237372 A1 | 9/2009 | Kim et al. |
| 2009/0280907 A1 | 11/2009 | Larsen et al. |
| 2009/0288039 A1 | 11/2009 | Mail et al. |
| 2009/0289905 A1 | 11/2009 | Ahn |
| 2009/0303187 A1 | 12/2009 | Pallakoff |
| 2010/0001953 A1 | 1/2010 | Yamamoto et al. |
| 2010/0039382 A1 | 2/2010 | Kumagai et al. |
| 2010/0058240 A1 | 3/2010 | Bull et al. |
| 2010/0066694 A1 | 3/2010 | Jonsdottir |
| 2010/0073303 A1 | 3/2010 | Wu et al. |
| 2010/0107116 A1 | 4/2010 | Rieman et al. |
| 2010/0148945 A1 | 6/2010 | Yun et al. |
| 2010/0169097 A1 | 7/2010 | Nachman et al. |
| 2010/0169819 A1 | 7/2010 | Bestle et al. |
| 2010/0204979 A1 | 8/2010 | Chiu et al. |
| 2010/0222098 A1 | 9/2010 | Garg |
| 2010/0251168 A1 | 9/2010 | Fujita et al. |
| 2010/0259500 A1 | 10/2010 | Kennedy |
| 2010/0269038 A1 | 10/2010 | Tsuda |
| 2010/0283742 A1 | 11/2010 | Lam |
| 2010/0289757 A1 | 11/2010 | Budelli |
| 2010/0295793 A1 | 11/2010 | Srinivasan et al. |
| 2010/0309147 A1 | 12/2010 | Fleizach et al. |
| 2010/0309148 A1 | 12/2010 | Fleizach et al. |
| 2010/0313125 A1 | 12/2010 | Fleizach et al. |
| 2010/0325575 A1 | 12/2010 | Platzer et al. |
| 2011/0074699 A1 | 3/2011 | Marr et al. |
| 2011/0074828 A1 | 3/2011 | Capela et al. |
| 2011/0081889 A1 | 4/2011 | Gao et al. |
| 2011/0083104 A1 | 4/2011 | Minton |
| 2011/0087982 A1 | 4/2011 | Mccann et al. |
| 2011/0099509 A1 | 4/2011 | Horagai et al. |
| 2011/0102455 A1 | 5/2011 | Temple |
| 2011/0126139 A1 | 5/2011 | Jeong et al. |
| 2011/0157046 A1 | 6/2011 | Lee et al. |
| 2011/0164042 A1 | 7/2011 | Chaudhri |
| 2011/0167350 A1 | 7/2011 | Hoellwarth |
| 2011/0197160 A1 | 8/2011 | Kim et al. |
| 2011/0199342 A1 | 8/2011 | Vartanian et al. |
| 2011/0209104 A1 | 8/2011 | Hinckley et al. |
| 2011/0210834 A1 | 9/2011 | Pasquero et al. |
| 2011/0210926 A1 | 9/2011 | Pasquero et al. |
| 2011/0235469 A1* | 9/2011 | Irwin ............ G04G 13/02 368/12 |
| 2011/0252357 A1 | 10/2011 | Chaudhri |
| 2011/0252362 A1 | 10/2011 | Cho et al. |
| 2011/0252369 A1 | 10/2011 | Chaudhri |
| 2011/0271233 A1 | 11/2011 | Radakovitz et al. |
| 2011/0291945 A1 | 12/2011 | Ewing et al. |
| 2011/0298723 A1 | 12/2011 | Fleizach et al. |
| 2011/0300915 A1 | 12/2011 | Stoustrup et al. |
| 2011/0302519 A1 | 12/2011 | Fleizach et al. |
| 2011/0314414 A1 | 12/2011 | Stringer et al. |
| 2012/0011437 A1 | 1/2012 | James et al. |
| 2012/0038582 A1 | 2/2012 | Grant |
| 2012/0054670 A1 | 3/2012 | Rainisto |
| 2012/0066638 A1 | 3/2012 | Ohri et al. |
| 2012/0084689 A1 | 4/2012 | Ledet et al. |
| 2012/0092383 A1 | 4/2012 | Hysek et al. |
| 2012/0127071 A1 | 5/2012 | Jitkoff et al. |
| 2012/0131495 A1 | 5/2012 | Goossens et al. |
| 2012/0131504 A1 | 5/2012 | Fadell et al. |
| 2012/0142414 A1 | 6/2012 | Murakami |
| 2012/0174005 A1 | 7/2012 | Deutsch et al. |
| 2012/0218205 A1 | 8/2012 | Park |
| 2012/0242584 A1 | 9/2012 | Tuli et al. |
| 2012/0286944 A1 | 11/2012 | Forutanpour et al. |
| 2012/0293311 A1 | 11/2012 | Pasquero et al. |
| 2012/0304113 A1 | 11/2012 | Patten et al. |
| 2012/0307603 A1 | 12/2012 | Bongio et al. |
| 2012/0327009 A1 | 12/2012 | Fleizach |
| 2013/0031507 A1 | 1/2013 | George |
| 2013/0031514 A1 | 1/2013 | Gabbert |
| 2013/0036005 A1 | 2/2013 | Rappe |
| 2013/0063389 A1 | 3/2013 | Moore et al. |
| 2013/0097556 A1 | 4/2013 | Louch et al. |
| 2013/0104039 A1 | 4/2013 | Ormin et al. |
| 2013/0111396 A1 | 5/2013 | Brid |
| 2013/0120295 A1 | 5/2013 | Kim et al. |
| 2013/0145292 A1 | 6/2013 | Cohen et al. |
| 2013/0149674 A1 | 6/2013 | Anderson et al. |
| 2013/0191910 A1 | 7/2013 | Dellinger et al. |
| 2013/0191911 A1 | 7/2013 | Dellinger et al. |
| 2013/0222301 A1 | 8/2013 | Lee et al. |
| 2013/0227419 A1 | 8/2013 | Lee et al. |
| 2013/0254708 A1 | 9/2013 | Dorcey |
| 2013/0303191 A1 | 11/2013 | Pasquero et al. |
| 2013/0305184 A1 | 11/2013 | Kim et al. |
| 2013/0307603 A1 | 11/2013 | Koester |
| 2013/0311921 A1 | 11/2013 | Fleizach et al. |
| 2013/0318437 A1 | 11/2013 | Jung et al. |
| 2013/0332827 A1 | 12/2013 | Smith |
| 2014/0026097 A1 | 1/2014 | Crohas et al. |
| 2014/0058733 A1 | 2/2014 | Voorhees et al. |
| 2014/0063071 A1 | 3/2014 | Leventhal et al. |
| 2014/0092037 A1 | 4/2014 | Kim |
| 2014/0108936 A1 | 4/2014 | Khosropour et al. |
| 2014/0111415 A1 | 4/2014 | Gargi et al. |

(56) References Cited

U.S. PATENT DOCUMENTS

| | | |
|---|---|---|
| 2014/0118127 A1 | 5/2014 | Levesque et al. |
| 2014/0139422 A1 | 5/2014 | Mistry et al. |
| 2014/0143678 A1 | 5/2014 | Mistry et al. |
| 2014/0143737 A1 | 5/2014 | Mistry et al. |
| 2014/0164966 A1 | 6/2014 | Kim et al. |
| 2014/0192626 A1 | 7/2014 | Wolff et al. |
| 2014/0222916 A1 | 8/2014 | Foley et al. |
| 2014/0258935 A1 | 9/2014 | Nishida et al. |
| 2014/0282142 A1 | 9/2014 | Lin |
| 2014/0282214 A1 | 9/2014 | Shirzadi et al. |
| 2014/0292668 A1 | 10/2014 | Fricklas et al. |
| 2014/0298233 A1 | 10/2014 | Pettey et al. |
| 2014/0304389 A1 | 10/2014 | Reavis |
| 2014/0362105 A1 | 12/2014 | Kocienda et al. |
| 2014/0365977 A1 | 12/2014 | Elyada et al. |
| 2015/0007025 A1 | 1/2015 | Sassi et al. |
| 2015/0009784 A1 | 1/2015 | Cho et al. |
| 2015/0011204 A1 | 1/2015 | Seo et al. |
| 2015/0041289 A1 | 2/2015 | Ely et al. |
| 2015/0058723 A1 | 2/2015 | Cieplinski et al. |
| 2015/0067495 A1 | 3/2015 | Bernstein et al. |
| 2015/0067497 A1 | 3/2015 | Cieplinski et al. |
| 2015/0067513 A1 | 3/2015 | Zambetti et al. |
| 2015/0074615 A1 | 3/2015 | Han et al. |
| 2015/0082162 A1 | 3/2015 | Cho et al. |
| 2015/0149899 A1 | 5/2015 | Bernstein et al. |
| 2015/0149956 A1 | 5/2015 | Kempinski et al. |
| 2015/0169062 A1 | 6/2015 | Park et al. |
| 2015/0172438 A1* | 6/2015 | Yang .................. G06F 1/163 |
| | | 455/419 |
| 2015/0185845 A1 | 7/2015 | Nagara et al. |
| 2015/0193099 A1 | 7/2015 | Murphy |
| 2015/0193951 A1 | 7/2015 | Lee et al. |
| 2015/0205476 A1 | 7/2015 | Kuscher et al. |
| 2015/0205515 A1 | 7/2015 | Eldawy |
| 2015/0248781 A1 | 9/2015 | Zimmer et al. |
| 2015/0277563 A1 | 10/2015 | Huang et al. |
| 2015/0293592 A1* | 10/2015 | Cheong .................. G06F 1/163 |
| | | 345/173 |
| 2015/0339018 A1 | 11/2015 | Moon et al. |
| 2015/0370425 A1 | 12/2015 | Chen et al. |
| 2015/0370529 A1 | 12/2015 | Zambetti et al. |
| 2015/0378447 A1 | 12/2015 | Nagano et al. |
| 2016/0004393 A1 | 1/2016 | Faaborg et al. |
| 2016/0034133 A1 | 2/2016 | Wilson et al. |
| 2016/0034148 A1 | 2/2016 | Wilson et al. |
| 2016/0034152 A1 | 2/2016 | Wilson et al. |
| 2016/0062573 A1 | 3/2016 | Dascola et al. |
| 2016/0063850 A1 | 3/2016 | Yang et al. |
| 2016/0070433 A1 | 3/2016 | Fleizach et al. |
| 2016/0071241 A1 | 3/2016 | Anzures et al. |
| 2016/0091971 A1 | 3/2016 | Burr |
| 2016/0109936 A1* | 4/2016 | Lee .................. H04B 1/3888 |
| | | 345/156 |
| 2016/0170624 A1 | 6/2016 | Zambetti et al. |
| 2016/0170625 A1 | 6/2016 | Zambetti et al. |
| 2016/0231883 A1 | 8/2016 | Zambetti |
| 2016/0259499 A1 | 9/2016 | Kocienda et al. |
| 2016/0259535 A1 | 9/2016 | Seymour et al. |
| 2016/0283094 A1* | 9/2016 | Choi .................. G06F 3/04842 |
| 2016/0299912 A1 | 10/2016 | Acuna et al. |
| 2016/0327911 A1 | 11/2016 | Eim et al. |
| 2016/0349970 A1 | 12/2016 | Everitt et al. |
| 2016/0357368 A1 | 12/2016 | Federighi et al. |
| 2017/0053542 A1 | 2/2017 | Wilson et al. |
| 2017/0160914 A1 | 6/2017 | Niranjani et al. |
| 2017/0220005 A1* | 8/2017 | Han .................. G06F 3/01 |
| 2017/0242933 A1 | 8/2017 | Liu |
| 2017/0315716 A1 | 11/2017 | Zambetti et al. |
| 2017/0357317 A1 | 12/2017 | Chaudhri et al. |
| 2017/0357318 A1 | 12/2017 | Chaudhri et al. |
| 2017/0357319 A1 | 12/2017 | Chaudhri et al. |
| 2017/0357320 A1 | 12/2017 | Chaudhri et al. |
| 2017/0357321 A1 | 12/2017 | Fleizach et al. |
| 2017/0357427 A1 | 12/2017 | Wilson et al. |
| 2017/0358181 A1 | 12/2017 | Moussette et al. |
| 2018/0067557 A1 | 3/2018 | Robert et al. |
| 2018/0074690 A1 | 3/2018 | Zambetti et al. |
| 2018/0074693 A1 | 3/2018 | Jones et al. |
| 2018/0088532 A1 | 3/2018 | Ely et al. |
| 2018/0088797 A1 | 3/2018 | Mcatee et al. |
| 2018/0113600 A1 | 4/2018 | Seymour et al. |
| 2018/0164973 A1* | 6/2018 | Kim .................. G06F 1/16 |
| 2018/0181261 A1 | 6/2018 | Saurabh |
| 2018/0204425 A1 | 7/2018 | Moussette et al. |
| 2018/0210516 A1 | 7/2018 | Zambetti et al. |
| 2018/0329587 A1 | 11/2018 | Ko et al. |
| 2018/0335901 A1 | 11/2018 | Manzari et al. |
| 2018/0336866 A1 | 11/2018 | Triverio et al. |
| 2018/0369691 A1 | 12/2018 | Rihn et al. |
| 2019/0033862 A1 | 1/2019 | Groden et al. |
| 2019/0050055 A1 | 2/2019 | Chaudhri et al. |
| 2019/0065023 A1 | 2/2019 | Fleizach et al. |
| 2019/0080066 A1 | 3/2019 | Van Os et al. |
| 2019/0080072 A1 | 3/2019 | Van Os et al. |
| 2019/0121300 A1* | 4/2019 | Peterson .................. G04G 99/006 |
| 2019/0212885 A1 | 7/2019 | Zambetti et al. |
| 2019/0253619 A1 | 8/2019 | Davydov et al. |
| 2019/0272036 A1 | 9/2019 | Grant et al. |
| 2019/0274565 A1 | 9/2019 | Soli et al. |
| 2019/0279520 A1 | 9/2019 | Wilson et al. |
| 2019/0332173 A1* | 10/2019 | Wellen .................. G04G 9/0082 |
| 2019/0342622 A1 | 11/2019 | Carrigan et al. |
| 2019/0369755 A1 | 12/2019 | Roper et al. |
| 2019/0369838 A1 | 12/2019 | Josephson et al. |
| 2019/0377778 A1 | 12/2019 | Tran |
| 2020/0050332 A1 | 2/2020 | Yang et al. |
| 2020/0081538 A1 | 3/2020 | Moussette et al. |
| 2020/0081539 A1 | 3/2020 | Moussette et al. |
| 2020/0081598 A1 | 3/2020 | Fleizach et al. |
| 2020/0201898 A1 | 6/2020 | Esponda |
| 2020/0241477 A1* | 7/2020 | Wellen .................. G06F 3/016 |
| 2020/0241643 A1 | 7/2020 | Kim et al. |
| 2020/0341553 A1 | 10/2020 | Moussette et al. |
| 2020/0368616 A1 | 11/2020 | Delamont |
| 2020/0379565 A1 | 12/2020 | Fleizach et al. |
| 2020/0379635 A1 | 12/2020 | Hughes et al. |

FOREIGN PATENT DOCUMENTS

| | | | |
|---|---|---|---|
| AU | 2018100429 B4 | | 8/2018 |
| CN | 1398366 A | | 2/2003 |
| CN | 101192047 A | | 6/2008 |
| CN | 102591579 A | | 7/2012 |
| CN | 102859482 A | | 1/2013 |
| CN | 101034328 B | | 2/2013 |
| CN | 102917137 A | * | 2/2013 |
| CN | 103154878 A | | 6/2013 |
| CN | 103270486 A | | 8/2013 |
| CN | 103703437 A | | 4/2014 |
| CN | 103858088 A | | 6/2014 |
| CN | 103970413 A | | 8/2014 |
| CN | 104866337 A | * | 8/2015 |
| CN | 104869231 A | * | 8/2015 |
| CN | 105872228 A | * | 8/2016 |
| CN | 105955591 A | | 9/2016 |
| CN | 107710135 A | | 2/2018 |
| CN | 107797657 A | | 3/2018 |
| CN | 108139863 A | | 6/2018 |
| CN | 108304106 A | | 7/2018 |
| CN | 108334190 A | | 7/2018 |
| CN | 108369455 A | | 8/2018 |
| EP | 1168149 A2 | | 1/2002 |
| EP | 1505484 A1 | | 2/2005 |
| EP | 1832969 A2 | | 9/2007 |
| EP | 2124131 A2 | | 11/2009 |
| EP | 2207084 A2 | | 7/2010 |
| EP | 2302492 A2 | | 3/2011 |
| EP | 2385451 A1 | | 11/2011 |
| EP | 3401770 A1 | | 11/2018 |
| GB | 2392773 A | | 3/2004 |
| JP | 63-271516 A | | 11/1988 |
| JP | 1-283621 A | | 11/1989 |
| JP | 2-244214 A | | 9/1990 |

(56) References Cited

FOREIGN PATENT DOCUMENTS

| | | |
|---|---|---|
| JP | 5-88812 A | 4/1993 |
| JP | 6-348408 A | 12/1994 |
| JP | 7-152478 A | 6/1995 |
| JP | 8-83156 A | 3/1996 |
| JP | 11-110106 A | 4/1999 |
| JP | 2000-503153 A | 3/2000 |
| JP | 2001-100905 A | 4/2001 |
| JP | 2001-147775 A | 5/2001 |
| JP | 2001-202178 A | 7/2001 |
| JP | 2001-202181 A | 7/2001 |
| JP | 2003-256911 A | 9/2003 |
| JP | 2003-316254 A | 11/2003 |
| JP | 2003-330856 A | 11/2003 |
| JP | 2004-259063 A | 9/2004 |
| JP | 2005-4891 A | 1/2005 |
| JP | 2005-10894 A | 1/2005 |
| JP | 2005196077 A | 7/2005 |
| JP | 2006-11690 A | 1/2006 |
| JP | 2006-501567 A | 1/2006 |
| JP | 2006-134090 A | 5/2006 |
| JP | 2007-156983 A | 6/2007 |
| JP | 2008-508600 A | 3/2008 |
| JP | 2008-97057 A | 4/2008 |
| JP | 2008-518539 A | 5/2008 |
| JP | 2008-139163 A | 6/2008 |
| JP | 2008-157974 A | 7/2008 |
| JP | 2008-539513 A | 11/2008 |
| JP | 2009-510404 A | 3/2009 |
| JP | 2009-93291 A | 4/2009 |
| JP | 2009-294526 A | 12/2009 |
| JP | 2010-257051 A | 11/2010 |
| JP | 2011-530738 A | 12/2011 |
| JP | 2012-115519 A | 6/2012 |
| JP | 2013-122738 A | 6/2013 |
| JP | 2014-42164 A | 3/2014 |
| JP | 2016-538653 A | 12/2016 |
| JP | 2017-500656 A | 1/2017 |
| JP | 2017-516163 A | 6/2017 |
| JP | 2018-508076 A | 3/2018 |
| JP | 2018-508900 A | 3/2018 |
| KR | 10-2004-0107472 A | 12/2004 |
| KR | 10-2005-0051638 A | 6/2005 |
| KR | 10-2008-0095085 A | 10/2008 |
| KR | 10-2009-0040462 A | 4/2009 |
| KR | 10-2009-0056469 A | 6/2009 |
| KR | 10-2010-0109277 A | 10/2010 |
| KR | 10-2011-0114294 A | 10/2011 |
| KR | 10-2012-0079707 A | 7/2012 |
| KR | 2017030980 A * | 3/2017 ............ G06F 3/016 |
| TW | I244040 B | 11/2005 |
| TW | I305518 B | 1/2009 |
| TW | 201349078 A | 12/2013 |
| WO | 92/08183 A1 | 5/1992 |
| WO | 93/08517 A1 | 4/1993 |
| WO | 01/69369 A1 | 9/2001 |
| WO | 2004/031937 A1 | 4/2004 |
| WO | 2006/020305 A2 | 2/2006 |
| WO | 2006/042309 A1 | 4/2006 |
| WO | 2008/149991 A1 | 12/2008 |
| WO | 2009/026508 A1 | 2/2009 |
| WO | 2009/085378 A1 | 7/2009 |
| WO | 2010/024969 A1 | 3/2010 |
| WO | 2012/080020 A1 | 6/2012 |
| WO | 2013/105664 A1 | 7/2013 |
| WO | 2013/133901 A2 | 9/2013 |
| WO | 2014/040675 A2 | 3/2014 |
| WO | 2015/034969 A2 | 3/2015 |
| WO | 2015/057320 A1 | 4/2015 |
| WO | 2016/141057 A1 | 9/2016 |
| WO | 2016/144385 A1 | 9/2016 |
| WO | 2016/144563 A1 | 9/2016 |
| WO | 2016/144696 A2 | 9/2016 |
| WO | 2016/144975 A2 | 9/2016 |
| WO | 2017/027625 A2 | 2/2017 |
| WO | 2018/048518 A1 | 3/2018 |
| WO | 2018/048632 A1 | 3/2018 |

OTHER PUBLICATIONS

Google Help, "Change Your Watch's Home Screen", published on Dec. 11, 2014 at https://support.google.com/wearos/answer/6140435?hl=en, retrieved on Mar. 9, 2022. (Year: 2014).*
Notice of Allowance received for Korean Patent Application No. 10-2021-7005523, dated Aug. 26, 2021, 4 pages (1 page of English Translation and 3 pages of Official Copy).
Decision on Appeal received for Korean Patent Application No. 10-2018-7033888, dated Oct. 27, 2021, 34 pages (4 pages of English Translation and 30 pages of Official Copy).
Final Office Action received for U.S. Appl. No. 15/818,500, dated Nov. 30, 2021, 14 pages.
Decision to Grant received for Danish Patent Application No. PA201970259, dated Sep. 17, 2021, 2 pages.
Applicant-Initiated Interview Summary received for U.S. Appl. No. 16/822,591, dated Dec. 29, 2021, 6 pages.
Notice of Acceptance received for Australian Patent Application No. 2019337519, dated Dec. 15, 2021, 3 pages.
Applicant-Initiated Interview Summary received for U.S. Appl. No. 15/818,500, dated Jan. 24, 2022, 4 pages.
Non-Final Office Action received for U.S. Appl. No. 16/926,512, dated Jan. 21, 2022, 20 pages.
Office Action received for Korean Patent Application No. 10-2021-7001482, dated Jan. 24, 2022, 9 pages (4 pages of English Translation and 5 pages of Official Copy).
Non-Final Office Action received for U.S. Appl. No. 16/680,341, dated May 7, 2021, 14 pages.
Office Action received for Japanese Patent Application No. 2019-088503, dated Apr. 2, 2021, 6 pages (3 pages of English Translation and 3 pages of Official Copy).
Advisory Action received for U.S. Appl. No. 15/655,253, dated May 11, 2021, 6 pages.
Applicant-Initiated Interview Summary received for U.S. Appl. No. 15/655,253, dated Mar. 29, 2021, 4 pages.
Applicant-Initiated Interview Summary received for U.S. Appl. No. 16/680,341, dated Apr. 16, 2021, 2 pages.
Applicant-Initiated Interview Summary received for U.S. Appl. No. 16/680,341, dated Jul. 20, 2021, 3 pages.
Final Office Action received for U.S. Appl. No. 15/655,253, dated Feb. 9, 2021, 16 pages.
Intention to Grant received for Danish Patent Application No. PA201970259, dated Mar. 23, 2021, 2 pages.
International Preliminary Report on Patentability received for PCT Patent Application No. PCT/US2019/049237, dated Mar. 25, 2021, 15 pages.
Non-Final Office Action received for U.S. Appl. No. 15/818,500, dated Jul. 12, 2021, 18 pages.
Notice of Allowance received for U.S. Appl. No. 15/818,500, dated Feb. 22, 2021, 11 pages.
Office Action received for Australian Patent Application No. 2019337519, dated Mar. 18, 2021, 5 pages.
Office Action received for European Patent Application No. 17813779.0, dated Mar. 4, 2021, 7 pages.
Office Action received for European Patent Application No. 19173371.6, dated Mar. 15, 2021, 6 pages.
Office Action received for European Patent Application No. 19173886.3, dated Mar. 16, 2021, 6 pages.
Office Action received for Indian Patent Application No. 201818001531, dated Mar. 12, 2021, 6 pages.
Office Action received for Korean Patent Application No. 10-2021-7001482, dated Apr. 9, 2021, 10 pages (4 pages of English Translation and 6 pages of Official Copy).
Office Action received for Korean Patent Application No. 10-2021-7005523, dated Mar. 31, 2021, 8 pages (3 pages of English Translation and 5 pages of Official Copy).
Supplemental Notice of Allowance received for U.S. Appl. No. 15/818,500, dated Mar. 5, 2021, 2 pages.

(56) References Cited

OTHER PUBLICATIONS

Advisory Action received for U.S. Appl. No. 14/839,894, dated May 29, 2019, 3 pages.
Advisory Action received for U.S. Appl. No. 15/049,058, dated Oct. 18, 2017, 3 pages.
Advisory Action received for U.S. Appl. No. 15/049,064, dated May 10, 2017, 3 pages.
Advisory Action received for U.S. Appl. No. 16/144,950, dated Feb. 20, 2020, 5 pages.
Advisory Action received for U.S. Appl. No. 16/147,413, dated Nov. 25, 2019, 6 pages.
Apple Inc, "iPhone User Guide for iOS 7.1 Software", available online at <https://manuals.info.apple.com/MANUALS/1000/MA1681/en_US/iphone_ios7_user_guide.pdf>, Mar. 10, 2014, pp. 1-162.
Applicant Initiated Interview Summary received for U.S. Appl. No. 15/655,253, dated Mar. 31, 2020, 5 pages.
Applicant Initiated Interview Summary received for U.S. Appl. No. 15/655,253, dated Nov. 12, 2019, 3 pages.
Applicant Initiated Interview Summary received for U.S. Appl. No. 16/144,950, dated Jan. 29, 2020, 5 pages.
Applicant Initiated Interview Summary received for U.S. Appl. No. 16/147,413, dated Oct. 28, 2019, 5 pages.
Applicant-Initiated Interview Summary received for U.S. Appl. No. 15/655,253, dated Nov. 30, 2020, 5 pages.
Applicant-Initiated Interview Summary received for U.S. Appl. No. 15/818,500, dated Jan. 30, 2020, 5 pages.
Applicant-Initiated Interview Summary received for U.S. Appl. No. 15/818,500, dated Oct. 13, 2020, 4 pages.
Applicant-Initiated Interview Summary received for U.S. Appl. No. 16/147,413, dated Jun. 2, 2020, 4 pages.
Applicant-Initiated Interview Summary received for U.S. Appl. No. 16/680,341, dated Sep. 10, 2020, 5 pages.
Applicant-Initiated Interview Summary received for U.S. Appl. No. 16/814,801, dated Jan. 29, 2021, 2 pages.
Ask Different, "Time—Is It Not Possible to Make Apple Watch Chime on the Hour?", Online available at: https://apple.stackexchange.com/questions/347805/is-it-not-possible-to-make-apple-watch-chime-on-the-hour, Retrieved on U.S. Appl. No. 12/712,020, filed Jan. 7, 2019, 3 pages.
Brief Communication regarding Oral Proceedings received for European Patent Application No. 12154609.7, mailed on Jan. 9, 2020, 14 pages.
Brief Communication regarding Oral Proceedings received for European Patent Application No. 12154609.7, mailed on Jan. 14, 2020, 2 pages.
Brinkmann Martin, "How to Zoom in Firefox", Ghacks, Available at <https://web.archive.org/web/20130804034728/https://www.ghacks.net/2009/02/23/how-to-zoom-in-firefox/>, Feb. 23, 2009, 11 pages.
Corrected Notice of Allowance received forU.S. Appl. No. 14/841,656, dated Apr. 11, 2018, 2 pages.
Corrected Notice of Allowance received forU.S. Appl. No. 14/841,656, dated May 7, 2018, 14 pages.
Corrected Notice of Allowance received for U.S. Appl. No. 15/927,768, dated Aug. 7, 2019, 2 pages.
Corrected Notice of Allowance received for U.S. Appl. No. 15/927,768, dated Jul. 9, 2019, 2 pages.
Corrected Notice of Allowance received for U.S. Appl. No. 16/147,413, dated Jan. 8, 2021, 7 pages.
Corrected Notice of Allowance received for U.S. Appl. No. 16/147,413, dated Nov. 25, 2020, 7 pages.
Corrected Notice of Allowance received for U.S. Appl. No. 16/147,413, dated Sep. 17, 2020, 7 pages.
Corrected Notice of Allowance received forU.S. Appl. No. 16/814,801, dated Mar. 11, 2021, 8 pages.
Decision on Appeal received for Korean Patent Application No. 10-2012-7003523, dated Oct. 11, 2019, 14 pages.
Decision to Grant received for Danish Patent Application No. PA201770181, dated Mar. 7, 2018, 2 pages.
Decision to Grant received for Danish Patent Application No. PA201870631, dated May 15, 2019, 2 pages.
Decision to Grant received for Danish Patent Application No. PA201870632, dated May 14, 2019, 2 pages.
Decision to Grant received for European Patent Application No. 12154613.9, dated Aug. 1, 2019, 2 pages.
Decision to Grant received for European Patent Application No. 18157131.6, dated May 16, 2019, 2 pages.
Decision to Grant received for the Japanese Patent Application No. 2012-513959, dated Aug. 17, 2015, 6 pages.
Decision to Refusal received for European Patent Application No. 10719502.6, dated Jun. 13, 2019, 9 pages.
Decision to Refuse received for European Patent Application No. 12154609.7, dated Feb. 10, 2020, 15 pages.
European Search Report received for European Patent Application No. 19173371.6, dated Oct. 30, 2019, 7 pages.
European Search Report received for European Patent Application No. 19173886.3, dated Oct. 30, 2019, 8 pages.
European Search Report received for European Patent Application No. 19206249.5, dated Dec. 19, 2019, 4 pages.
Ex-Parte Quayle Action received for U.S. Appl. No. 16/035,068, mailed on May 1, 2019, 8 pages.
Extended European Search Report received for European Patent Application No. 12154609.7, dated Oct. 5, 2012, 8 pages.
Extended European Search Report received for European Patent Application No. 12154613.9, dated Jul. 6, 2012, 6 pages.
Extended European Search Report received for European Patent Application No. 17813779.0, dated Oct. 29, 2019, 8 pages.
Extended European Search Report received for European Patent Application No. 19195247.2, dated Mar. 9, 2020, 7 pages.
Feel the current time on your Apple Watch with TimeBuzz, Available online at: https://www.timebuzz.nl/, Version: 1.5 (build 32), 2021, 11 pages.
Final Office Action received for U.S. Appl. No. 12/565,744, dated Dec. 6, 2012, December6, 2012, 14 pages.
Final Office Action received for U.S. Appl. No. 14/839,894, dated Jan. 30, 2019, 16 pages.
Final Office Action received for U.S. Appl. No. 15/049,058, dated Aug. 8, 2018, 23 pages.
Final Office Action received for U.S. Appl. No. 15/049,058, dated May 8, 2017, 21 pages.
Final Office Action received for U.S. Appl. No. 15/049,064, dated Feb. 27, 2017, 13 pages.
Final Office Action received for U.S. Appl. No. 15/655,253, dated Feb. 4, 2020, 20 pages.
Final Office Action received for U.S. Appl. No. 15/818,500, dated Apr. 6, 2020, 15 pages.
Final Office Action received for U.S. Appl. No. 16/144,950, dated Nov. 25, 2019, 24 pages.
Final Office Action received for U.S. Appl. No. 16/147,413, dated Sep. 3, 2019, 19 pages.
Final Office Action received for U.S. Appl. No. 16/680,341, dated Dec. 17, 2020, 14 pages.
Gurman Mark, "Apple Watch iPhone 'Companion' app Revealed w/ New Watch features, Monograms", Available online at: https://9to5mac.com/2015/01/13/apple-watch-iphone-companion-app-revealed-with-new-watch-features-monograms/, Jan. 13, 2015, pp. 1-18.
Intention to Grant received for Danish Patent Application No. PA201870631, dated Apr. 5, 2019, 2 pages.
Intention to Grant received for Danish Patent Application No. PA201870632, dated Apr. 5, 2019, 2 pages.
Intention to Grant received for European Patent Application No. 12154613.9, dated Mar. 21, 2019, 8 pages.
Intention to Grant received for European Patent Application No. 18157131.6, dated Jan. 9, 2019, 9 pages.
International Preliminary Report on Patentability received for PCT Patent Application No. PCT/US2010/034109, dated Dec. 22, 2011, 11 pages.
International Preliminary Report on Patentability received for PCT Patent Application No. PCT/US2012/040703, dated Dec. 27, 2013, 9 pages.
International Preliminary Report on Patentability received for PCT Patent Application No. PCT/US2014/053961, dated Jul. 21, 2016, 24 pages.

(56) References Cited

OTHER PUBLICATIONS

International Preliminary Report on Patentability received for PCT Patent Application No. PCT/US2015/054974, dated Sep. 14, 2017, 14 pages.
International Preliminary Report on Patentability received for PCT Patent Application No. PCT/US2016/019637, dated Sep. 21, 2017, 12 pages.
International Preliminary Report on Patentability received for PCT Patent Application No. PCT/US2017/035325, dated Dec. 27, 2018, 9 pages.
International Search Report and Written Opinion received for PCT Patent Application No. PCT/US2010/034109, dated Jun. 22, 2011, 15 pages.
International Search Report and Written Opinion received for PCT Patent Application No. PCT/US2012/040703 dated Aug. 30, 2012, dated Aug. 30, 2012, 10 pages.
International Search Report and Written Opinion received for PCT Patent Application No. PCT/US2015/054974, dated Apr. 20, 2016, 20 pages.
International Search Report and Written Opinion received for PCT Patent Application No. PCT/US2016/019637, dated Aug. 18, 2016, 18 pages.
International Search Report and Written Opinion Received for PCT Patent Application No. PCT/US2017/035325, dated Sep. 7, 2017, 11 pages.
International Search Report and Written Opinion received for PCT Patent Application No. PCT/US2019/049237, dated Jan. 8, 2020, 21 pages.
International Search Report received for PCT Patent Application No. PCT/US2014/053961, dated Jul. 11, 2016, 10 pages.
International Written Opinion received for PCT Patent Application No. PCT/US2014/053961, dated Jul. 11, 2016, 22 pages.
Invitation to Pay Additional Fees received for PCT Patent Application No. PCT/US2014/053961, dated Aug. 3, 2015, 6 pages.
Invitation to pay additional fees received for PCT Patent Application No. PCT/US2015/054974, dated Feb. 12, 2016, 7 pages.
Invitation to Pay Additional Fees received for PCT Patent Application No. PCT/US2016/019637, dated Jun. 1, 2016, 6 pages.
Invitation to Pay Additional Fees received for PCT Patent Application No. PCT/US2019/049237, dated Oct. 31, 2019, 18 pages.
Little Ben—Elegant Quarter Chime Clock App for your iPhone & iPad, Online available at: www.curveddesign.com, Oct. 29, 2013, 8 pages.
Little Ben—Time haptics for your Apple Watch, Like a Cuckoo Clock, Online available at: https://www.producthunt.com/posts/little-ben, Nov. 25, 2017, 2 pages.
Mai, Tuan, "This Watch Tells You the Time in Vibrating Morse Code", Available at <https://web.archive.org/web/20130915060538/http://www.tomsguide.com/us/Watch-Concept-Morse-Code,news-12089.html>, Aug. 9, 2011, pp. 1-3.
Minutes of the Oral Proceedings received for European Patent Application No. 10719502.6, mailed on Jun. 13, 2019, 4 pages.
Minutes of the Oral Proceedings received for European Patent Application No. 12154609.7, mailed on Feb. 5, 2020, 3 pages.
Non-Final Office Action received for U.S. Appl. No. 12/565,744, dated Dec. 3, 2013, 14 pages.
Non-Final Office Action received for U.S. Appl. No. 12/565,744, dated May 25, 2012, 15 pages.
Non-Final Office Action received for U.S. Appl. No. 12/565,745, dated Jul. 12, 2012, 7 pages.
Non-Final Office Action received for U.S. Appl. No. 12/565,746, dated Jul. 19, 2013, 14 pages.
Non-Final Office Action received for U.S. Appl. No. 12/795,633, dated Apr. 25, 2013, 9 pages.
Non-Final Office Action received for U.S. Appl. No. 12/795,633, dated Aug. 30, 2012, 9 pages.
Non-Final Office Action received for U.S. Appl. No. 12/795,633, dated Dec. 21, 2011, 9 pages.
Non-Final Office Action received for U.S. Appl. No. 12/795,635, dated Jul. 25, 2013, 45 pages.
Non-Final Office Action received for U.S. Appl. No. 12/795,635, dated Mar. 7, 2013, 41 pages.
Non-Final Office Action received for U.S. Appl. No. 13/221,833, dated Sep. 13, 2013, 5 pages.
Non-Final Office Action received for U.S. Appl. No. 13/949,149, dated Jul. 16, 2015, 11 pages.
Non-Final Office Action received for U.S. Appl. No. 14/839,894, dated Jun. 6, 2018, 19 pages.
Non-Final Office Action received for U.S. Appl. No. 14/841,656, dated Jul. 26, 2017, 20 pages.
Non-Final Office Action received for U.S. Appl. No. 14/943,005, dated Oct. 18, 2017, 12 pages.
Non-Final Office Action received for U.S. Appl. No. 15/049,058, dated Feb. 20, 2018, 21 pages.
Non-Final Office Action received for U.S. Appl. No. 15/049,058, dated Jun. 5, 2019, 25 pages.
Non-Final Office Action received for U.S. Appl. No. 15/049,058, dated Nov. 16, 2016, 19 pages.
Non-Final Office Action received for U.S. Appl. No. 15/049,064, dated Oct. 27, 2016, 15 pages.
Non-Final Office Action received for U.S. Appl. No. 15/421,711, dated May 18, 2018, 25 pages.
Non-Final Office Action received for U.S. Appl. No. 15/655,253, dated Jul. 10, 2019, 16 pages.
Non-Final Office Action received for U.S. Appl. No. 15/655,253, dated Sep. 10, 2020, 17 pages.
Non-Final Office Action received for U.S. Appl. No. 15/818,500, dated Aug. 30, 2019, 17 pages.
Non-Final Office Action received for U.S. Appl. No. 16/144,950, dated Mar. 6, 2019, 24 pages.
Non-Final Office Action received for U.S. Appl. No. 16/147,413, dated Mar. 11, 2020, 22 pages.
Non-Final Office Action received for U.S. Appl. No. 16/147,413, dated Feb. 7, 2019, 18 pages.
Non-Final Office Action received for U.S. Appl. No. 16/680,341, dated May 27, 2020, 12 pages.
Non-Final Office Action received for U.S. Appl. No. 16/814,801, dated Dec. 15, 2020, 17 pages.
Notice of Acceptance received for Australian Patent Application No. 2010259191, dated Mar. 21, 2014, 2 pages.
Notice of Acceptance received for Australian Patent Application No. 2019201628, dated Sep. 10, 2019, 3 pages.
Notice of Acceptance received for Australian Patent Application No. 2019272034, dated Dec. 14, 2020, 3 pages.
Notice of Allowance received for Chinese Patent Application No. 201780014703.1, dated Nov. 6, 2019, 2 pages.
Notice of Allowance received for Chinese Patent Application No. 201810074876.9, dated Jan. 12, 2021, 2 pages.
Notice of Allowance received for Chinese Patent Application No. 201910454069.4, dated Nov. 2, 2020, 7 pages.
Notice of Allowance received for Chinese Patent Application No. 201910454076.4, dated Feb. 4, 2021, 2 pages.
Notice of Allowance received for Danish Patent Application No. PA201670118, dated Mar. 30, 2017, 2 pages.
Notice of Allowance received for Japanese Patent Application No. 2016-537948, dated Nov. 11, 2019, 3 pages.
Notice of Allowance received for Japanese Patent Application No. 2017-545561, dated Jul. 12, 2019, 4 pages.
Notice of Allowance received for Japanese Patent Application No. 2018-143982, dated Apr. 8, 2019, 4 pages.
Notice of Allowance received for Korean Patent Application No. 10-2012-7000663, dated Jul. 24, 2014, 2 pages.
Notice of Allowance received for Korean Patent Application No. 10-2012-7001628, dated Jan. 29, 2015, 2 pages.
Notice of Allowance received for Korean Patent Application No. 10-2012-7001631, dated Oct. 27, 2015, 3 pages.
Notice of Allowance received for Korean Patent Application No. 10-2016-7002541, dated Mar. 29, 2017, 3 pages.
Notice of Allowance received for Korean Patent Application No. 10-2018-7002695, dated Oct. 8, 2018, 5 pages.
Notice of Allowance received for Taiwanese Patent Application No. 103130519, dated Oct. 27, 2016, 3 pages.

(56) References Cited

OTHER PUBLICATIONS

Notice of Allowance received for Taiwanese Patent Application No. 104135930, dated Nov. 9, 2016, 4 pages.
Notice of Allowance received for U.S. Appl. No. 12/565,744, dated Dec. 12, 2014, 5 pages.
Notice of Allowance received for U.S. Appl. No. 12/565,744, dated Jul. 18, 2014, 11 pages.
Notice of Allowance received for U.S. Appl. No. 12/565,745, dated Mar. 15, 2013, dated Mar. 15, 2013, 5 pages.
Notice of Allowance received for U.S. Appl. No. 12/565,745, dated Nov. 26, 2012, 5 pages.
Notice of Allowance received for U.S. Appl. No. 12/565,746, dated Jan. 2, 2014, 8 pages.
Notice of Allowance received for U.S. Appl. No. 12/795,633, dated Nov. 20, 2013, 12 pages.
Notice of Allowance received for U.S. Appl. No. 14/839,894, dated Aug. 12, 2019, 8 pages.
Notice of Allowance received for U.S. Appl. No. 14/841,656, dated Feb. 12, 2018, 9 pages.
Notice of Allowance received for U.S. Appl. No. 14/841,656, dated Mar. 5, 2018, 3 pages.
Notice of Allowance received for U.S. Appl. No. 14/943,005, dated Apr. 12, 2018, 8 pages.
Notice of Allowance received for U.S. Appl. No. 15/049,064, dated Jul. 18, 2017, 24 pages.
Notice of Allowance received for U.S. Appl. No. 15/058,996, dated Dec. 27, 2016, 10 pages.
Notice of Allowance received for U.S. Appl. No. 15/421,711, dated Oct. 5, 2018, 10 pages.
Notice of Allowance received for U.S. Appl. No. 15/927,768, dated May 31, 2019, 13 pages.
Notice of Allowance received for U.S. Appl. No. 16/035,068, dated Jul. 17, 2019, 5 pages.
Notice of Allowance received for U.S. Appl. No. 16/144,950, dated Mar. 19, 2020, 14 pages.
Notice of Allowance received for U.S. Appl. No. 16/147,413, dated Jul. 20, 2020, 11 pages.
Notice of Allowance received for U.S. Appl. No. 16/147,413, dated Nov. 5, 2020, 10 pages.
Notice of Allowance received for U.S. Appl. No. 16/814,801, dated Feb. 18, 2021, 9 pages.
Notice of Allowance received for U.S. Appl. No. 13/221,833, dated Jan. 29, 2014, 6 pages.
Nova Launcher, Available on: https://web.archive.org/web/20150703231459/https://play.google.com/store/apps/details?id=com.teslacoilsw.launcher, retrieved on Jul. 3, 2015, 3 pages.
Office Action and Search Report received for Danish Patent Application No. PA 201670118, dated Jul. 1, 2016, 7 pages.
Office Action received for Australian Patent Application No. 2014315234, dated Jul. 12, 2017, 4 pages.
Office Action received for Australian Patent Application No. 2014315234, dated Nov. 2, 2016, 3 pages.
Office Action received for Australian Patent Application No. 2016229407, dated Aug. 15, 2018, 4 pages.
Office Action received for Australian Patent Application No. 2016229407, dated May 27, 2019, 4 pages.
Office Action received for Australian Patent Application No. 2017254897, dated Aug. 29, 2018, 4 pages.
Office Action received for Australian Patent Application No. 2017254897, dated Jun. 28, 2019, 4 pages.
Office Action received for Australian Patent Application No. 2018200998, dated Jan. 30, 2019, 4 pages.
Office Action received for Australian Patent Application No. 2018200998, dated Mar. 9, 2018, 5 pages.
Office Action received for Australian Patent Application No. 2019201628, dated May 13, 2019, 2 pages.
Office Action received for Australian Patent Application No. 2019216614, dated Apr. 1, 2020, 4 pages.
Office Action received for Australian Patent Application No. 2019216614, dated Aug. 13, 2020, 4 pages.
Office Action received for Australian Patent Application No. 2019216614, dated Aug. 22, 2019, 3 pages.
Office Action received for Australian Patent Application No. 2019272034, dated Sep. 14, 2020, 4 pages.
Office Action received for Australian Patent Application No. 2014315234, dated Apr. 19, 2017, 4 pages.
Office Action received for Chinese Patent Application No. 201480060083.1, dated Aug. 13, 2019, 6 pages.
Office Action received for Chinese Patent Application No. 201480060083.1, dated Dec. 5, 2018, 11 pages.
Office Action received for Chinese Patent Application No. 201680012759.9, dated Jun. 19, 2020, 18 pages.
Office Action received for Chinese Patent Application No. 201780014703.1, dated Apr. 30, 2019, 9 pages.
Office Action received for Chinese Patent Application No. 201810074876.9, dated Jul. 31, 2020, 11 pages.
Office Action received for Chinese Patent Application No. 201910454069.4, dated Dec. 20, 2019, 6 pages.
Office Action received for Chinese Patent Application No. 201910454069.4, dated Jul. 24, 2020, 8 pages.
Office Action received for Chinese Patent Application No. 201910454076.4, dated Dec. 18, 2019, 14 pages.
Office Action received for Chinese Patent Application No. 201910454076.4, dated Oct. 16, 2020, 14 pages.
Office Action received for Danish Patent Application No. PA201670118, dated Feb. 2, 2017, 2 pages.
Office Action received for Danish Patent Application No. PA201670118, dated Oct. 25, 2016, 3 pages.
Office Action received for Danish Patent Application No. PA201670580, dated Feb. 4, 2019, 2 pages.
Office Action received for Danish Patent Application No. PA201670580, dated Mar. 8, 2018, 3 pages.
Office Action received for Danish Patent Application No. PA201770181, dated Jan. 3, 2018, 2 pages.
Office Action received for Danish Patent Application No. PA201770181, dated Jun. 13, 2017, 6 pages.
Office Action received for Danish Patent Application No. PA201970259, dated Jan. 15, 2020, 4 pages.
Office Action received for Danish Patent Application No. PA201970259, dated Nov. 23, 2020, 3 pages.
Office Action received for European Patent Application No. 10719502.6, dated Nov. 20, 2012, 5 pages.
Office Action received for European Patent Application No. 10719502.6, dated Oct. 28, 2015, 5 pages.
Office Action received for European Patent Application No. 12154609.7, dated Jul. 3, 2017, 9 pages.
Office Action received for European Patent Application No. 12154609.7, dated May 15, 2014, 6 pages.
Office Action received for European Patent Application No. 12154613.9, dated Jul. 5, 2016, 6 pages.
Office Action received for European Patent Application No. 12154613.9, dated May 7, 2013, 6 pages.
Office Action received for European Patent Application No. 14771688.0, dated Jan. 21, 2019, 8 pages.
Office Action received for European Patent Application No. 14771688.0, dated May 31, 2018, 6 pages.
Office Action received for European Patent Application No. 14771688.0, dated Nov. 30, 2017, 15 pages.
Office Action received for European Patent Application No. 14771688.0, dated Sep. 16, 2019, 7 pages.
Office Action received for European Patent Application No. 16710372.0, dated Feb. 22, 2019, 7 pages.
Office Action received for European Patent Application No. 17813779.0, dated Aug. 28, 2020, 7 pages.
Office Action received for European Patent Application No. 18157131.6, dated May 8, 2018, 12 pages.
Office Action received for European Patent Application No. 19173371.6, dated Nov. 12, 2019, 11 pages.
Office Action received for European Patent Application No. 19173886.3, dated Nov. 12, 2019, 9 pages.
Office Action received for European Patent Application No. 19206249.5, dated Jan. 11, 2021, 8 pages.

(56) References Cited

OTHER PUBLICATIONS

Office Action received for European Patent Application No. 19206249.5, dated Jan. 20, 2020, 8 pages.
Office Action received for Indian Patent Application No. 201617009428, dated Feb. 26, 2020, 7 pages.
Office Action received for Japanese Patent Application No. 2012-024484, dated Dec. 12, 2014, 2 pages.
Office Action received for Japanese Patent Application No. 2012-024484, dated Feb. 13, 2015, 3 pages.
Office Action received for Japanese Patent Application No. 2012-024484, dated Mar. 31, 2014, 6 pages.
Office Action received for Japanese Patent Application No. 2012-513959, dated Apr. 28, 2014, 6 pages.
Office Action received for Japanese Patent Application No. 2012-513959, dated Feb. 2, 2015, 6 pages.
Office Action received for Japanese Patent Application No. 2016-537948, dated Apr. 6, 2018, 5 pages.
Office Action received for Japanese Patent Application No. 2016-537948, dated Jun. 9, 2017, 10 pages.
Office Action received for Japanese Patent Application No. 2016-537948, dated Sep. 3, 2018, 4 pages.
Office Action received for Japanese Patent Application No. 2017-545561, dated Aug. 6, 2018, 8 pages.
Office Action received for Japanese Patent Application No. 2018-143982, dated Dec. 7, 2018, 10 pages.
Office Action received for Japanese Patent Application No. 2019-088503, dated Jul. 31, 2020, 7 pages.
Office Action received for Korean Patent Application No. 10-2012-7001628, dated Jun. 11, 2014, 4 pages.
Office Action received for Korean Patent Application No. 10-2012-7001631, dated Apr. 9, 2015, 9 pages.
Office Action received for Korean Patent Application No. 10-2012-7001631, dated Jan. 29, 2015, 5 pages.
Office Action received for Korean Patent Application No. 10-2012-7001631, dated Jun. 11, 2014, 4 pages.
Office Action received for Korean Patent Application No. 10-2012-7003523, dated Dec. 26, 2017, 6 pages.
Office Action received for Korean Patent Application No. 10-2012-7003523, dated Feb. 27, 2017, 8 pages.
Office Action received for Korean Patent Application No. 10-2012-7003523, dated Mar. 31, 2016, 5 pages.
Office Action received for Korean Patent Application No. 10-2016-7002541, dated May 2, 2016, 9 pages.
Office Action received for Korean Patent Application No. 10-2016-7008682, dated Dec. 30, 2016, 11 pages.
Office Action received for Korean Patent Application No. 10-2016-7008682, dated Feb. 8, 2018, 7 pages.
Office Action received for Korean Patent Application No. 10-2016-7008682, dated Nov. 27, 2017, 7 pages.
Office Action received for Korean Patent Application No. 10-2017-7024506, dated Aug. 12, 2019, 6 pages.
Office Action received for Korean Patent Application No. 10-2017-7024506, dated Feb. 19, 2020, 12 pages.
Office Action received for Korean Patent Application No. 10-2017-7024506, dated Jul. 8, 2020, 6 pages.
Office Action received for Korean Patent Application No. 10-2017-7024506, dated Sep. 28, 2018, 11 pages.
Office Action received for Korean Patent Application No. 10-2018-7002695, dated Feb. 27, 2018, 12 pages.
Office Action received for Korean Patent Application No. 10-2018-7002695, dated Jun. 19, 2018, 8 pages.
Office Action received for Korean Patent Application No. 10-2018-7033888, dated Jul. 7, 2020, 7 pages.
Office Action received for Korean Patent Application No. 10-2018-7033888, dated Nov. 28, 2019, 10 pages.
Office Action received for Korean Patent Application No. 10-2018-7033888, dated Oct. 19, 2020, 10 pages.
Office Action received for Korean Patent Application No. 10-2012-7003523, dated Apr. 23, 2018, 7 pages.
Office Action received for Taiwan Patent Application No. 103130519, dated Mar. 25, 2016, 14 pages.
Partial European Search Report received for European Patent Application No. 19173371.6, dated Jul. 18, 2019, 17 pages.
Partial European Search Report received for European Patent Application No. 19173886.3, dated Jul. 18, 2019, 15 pages.
Pedersen Isabel, "Ready to Wear (or Not) Examining the Rhetorical Impact of Proposed Wearable Devices", 2013 IEEE International Symposium on Technology and Society (ISTAS) Social Implications of Wearable Computing and Augmediated Reality III Everyday Life, Dec. 31, 2013, pp. 201-202.
Search Report and Opinion received for Danish Patent Application No. PA201670580, dated Jan. 31, 2017, 7 pages.
Search Report and opinion received for Danish Patent Application No. PA201870631, dated Dec. 6, 2018, 8 pages.
Search Report and Opinion received for Danish Patent Application No. PA201870632, dated Dec. 3, 2018, 8 pages.
Search Report and Opinion received for Danish Patent Application No. PA201970259, dated Jul. 19, 2019, 10 pages.
Search Report received for European Patent Application No. 18157131.6, dated Apr. 19, 2018, 4 pages.
Summons to Attend Oral Proceedings received for European Patent Application No. 10719502.6, mailed on Nov. 27, 2018, 5 pages.
Summons to Attend Oral Proceedings received for European Patent Application No. 12154609.7, mailed on Apr. 12, 2019, 8 pages.
The Blind Life, "Double Tap Big Clock", https://www.youttlbe.com/watch?v-=U6XMnSPCEXU, Mar. 2, 2016, 2 pages.
Timebuzz, "Feel the current time on your Apple Watch with Time Buzz", Available at <https://web.archive.org/web/20160125032143/http://www.timebuzz.nl/>, Jan. 25, 2016, pp. 1-6.
Timebuzz, "Introducing Time Buzz, an Apple Watch App that Allows You to Tell the Time Using the Taptic Engine", Online available at: https://www.applevis.com/forum/watchos-apple-watch-apps/introducing-timebuzz-apple-watch-app-allows-you-tell-time-using, Dec. 22, 2015, 10 pages.
Tong et al., "Discussion About the Influence of Wearable Device on Mobile Operators'Service", Telecom science, Oct. 31, 2014, pp. 134-142.
Toyssy et al., "Telling Time by Vibration", 6th International Conference, EuroHaptics 2008 Madrid, Spain, Jun. 10-11, 2008, pp. 924-929.
Töyssy Sampo, "Telling Time by Vibration", University of Tampere, Department of Computer Sciences, Interactive Technology, Master's Thesis, Nov. 2007, 57 pages.
Use Accessibility features on your Apple Watch, online available at: https://support.apple.com/en-us/HT204576, Retrieved on U.S. Appl. No. 12/712,020, filed Oct. 30, 2018, 5 pages.
Zibreg Christian, "Howto select Siri voices for VoiceOver, Speak Screen and Speak Selection features", Available online at: https://www.idownloadblog.com/2016/02/17/how-to-select-siri-voices-for-voiceover/, Retrieved on Dec. 8, 2020, Feb. 17, 2016, 22 pages.
IZoom Magnifier/Reader CD version 6.0, Online available at: https://www.youtube.com/x watch?v=jrJ-dLCh20g&t=8s, https://lssproducts.com/izoom-magnifier-reader-cd-version-6-0/#Color_Enhancements, 2009, Nov. 15, 2009, 12 pages.
Non-Final Office Action received for U.S. Appl. No. 16/822,591, dated Oct. 5, 2021, 30 pages.
Office Action received for Australian Patent Application No. 2019337519, dated Oct. 8, 2021, 7 pages.
Barsamian Blaze, "The Magic of SCSS Dynamically Changing CSS Font Color Based on Background, Using SCSS", Dynamically Changing CSS Font Color Based on Background, Using SCSS(revelry.co), 2018, Feb. 7, 2018, 15 pages.
Corradini Facundo, "Switch font color for different backgrounds with CSS", Online available at: https://css-tricks.com/switch-font-color-for-different-backgrounds-with-css/, 2018, Aug. 10, 2018, 10 pages.
Rendle Robin, "Reverse Text Color Based on Background Color Automatically in CSS", Online available at: https://css-tricks.com/reverse-text-color-mix-blend-mode/, Oct. 19, 2015, 6 pages.
Vanroekel Kara, "Mobile Accessibility 201: Colors, Contrast, and Magnification, Oh My!", Level Access Blog, Retrieved on 2021, 9 pages.

(56) References Cited

OTHER PUBLICATIONS

Office Action received for Indian Patent Application No. 202018012249, dated Nov. 1, 2021, 6 pages.

Office Action received for Japanese Patent Application No. 2021-510409, dated Oct. 8, 2021, 9 pages (5 pages of English Translation and 4 pages of Official Copy).

Applicant-Initiated Interview Summary received for U.S. Appl. No. 15/818,500, dated Aug. 9, 2021, 6 pages.

Office Action received for Australian Patent Application No. 2021201780, dated Mar. 22, 2022, 3 pages.

Office Action received for Korean Patent Application No. 10-2021-7039120, dated May 30, 2022, 7 pages (3 pages of English Translation and 4 pages of Official Copy).

Applicant-Initiated Interview Summary received for U.S. Appl. No. 16/926,512, dated Apr. 21, 2022, 4 pages.

Final Office Action received for U.S. Appl. No. 16/822,591, dated Apr. 20, 2022, 56 pages.

Office Action received for Australian Patent Application No. 2022202044, dated Apr. 6, 2022, 3 pages.

Office Action received for Japanese Patent Application No. 2021-510409, dated Apr. 8, 2022, 5 pages (2 pages of English Translation and 3 pages of Official Copy).

Advisory Action received for U.S. Appl. No. 15/818,500, dated Feb. 18, 2022, 4 pages.

Notice of Allowance received for Japanese Patent Application No. 2019-088503, dated Feb. 18, 2022, 4 pages (1 page of English Translation and 3 pages of Official Copy).

Notice of Allowance received for U.S. Appl. No. 16/926,512, dated May 18, 2022, 9 pages.

Examiner's Answer to Appeal Brief received for U.S. Appl. No. 15/655,253, dated Mar. 10, 2022, 16 pages.

\* cited by examiner

714
After initiating output of the non-visual indication of the current time and prior to completing output of the non-visual indication of the current time, detect a second input, the second input corresponding to a request to interrupt outputting of the non-visual indication of the current time.

716
In response to detecting the second input, cease to output the non-visual indication of the current time before completing output of the non-visual indication of the current time.

718
Initiating output of the second type of non-visual indication of the current time includes initiating the tactile output of the current time at a first speed.

720
After initiating the tactile output of the current time at the first speed, detect a set of one or more inputs corresponding to a request to adjust the speed of tactile outputs indicating the current time.

722
In response to receiving the set of one or more inputs, adjust a speed of tactile outputs indicating the current time from being configured to output at the first speed to being configured to output at a second speed that is different from the first speed.

724
After receiving the set of one or more inputs, detect a third input corresponding to request to output a tactile output indicating the current time.

726
In response to detecting the third input, initiate a second instance of a tactile output of the current time at the second speed.

*FIG. 7B*

728
The electronic device includes a touch-sensitive surface, the input including one or more contacts detected on the touch-sensitive surface.

730
After initiating output of the non-visual indication of the current time and prior to completing output of the non-visual indication of the current time, detect that the one or more contacts are no longer detected on the touch-sensitive surface.

732
After detecting that the one or more contacts are no longer detected on the touch-sensitive surface, complete output of the non-visual indication of the current time.

FIG. 7C

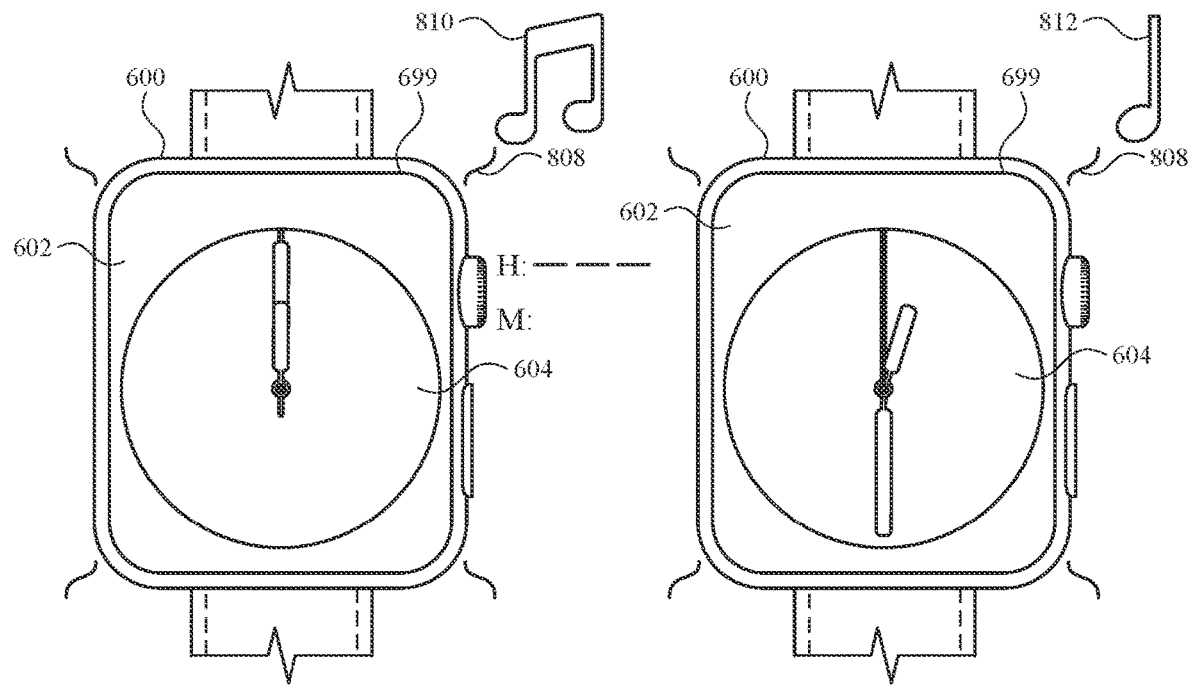
*FIG. 8E*  *FIG. 8F*
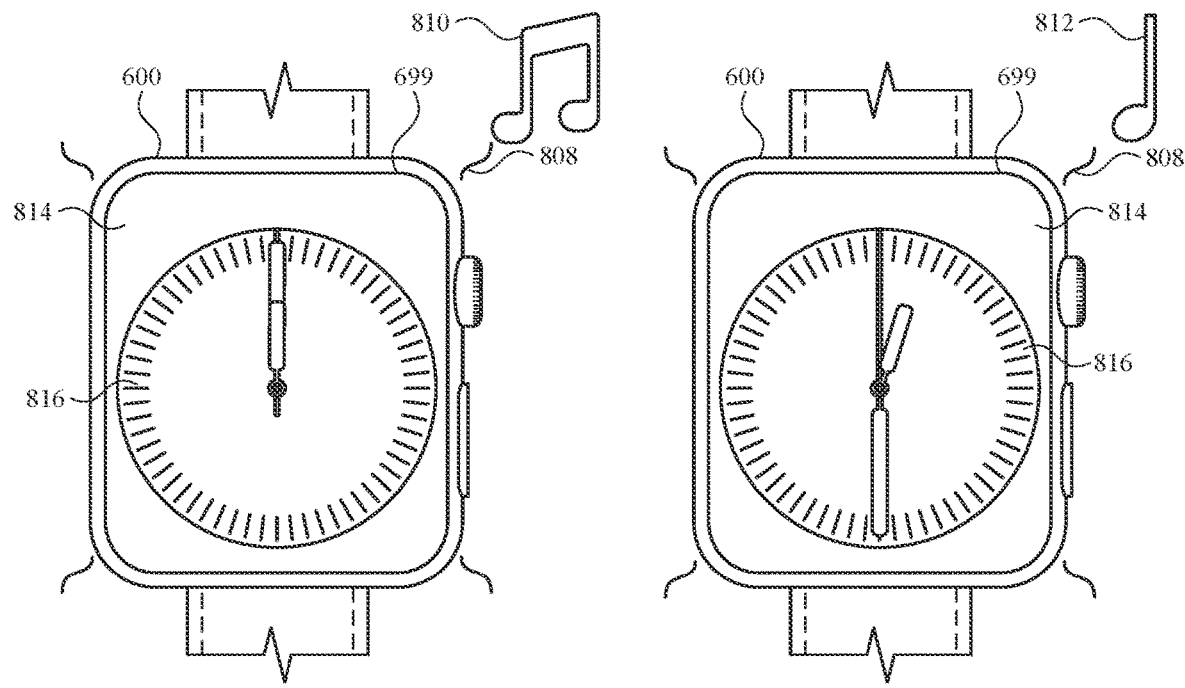
*FIG. 8G*  *FIG. 8H*

(A)

---
920
In accordance with the electronic device having a third hardware configuration, the electronic device outputting the first non-visual alert includes waiting for a first delay period to elapse before outputting the first non-visual alert.

---
922
In accordance with the electronic device having a fourth hardware configuration that is different from the third hardware configuration, the electronic device outputting the first non-visual alert includes waiting for a second delay period that is different from the first delay period to elapse before outputting the first non-visual alert.

---
924
In accordance with a determination that the electronic device is currently configured to display, via the display device, a first watch face, output, via the one or more non-visual output devices, a first non-visual alert.

↓

926
In accordance with a determination that the electronic device is currently configured to display, via the display device, a second watch face that is different from the first watch face, output, via the one or more non-visual output devices, a second non-visual alert that is different from the first non-visual alert.

↓

928
In accordance with a determination that the electronic device is currently configured to display, via the display device, a third watch face that is different from the first watch face and different from the second watch face, output, via the one or more non-visual output devices, the first non-visual alert.

*FIG. 9B*

USER INTERFACES FOR NON-VISUAL OUTPUT OF TIME

CROSS-REFERENCE TO RELATED APPLICATIONS

This application is a continuation of U.S. patent application Ser. No. 16/814,801, filed Mar. 10, 2020, entitled "USER INTERFACES FOR NON-VISUAL OUTPUT OF TIME" which claims priority to U.S. Provisional Patent Application 62/856,018, filed Jun. 1, 2019, entitled "USER INTERFACES FOR NON-VISUAL OUTPUT OF TIME." This application also relates to U.S. Pat. No. 10,156,904, issued Dec. 18, 2018, entitled "Wrist-Based Tactile Time Feedback For Non-Sighted Users," which claims priority to U.S. Provisional Application No. 62/349,061, filed Jun. 12, 2016, entitled "Wrist-Based Tactile Time Feedback For Non-Sighted Users." The contents of each of these applications are hereby incorporated by reference in their entireties.

FIELD

The present disclosure relates generally to computer user interfaces, and more specifically to techniques for managing the output of a current time.

BACKGROUND

Electronic devices, such as wearable electronic devices (e.g., smartwatches) can output time by displaying the time on a display screen of the electronic device. Devices can also provide non-visual outputs of time.

BRIEF SUMMARY

Some techniques for managing the output of time using electronic devices, however, are generally cumbersome and inefficient. For example, some existing techniques use a complex and time-consuming user interface, which may include multiple key presses, keystrokes, or touch inputs. Existing techniques require more time than necessary, wasting user time and device energy. This latter consideration is particularly important in battery-operated devices. For example, some techniques include outputting the time by displaying the time on a user interface of a display screen of the electronic device. However, there may be situations where the user wishes to ascertain the time without having to divert their attention away to the display screen. In such cases, a more discreet method of ascertaining the time may be preferred. Still, other users wishing to ascertain the time may have uncorrected vision, for example if they have momentarily misplaced their spectacles or otherwise lack vision correction aids.

Accordingly, the present technique provides electronic devices with faster, more efficient methods and interfaces for managing output of the current time. Such methods and interfaces optionally complement or replace other methods for managing output of the current time. Such methods and interfaces reduce the cognitive burden on a user and produce a more efficient human-machine interface. For battery-operated computing devices, such methods and interfaces conserve power and increase the time between battery charges.

In accordance with some embodiments, a method performed at an electronic device with one or more input devices, a first non-visual output device, and a second non-visual output device is described. The method comprises: detecting, via the one or more input devices, an input; in response to detecting the input: in accordance with a determination that the input meets a set of non-visual time output criteria, initiating output of a non-visual indication of a current time, wherein initiating output of the non-visual indication of the current time includes: in accordance with a determination that a first set of output type criteria are met, initiating output, via the first non-visual output device, of a first type of non-visual indication of the current time; and in accordance with a determination that a second set of output type criteria are met, initiating output, via the second non-visual output device, of a second type of non-visual indication of the current time, different from the first type of non-visual indication of the current time.

In accordance with some embodiments, a non-transitory computer-readable storage medium storing one or more programs configured to be executed by one or more processors of an electronic device with one or more input devices, a first non-visual output device, and a second non-visual output device is described. The one or more programs include instructions for: detecting, via the one or more input devices, an input; in response to detecting the input: in accordance with a determination that the input meets a set of non-visual time output criteria, initiating output of a non-visual indication of a current time, wherein initiating output of the non-visual indication of the current time includes: in accordance with a determination that a first set of output type criteria are met, initiating output, via the first non-visual output device, of a first type of non-visual indication of the current time; and in accordance with a determination that a second set of output type criteria are met, initiating output, via the second non-visual output device, of a second type of non-visual indication of the current time, different from the first type of non-visual indication of the current time.

In accordance with some embodiments, a transitory computer-readable storage medium storing one or more programs configured to be executed by one or more processors of an electronic device with one or more input devices, a first non-visual output device, and a second non-visual output device is described. The one or more programs include instructions for: detecting, via the one or more input devices, an input; in response to detecting the input: in accordance with a determination that the input meets a set of non-visual time output criteria, initiating output of a non-visual indication of a current time, wherein initiating output of the non-visual indication of the current time includes: in accordance with a determination that a first set of output type criteria are met, initiating output, via the first non-visual output device, of a first type of non-visual indication of the current time; and in accordance with a determination that a second set of output type criteria are met, initiating output, via the second non-visual output device, of a second type of non-visual indication of the current time, different from the first type of non-visual indication of the current time.

In accordance with some embodiments, an electronic device with one or more input devices; a first non-visual output device; a second non-visual output device; one or more processors; and memory storing one or more programs configured to be executed by the one or more processors is described. The one or more programs including instructions for: detecting, via the one or more input devices, an input; in response to detecting the input: in accordance with a determination that the input meets a set of non-visual time output criteria, initiating output of a non-visual indication of a current time, wherein initiating output of the non-visual indication of the current time includes: in accordance with a determination that a first set of output type criteria are met, initiating output, via the first non-visual output device, of a first type of non-visual indication of the current time; and in accordance with a determination that a second set of output type criteria are met, initiating output, via the second non-visual output device, of a second type of non-visual indication of the current time, different from the first type of non-visual indication of the current time.

In accordance with some embodiments, an electronic device is described. The electronic device comprises: one or more input devices; a first non-visual output device; a second non-visual output device; means for detecting, via the one or more input devices, an input; means, in response to detecting the input, for: in accordance with a determination that the input meets a set of non-visual time output criteria, initiating output of a non-visual indication of a current time, wherein initiating output of the non-visual indication of the current time includes: in accordance with a determination that a first set of output type criteria are met, initiating output, via the first non-visual output device, of a first type of non-visual indication of the current time; and in accordance with a determination that a second set of output type criteria are met, initiating output, via the second non-visual output device, of a second type of non-visual indication of the current time, different from the first type of non-visual indication of the current time.

In accordance with some embodiments, a method performed at an electronic device with one or more non-visual output devices and a display device is described. The method comprises: detecting that a current time has reached a first predetermined time of a set of one or more predetermined times; in response to detecting that the current time has reached the first predetermined time of the set of one or more predetermined times: in accordance with a determination that the electronic device is currently configured to display, via the display device, a first watch face, outputting, via the one or more non-visual output devices, a first non-visual alert; and in accordance with a determination that the electronic device is currently configured to display, via the display device, a second watch face that is different from the first watch face, outputting, via the one or more non-visual output devices, a second non-visual alert that is different from the first non-visual alert.

A non-transitory computer-readable storage medium storing one or more programs configured to be executed by one or more processors of an electronic device with one or more non-visual output devices and a display device is described. The one or more programs including instructions for: detecting that a current time has reached a first predetermined time of a set of one or more predetermined times; in response to detecting that the current time has reached the first predetermined time of the set of one or more predetermined times: in accordance with a determination that the electronic device is currently configured to display, via the display device, a first watch face, outputting, via the one or more non-visual output devices, a first non-visual alert; and in accordance with a determination that the electronic device is currently configured to display, via the display device, a second watch face that is different from the first watch face, outputting, via the one or more non-visual output devices, a second non-visual alert that is different from the first non-visual alert.

A transitory computer-readable storage medium storing one or more programs configured to be executed by one or more processors of an electronic device with one or more non-visual output devices and a display device is described. The one or more programs including instructions for: detecting that a current time has reached a first predetermined time of a set of one or more predetermined times; in response to detecting that the current time has reached the first predetermined time of the set of one or more predetermined times: in accordance with a determination that the electronic device is currently configured to display, via the display device, a first watch face, outputting, via the one or more non-visual output devices, a first non-visual alert; and in accordance with a determination that the electronic device is currently configured to display, via the display device, a second watch face that is different from the first watch face, outputting, via the one or more non-visual output devices, a second non-visual alert that is different from the first non-visual alert.

In accordance with some embodiments, an electronic device with one or more non-visual output devices; a display device; one or more processors; and memory storing one or more programs configured to be executed by the one or more processors is described. The one or more programs including instructions for: detecting that a current time has reached a first predetermined time of a set of one or more predetermined times; in response to detecting that the current time has reached the first predetermined time of the set of one or more predetermined times: in accordance with a determination that the electronic device is currently configured to display, via the display device, a first watch face, outputting, via the one or more non-visual output devices, a first non-visual alert; and in accordance with a determination that the electronic device is currently configured to display, via the display device, a second watch face that is different from the first watch face, outputting, via the one or more non-visual output devices, a second non-visual alert that is different from the first non-visual alert.

In accordance with some embodiments, an electronic device is described. The electronic device comprises: one or more non-visual output devices; a display device; means for detecting that a current time has reached a first predetermined time of a set of one or more predetermined times; means, in response to detecting that the current time has reached the first predetermined time of the set of one or more predetermined times, for: in accordance with a determination that the electronic device is currently configured to display, via the display device, a first watch face, outputting, via the one or more non-visual output devices, a first non-visual alert; and in accordance with a determination that the electronic device is currently configured to display, via the display device, a second watch face that is different from the first watch face, outputting, via the one or more non-visual output devices, a second non-visual alert that is different from the first non-visual alert.

Executable instructions for performing these functions are, optionally, included in a non-transitory computer-readable storage medium or other computer program product configured for execution by one or more processors. Executable instructions for performing these functions are, optionally, included in a transitory computer-readable storage medium or other computer program product configured for execution by one or more processors.

Thus, devices are provided with faster, more efficient methods and interfaces for managing output of the current time, thereby increasing the effectiveness, efficiency, and user satisfaction with such devices. Such methods and interfaces may complement or replace other methods for managing output of the current time.

DESCRIPTION OF THE FIGURES

For a better understanding of the various described embodiments, reference should be made to the Description of Embodiments below, in conjunction with the following drawings in which like reference numerals refer to corresponding parts throughout the figures.

FIGS. 7A-7C are a flow diagram illustrating a method for managing output of a non-visual indication of a current time, in accordance with some embodiments.

FIGS. 8A-8H illustrate exemplary user interfaces for managing output of a non-visual alert at a predetermined time(s), in accordance with some embodiments.

FIGS. 9A-9B are a flow diagram illustrating a method for managing output of a non-visual alert at a predetermined time(s), in accordance with some embodiments.

DESCRIPTION OF EMBODIMENTS

The following description sets forth exemplary methods, parameters, and the like. It should be recognized, however, that such description is not intended as a limitation on the scope of the present disclosure but is instead provided as a description of exemplary embodiments.

There is a need for electronic devices that provide efficient methods and interfaces for managing output of the current time. For example, there is a need for a discreet and convenient method of providing feedback for current time to a user without notifying surroundings persons of the current time or the user's intentional request for the current time. For another example, there is so a need to impart the time to the user without having to divert the user's attention to a display to view the time. For another example, there is a need for improving accessibility features on electronic devices for low-vision or non-sighted users who are not easily able to view the display. For another example, there is a need to provide an alternative or supplemental approach to the audio output and/or tactile feedback of information, for example for users who are hearing-impaired and/or in loud environments. For another example, there is a need to output the current time or an indication of the current time in an improved manner without significantly increasing burden on the processor and/or battery power consumption. Such techniques can reduce the cognitive burden on a user who accesses device features concerning output of the current time, thereby enhancing productivity. Further, such techniques can reduce processor and battery power otherwise wasted on redundant user inputs.

Figure 6A:
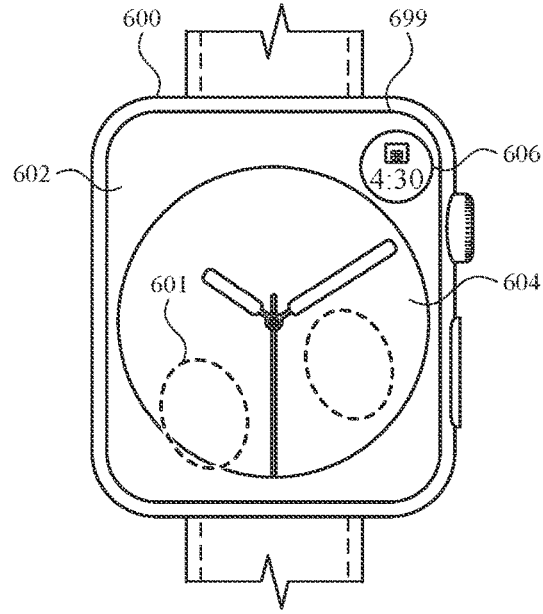
FIGS. 6A-6P illustrate exemplary user interfaces for managing output of a non-visual indication of a current time, in accordance with some embodiments.
Figure 6P:
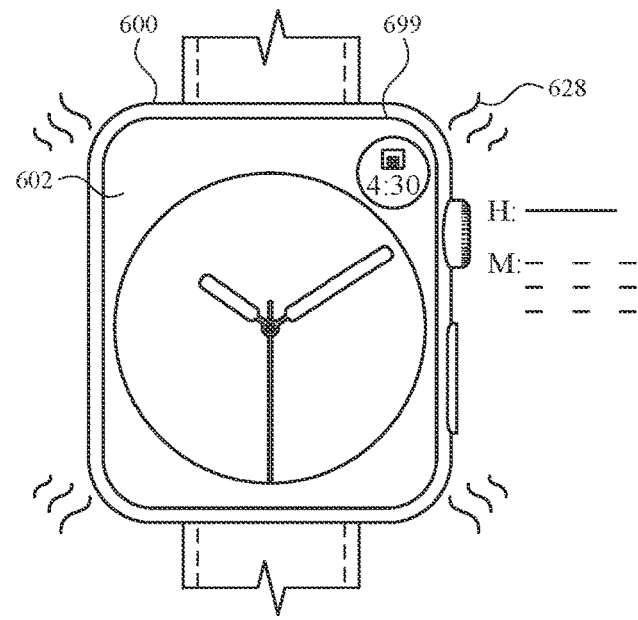
Figure 7A:
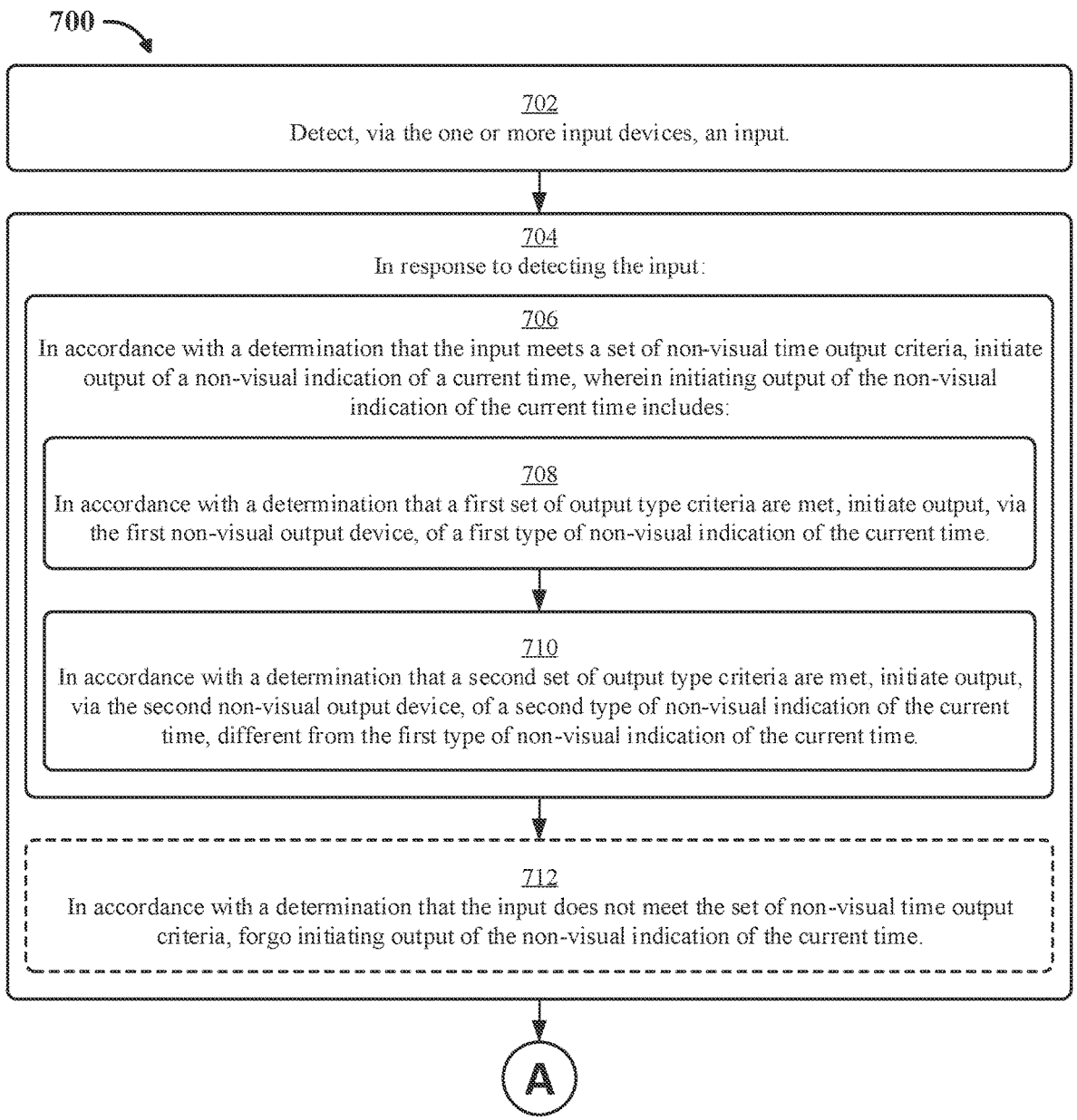

Below, FIGS. 1A-1B, 2, 3, 4A-4B, and 5A-5H provide a description of exemplary devices for performing the techniques for managing event notifications. FIGS. 6A-6P illustrate exemplary user interfaces for managing output of a non-visual indication of a current time, in accordance with some embodiments. FIGS. 7A-7C are a flow diagram illustrating a method for managing output of a non-visual indication of a current time, in accordance with some embodiments. The user interfaces in FIGS. 6A-6P are used to illustrate the processes described below, including the processes in FIGS. 7A-7C. FIGS. 8A-8H illustrate exemplary user interfaces for managing output of a non-visual alert at a predetermined time(s), in accordance with some embodiments. FIGS. 9A-9B are a flow diagram illustrating a method for managing output of a non-visual alert at a predetermined time(s), in accordance with some embodiments. The user interfaces in FIGS. 8A-8H are used to illustrate the processes described below, including the processes in FIGS. 9A-9B.

Although the following description uses terms "first," "second," etc. to describe various elements, these elements should not be limited by the terms. These terms are only used to distinguish one element from another. For example, a first touch could be termed a second touch, and, similarly, a second touch could be termed a first touch, without departing from the scope of the various described embodiments. The first touch and the second touch are both touches, but they are not the same touch.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

The term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Embodiments of electronic devices, user interfaces for such devices, and associated processes for using such devices are described. In some embodiments, the device is a portable communications device, such as a mobile telephone, that also contains other functions, such as PDA and/or music player functions. Exemplary embodiments of portable multifunction devices include, without limitation, the iPhone®, iPod Touch®, and iPad® devices from Apple Inc. of Cupertino, Calif. Other portable electronic devices, such as laptops or tablet computers with touch-sensitive surfaces (e.g., touch screen displays and/or touchpads), are, optionally, used. It should also be understood that, in some embodiments, the device is not a portable communications device, but is a desktop computer with a touch-sensitive surface (e.g., a touch screen display and/or a touchpad).

In the discussion that follows, an electronic device that includes a display and a touch-sensitive surface is described. It should be understood, however, that the electronic device optionally includes one or more other physical user-interface devices, such as a physical keyboard, a mouse, and/or a joystick.

The device typically supports a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, and/or a digital video player application.

The various applications that are executed on the device optionally use at least one common physical user-interface device, such as the touch-sensitive surface. One or more functions of the touch-sensitive surface as well as corresponding information displayed on the device are, optionally, adjusted and/or varied from one application to the next and/or within a respective application. In this way, a common physical architecture (such as the touch-sensitive surface) of the device optionally supports the variety of applications with user interfaces that are intuitive and transparent to the user.

Figure 1A:
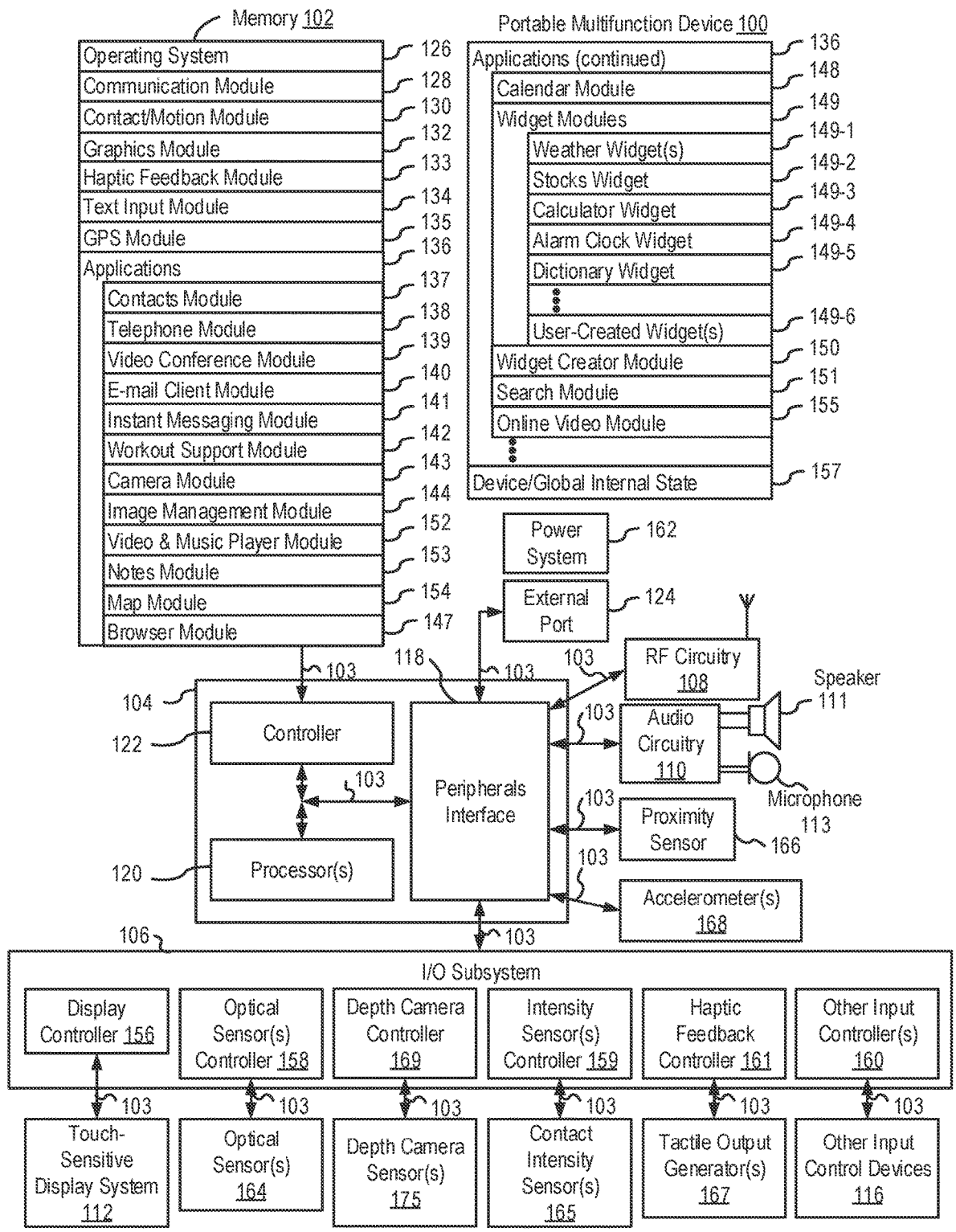
FIG. 1A is a block diagram illustrating a portable multifunction device with a touch-sensitive display in accordance with some embodiments.

Attention is now directed toward embodiments of portable devices with touch-sensitive displays. FIG. 1A is a block diagram illustrating portable multifunction device 100 with touch-sensitive display system 112 in accordance with some embodiments. Touch-sensitive display 112 is sometimes called a "touch screen" for convenience and is sometimes known as or called a "touch-sensitive display system." Device 100 includes memory 102 (which optionally includes one or more computer-readable storage mediums), memory controller 122, one or more processing units (CPUs) 120, peripherals interface 118, RF circuitry 108, audio circuitry 110, speaker 111, microphone 113, input/output (I/O) subsystem 106, other input control devices 116, and external port 124. Device 100 optionally includes one or more optical sensors 164. Device 100 optionally includes one or more contact intensity sensors 165 for detecting intensity of contacts on device 100 (e.g., a touch-sensitive surface such as touch-sensitive display system 112 of device 100). Device 100 optionally includes one or more tactile output generators 167 for generating tactile outputs on device 100 (e.g., generating tactile outputs on a touch-sensitive surface such as touch-sensitive display system 112 of device 100 or touchpad 355 of device 300). These components optionally communicate over one or more communication buses or signal lines 103.

As used in the specification and claims, the term "intensity" of a contact on a touch-sensitive surface refers to the force or pressure (force per unit area) of a contact (e.g., a finger contact) on the touch-sensitive surface, or to a substitute (proxy) for the force or pressure of a contact on the touch-sensitive surface. The intensity of a contact has a range of values that includes at least four distinct values and more typically includes hundreds of distinct values (e.g., at least 256). Intensity of a contact is, optionally, determined (or measured) using various approaches and various sensors or combinations of sensors. For example, one or more force sensors underneath or adjacent to the touch-sensitive surface are, optionally, used to measure force at various points on the touch-sensitive surface. In some implementations, force measurements from multiple force sensors are combined (e.g., a weighted average) to determine an estimated force of a contact. Similarly, a pressure-sensitive tip of a stylus is, optionally, used to determine a pressure of the stylus on the touch-sensitive surface. Alternatively, the size of the contact area detected on the touch-sensitive surface and/or changes thereto, the capacitance of the touch-sensitive surface proximate to the contact and/or changes thereto, and/or the resistance of the touch-sensitive surface proximate to the contact and/or changes thereto are, optionally, used as a substitute for the force or pressure of the contact on the touch-sensitive surface. In some implementations, the substitute measurements for contact force or pressure are used directly to determine whether an intensity threshold has been exceeded (e.g., the intensity threshold is described in units corresponding to the substitute measurements). In some implementations, the substitute measurements for contact force or pressure are converted to an estimated force or pressure, and the estimated force or pressure is used to determine whether an intensity threshold has been exceeded (e.g., the intensity threshold is a pressure threshold measured in units of pressure). Using the intensity of a contact as an attribute of a user input allows for user access to additional device functionality that may otherwise not be accessible by the user on a reduced-size device with limited real estate for displaying affordances (e.g., on a touch-sensitive display) and/or receiving user input (e.g., via a touch-sensitive display, a touch-sensitive surface, or a physical/mechanical control such as a knob or a button).

As used in the specification and claims, the term "tactile output" refers to physical displacement of a device relative to a previous position of the device, physical displacement of a component (e.g., a touch-sensitive surface) of a device relative to another component (e.g., housing) of the device, or displacement of the component relative to a center of mass of the device that will be detected by a user with the user's sense of touch. For example, in situations where the device or the component of the device is in contact with a surface of a user that is sensitive to touch (e.g., a finger, palm, or other part of a user's hand), the tactile output generated by the physical displacement will be interpreted by the user as a tactile sensation corresponding to a perceived change in physical characteristics of the device or the component of the device. For example, movement of a touch-sensitive surface (e.g., a touch-sensitive display or trackpad) is, optionally, interpreted by the user as a "down click" or "up click" of a physical actuator button. In some cases, a user will feel a tactile sensation such as an "down click" or "up click" even when there is no movement of a physical actuator button associated with the touch-sensitive surface that is physically pressed (e.g., displaced) by the user's movements. As another example, movement of the touch-sensitive surface is, optionally, interpreted or sensed by the user as "roughness" of the touch-sensitive surface, even when there is no change in smoothness of the touch-sensitive surface. While such interpretations of touch by a user will be subject to the individualized sensory perceptions of the user, there are many sensory perceptions of touch that are common to a large majority of users. Thus, when a tactile output is described as corresponding to a particular sensory perception of a user (e.g., an "up click," a "down click," "roughness"), unless otherwise stated, the generated tactile output corresponds to physical displacement of the device or a component thereof that will generate the described sensory perception for a typical (or average) user.

It should be appreciated that device 100 is only one example of a portable multifunction device, and that device 100 optionally has more or fewer components than shown, optionally combines two or more components, or optionally has a different configuration or arrangement of the components. The various components shown in FIG. 1A are implemented in hardware, software, or a combination of both hardware and software, including one or more signal processing and/or application-specific integrated circuits.

Memory 102 optionally includes high-speed random access memory and optionally also includes non-volatile memory, such as one or more magnetic disk storage devices, flash memory devices, or other non-volatile solid-state memory devices. Memory controller 122 optionally controls access to memory 102 by other components of device 100.

Peripherals interface 118 can be used to couple input and output peripherals of the device to CPU 120 and memory 102. The one or more processors 120 run or execute various software programs and/or sets of instructions stored in memory 102 to perform various functions for device 100 and to process data. In some embodiments, peripherals interface 118, CPU 120, and memory controller 122 are, optionally, implemented on a single chip, such as chip 104. In some other embodiments, they are, optionally, implemented on separate chips.

RF (radio frequency) circuitry 108 receives and sends RF signals, also called electromagnetic signals. RF circuitry 108 converts electrical signals to/from electromagnetic signals and communicates with communications networks and other communications devices via the electromagnetic signals. RF circuitry 108 optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 108 optionally communicates with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The RF circuitry 108 optionally includes well-known circuitry for detecting near field communication (NFC) fields, such as by a short-range communication radio. The wireless communication optionally uses any of a plurality of communications standards, protocols, and technologies, including but not limited to Global System for Mobile Communications (GSM), Enhanced Data GSM Environment (EDGE), high-speed downlink packet access (HSDPA), high-speed uplink packet access (HSUPA), Evolution, Data-Only (EV-DO), HSPA, HSPA+, Dual-Cell HSPA (DC-HSPDA), long term evolution (LTE), near field communication (NFC), wideband code division multiple access (W-CDMA), code division multiple access (CDMA), time division multiple access (TDMA), Bluetooth, Bluetooth Low Energy (BTLE), Wireless Fidelity (Wi-Fi) (e.g., IEEE 802.11a, IEEE 802.11b, IEEE 802.11g, IEEE 802.11n, and/or IEEE 802.11ac), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 110, speaker 111, and microphone 113 provide an audio interface between a user and device 100. Audio circuitry 110 receives audio data from peripherals interface 118, converts the audio data to an electrical signal, and transmits the electrical signal to speaker 111. Speaker 111 converts the electrical signal to human-audible sound waves. Audio circuitry 110 also receives electrical signals converted by microphone 113 from sound waves. Audio circuitry 110 converts the electrical signal to audio data and transmits the audio data to peripherals interface 118 for processing. Audio data is, optionally, retrieved from and/or transmitted to memory 102 and/or RF circuitry 108 by peripherals interface 118. In some embodiments, audio circuitry 110 also includes a headset jack (e.g., 212, FIG. 2). The headset jack provides an interface between audio circuitry 110 and removable audio input/output peripherals, such as output-only headphones or a headset with both output (e.g., a headphone for one or both ears) and input (e.g., a microphone).

I/O subsystem 106 couples input/output peripherals on device 100, such as touch screen 112 and other input control devices 116, to peripherals interface 118. I/O subsystem 106 optionally includes display controller 156, optical sensor controller 158, depth camera controller 169, intensity sensor controller 159, haptic feedback controller 161, and one or more input controllers 160 for other input or control devices. The one or more input controllers 160 receive/send electrical signals from/to other input control devices 116. The other input control devices 116 optionally include physical buttons (e.g., push buttons, rocker buttons, etc.), dials, slider switches, joysticks, click wheels, and so forth. In some alternate embodiments, input controller(s) 160 are, optionally, coupled to any (or none) of the following: a keyboard, an infrared port, a USB port, and a pointer device such as a mouse. The one or more buttons (e.g., 208, FIG. 2) optionally include an up/down button for volume control of speaker 111 and/or microphone 113. The one or more buttons optionally include a push button (e.g., 206, FIG. 2).

A quick press of the push button optionally disengages a lock of touch screen 112 or optionally begins a process that uses gestures on the touch screen to unlock the device, as described in U.S. patent application Ser. No. 11/322,549, "Unlocking a Device by Performing Gestures on an Unlock Image," filed Dec. 23, 2005, U.S. Pat. No. 7,657,849, which is hereby incorporated by reference in its entirety. A longer press of the push button (e.g., 206) optionally turns power to device 100 on or off. The functionality of one or more of the buttons are, optionally, user-customizable. Touch screen 112 is used to implement virtual or soft buttons and one or more soft keyboards.

Touch-sensitive display 112 provides an input interface and an output interface between the device and a user. Display controller 156 receives and/or sends electrical signals from/to touch screen 112. Touch screen 112 displays visual output to the user. The visual output optionally includes graphics, text, icons, video, and any combination thereof (collectively termed "graphics"). In some embodiments, some or all of the visual output optionally corresponds to user-interface objects.

Touch screen 112 has a touch-sensitive surface, sensor, or set of sensors that accepts input from the user based on haptic and/or tactile contact. Touch screen 112 and display controller 156 (along with any associated modules and/or sets of instructions in memory 102) detect contact (and any movement or breaking of the contact) on touch screen 112 and convert the detected contact into interaction with user-interface objects (e.g., one or more soft keys, icons, web pages, or images) that are displayed on touch screen 112. In an exemplary embodiment, a point of contact between touch screen 112 and the user corresponds to a finger of the user.

Touch screen 112 optionally uses LCD (liquid crystal display) technology, LPD (light emitting polymer display) technology, or LED (light emitting diode) technology, although other display technologies are used in other embodiments. Touch screen 112 and display controller 156 optionally detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch screen 112. In an exemplary embodiment, projected mutual capacitance sensing technology is used, such as that found in the iPhone® and iPod Touch® from Apple Inc. of Cupertino, Calif.

A touch-sensitive display in some embodiments of touch screen 112 is, optionally, analogous to the multi-touch sensitive touchpads described in the following U.S. Pat. No. 6,323,846 (Westerman et al.), U.S. Pat. No. 6,570,557 (Westerman et al.), and/or U.S. Pat. No. 6,677,932 (Westerman), and/or U.S. Patent Publication 2002/0015024A1, each of which is hereby incorporated by reference in its entirety. However, touch screen 112 displays visual output from device 100, whereas touch-sensitive touchpads do not provide visual output.

A touch-sensitive display in some embodiments of touch screen 112 is described in the following applications: (1) U.S. patent application Ser. No. 11/381,313, "Multipoint Touch Surface Controller," filed May 2, 2006; (2) U.S. patent application Ser. No. 10/840,862, "Multipoint Touchscreen," filed May 6, 2004; (3) U.S. patent application Ser. No. 10/903,964, "Gestures For Touch Sensitive Input Devices," filed Jul. 30, 2004; (4) U.S. patent application Ser. No. 11/048,264, "Gestures For Touch Sensitive Input Devices," filed Jan. 31, 2005; (5) U.S. patent application Ser. No. 11/038,590, "Mode-Based Graphical User Interfaces For Touch Sensitive Input Devices," filed Jan. 18, 2005; (6) U.S. patent application Ser. No. 11/228,758, "Virtual Input Device Placement On A Touch Screen User Interface," filed Sep. 16, 2005; (7) U.S. patent application Ser. No. 11/228,700, "Operation Of A Computer With A Touch Screen Interface," filed Sep. 16, 2005; (8) U.S. patent application Ser. No. 11/228,737, "Activating Virtual Keys Of A Touch-Screen Virtual Keyboard," filed Sep. 16, 2005; and (9) U.S. patent application Ser. No. 11/367,749, "Multi-Functional Hand-Held Device," filed Mar. 3, 2006. All of these applications are incorporated by reference herein in their entirety.

Touch screen 112 optionally has a video resolution in excess of 100 dpi. In some embodiments, the touch screen has a video resolution of approximately 160 dpi. The user optionally makes contact with touch screen 112 using any suitable object or appendage, such as a stylus, a finger, and so forth. In some embodiments, the user interface is designed to work primarily with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 100 optionally includes a touchpad for activating or deactivating particular functions. In some embodiments, the touchpad is a touch-sensitive area of the device that, unlike the touch screen, does not display visual output. The touchpad is, optionally, a touch-sensitive surface that is separate from touch screen 112 or an extension of the touch-sensitive surface formed by the touch screen.

Device 100 also includes power system 162 for powering the various components. Power system 162 optionally includes a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 100 optionally also includes one or more optical sensors 164. FIG. 1A shows an optical sensor coupled to optical sensor controller 158 in I/O subsystem 106. Optical sensor 164 optionally includes charge-coupled device (CCD) or complementary metal-oxide semiconductor (CMOS) phototransistors. Optical sensor 164 receives light from the environment, projected through one or more lenses, and converts the light to data representing an image. In conjunction with imaging module 143 (also called a camera module), optical sensor 164 optionally captures still images or video. In some embodiments, an optical sensor is located on the back of device 100, opposite touch screen display 112 on the front of the device so that the touch screen display is enabled for use as a viewfinder for still and/or video image acquisition. In some embodiments, an optical sensor is located on the front of the device so that the user's image is, optionally, obtained for video conferencing while the user views the other video conference participants on the touch screen display. In some embodiments, the position of optical sensor 164 can be changed by the user (e.g., by rotating the lens and the sensor in the device housing) so that a single optical sensor 164 is used along with the touch screen display for both video conferencing and still and/or video image acquisition.

Device 100 optionally also includes one or more depth camera sensors 175. FIG. 1A shows a depth camera sensor coupled to depth camera controller 169 in I/O subsystem 106. Depth camera sensor 175 receives data from the environment to create a three dimensional model of an object (e.g., a face) within a scene from a viewpoint (e.g., a depth camera sensor). In some embodiments, in conjunction with imaging module 143 (also called a camera module), depth camera sensor 175 is optionally used to determine a depth map of different portions of an image captured by the imaging module 143. In some embodiments, a depth camera sensor is located on the front of device 100 so that the user's image with depth information is, optionally, obtained for video conferencing while the user views the other video conference participants on the touch screen display and to capture selfies with depth map data. In some embodiments, the depth camera sensor 175 is located on the back of device, or on the back and the front of the device 100. In some embodiments, the position of depth camera sensor 175 can be changed by the user (e.g., by rotating the lens and the sensor in the device housing) so that a depth camera sensor 175 is used along with the touch screen display for both video conferencing and still and/or video image acquisition.

Device 100 optionally also includes one or more contact intensity sensors 165. FIG. 1A shows a contact intensity sensor coupled to intensity sensor controller 159 in I/O subsystem 106. Contact intensity sensor 165 optionally includes one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a touch-sensitive surface). Contact intensity sensor 165 receives contact intensity information (e.g., pressure information or a proxy for pressure information) from the environment. In some embodiments, at least one contact intensity sensor is collocated with, or proximate to, a touch-sensitive surface (e.g., touch-sensitive display system 112). In some embodiments, at least one contact intensity sensor is located on the back of device 100, opposite touch screen display 112, which is located on the front of device 100.

Device 100 optionally also includes one or more proximity sensors 166. FIG. 1A shows proximity sensor 166 coupled to peripherals interface 118. Alternately, proximity sensor 166 is, optionally, coupled to input controller 160 in I/O subsystem 106. Proximity sensor 166 optionally performs as described in U.S. patent application Ser. No. 11/241,839, "Proximity Detector In Handheld Device"; Ser. No. 11/240,788, "Proximity Detector In Handheld Device"; Ser. No. 11/620,702, "Using Ambient Light Sensor To Augment Proximity Sensor Output"; Ser. No. 11/586,862, "Automated Response To And Sensing Of User Activity In Portable Devices"; and Ser. No. 11/638,251, "Methods And Systems For Automatic Configuration Of Peripherals," which are hereby incorporated by reference in their entirety. In some embodiments, the proximity sensor turns off and disables touch screen 112 when the multifunction device is placed near the user's ear (e.g., when the user is making a phone call).

Device 100 optionally also includes one or more tactile output generators 167. FIG. 1A shows a tactile output generator coupled to haptic feedback controller 161 in I/O subsystem 106. Tactile output generator 167 optionally includes one or more electroacoustic devices such as speakers or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the device). Contact intensity sensor 165 receives tactile feedback generation instructions from haptic feedback module 133 and generates tactile outputs on device 100 that are capable of being sensed by a user of device 100. In some embodiments, at least one tactile output generator is collocated with, or proximate to, a touch-sensitive surface (e.g., touch-sensitive display system 112) and, optionally, generates a tactile output by moving the touch-sensitive surface vertically (e.g., in/out of a surface of device 100) or laterally (e.g., back and forth in the same plane as a surface of device 100). In some embodiments, at least one tactile output generator sensor is located on the back of device 100, opposite touch screen display 112, which is located on the front of device 100.

Device 100 optionally also includes one or more accelerometers 168. FIG. 1A shows accelerometer 168 coupled to peripherals interface 118. Alternately, accelerometer 168 is, optionally, coupled to an input controller 160 in I/O subsystem 106. Accelerometer 168 optionally performs as described in U.S. Patent Publication No. 20050190059, "Acceleration-based Theft Detection System for Portable Electronic Devices," and U.S. Patent Publication No. 20060017692, "Methods And Apparatuses For Operating A Portable Device Based On An Accelerometer," both of which are incorporated by reference herein in their entirety. In some embodiments, information is displayed on the touch screen display in a portrait view or a landscape view based on an analysis of data received from the one or more accelerometers. Device 100 optionally includes, in addition to accelerometer(s) 168, a magnetometer and a GPS (or GLONASS or other global navigation system) receiver for obtaining information concerning the location and orientation (e.g., portrait or landscape) of device 100.

Figure 3:
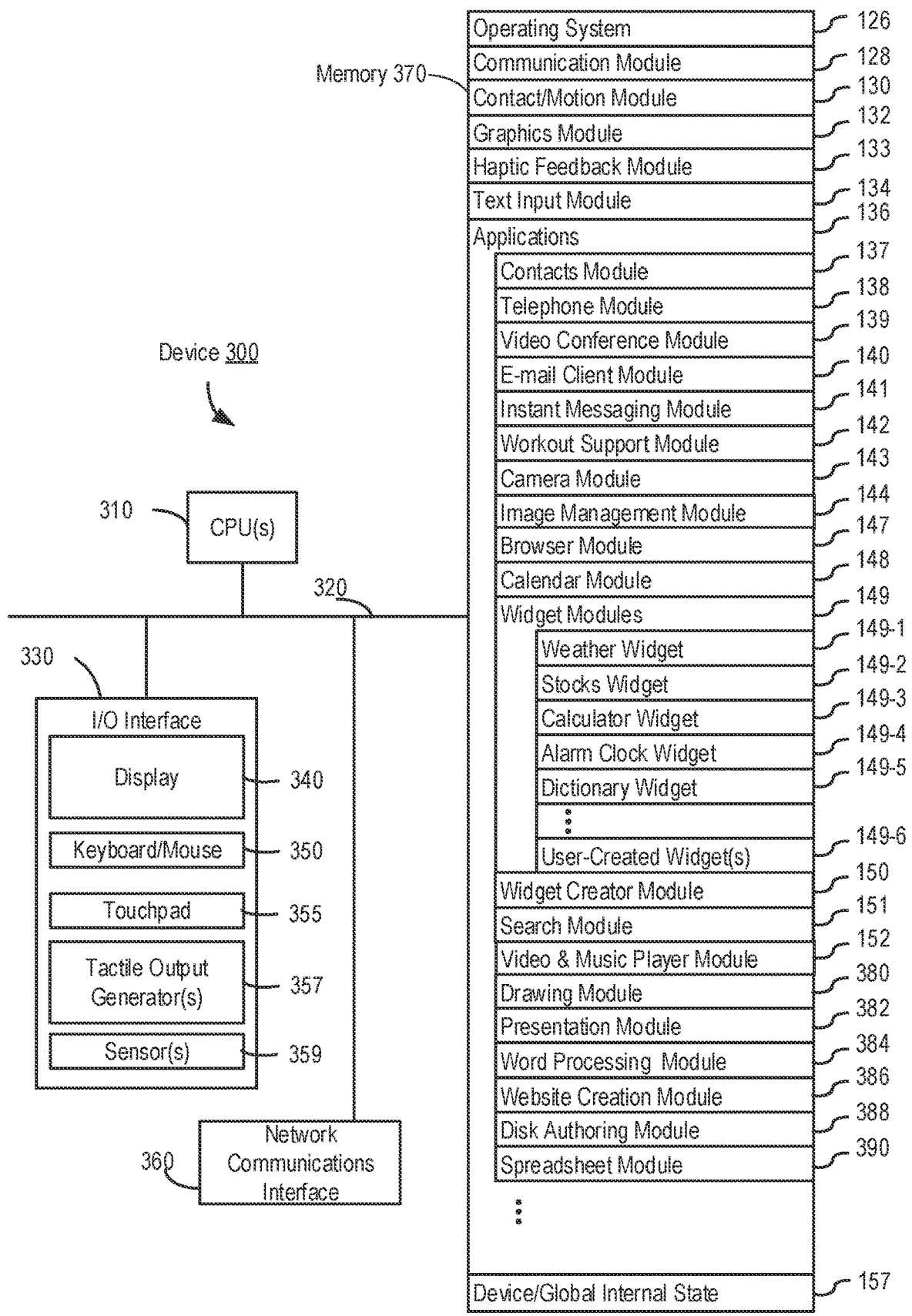
FIG. 3 is a block diagram of an exemplary multifunction device with a display and a touch-sensitive surface in accordance with some embodiments.

In some embodiments, the software components stored in memory 102 include operating system 126, communication module (or set of instructions) 128, contact/motion module (or set of instructions) 130, graphics module (or set of instructions) 132, text input module (or set of instructions) 134, Global Positioning System (GPS) module (or set of instructions) 135, and applications (or sets of instructions) 136. Furthermore, in some embodiments, memory 102 (FIG. 1A) or 370 (FIG. 3) stores device/global internal state 157, as shown in FIGS. 1A and 3. Device/global internal state 157 includes one or more of: active application state, indicating which applications, if any, are currently active; display state, indicating what applications, views or other information occupy various regions of touch screen display 112; sensor state, including information obtained from the device's various sensors and input control devices 116; and location information concerning the device's location and/or attitude.

Operating system 126 (e.g., Darwin, RTXC, LINUX, UNIX, OS X, iOS, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 128 facilitates communication with other devices over one or more external ports 124 and also includes various software components for handling data received by RF circuitry 108 and/or external port 124. External port 124 (e.g., Universal Serial Bus (USB), FIREWIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with, the 30-pin connector used on iPod® (trademark of Apple Inc.) devices.

Contact/motion module 130 optionally detects contact with touch screen 112 (in conjunction with display controller 156) and other touch-sensitive devices (e.g., a touchpad or physical click wheel). Contact/motion module 130 includes various software components for performing various operations related to detection of contact, such as determining if contact has occurred (e.g., detecting a finger-down event), determining an intensity of the contact (e.g., the force or pressure of the contact or a substitute for the force or pressure of the contact), determining if there is movement of the contact and tracking the movement across the touch-sensitive surface (e.g., detecting one or more finger-dragging events), and determining if the contact has ceased (e.g., detecting a finger-up event or a break in contact). Contact/motion module 130 receives contact data from the touch-sensitive surface. Determining movement of the point of contact, which is represented by a series of contact data, optionally includes determining speed (magnitude), velocity (magnitude and direction), and/or an acceleration (a change in magnitude and/or direction) of the point of contact. These operations are, optionally, applied to single contacts (e.g., one finger contacts) or to multiple simultaneous contacts (e.g., "multitouch"/multiple finger contacts). In some embodiments, contact/motion module 130 and display controller 156 detect contact on a touchpad.

In some embodiments, contact/motion module 130 uses a set of one or more intensity thresholds to determine whether an operation has been performed by a user (e.g., to determine whether a user has "clicked" on an icon). In some embodiments, at least a subset of the intensity thresholds are determined in accordance with software parameters (e.g., the intensity thresholds are not determined by the activation thresholds of particular physical actuators and can be adjusted without changing the physical hardware of device 100). For example, a mouse "click" threshold of a trackpad or touch screen display can be set to any of a large range of predefined threshold values without changing the trackpad or touch screen display hardware. Additionally, in some implementations, a user of the device is provided with software settings for adjusting one or more of the set of intensity thresholds (e.g., by adjusting individual intensity thresholds and/or by adjusting a plurality of intensity thresholds at once with a system-level click "intensity" parameter).

Contact/motion module 130 optionally detects a gesture input by a user. Different gestures on the touch-sensitive surface have different contact patterns (e.g., different motions, timings, and/or intensities of detected contacts). Thus, a gesture is, optionally, detected by detecting a particular contact pattern. For example, detecting a finger tap gesture includes detecting a finger-down event followed by detecting a finger-up (liftoff) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (liftoff) event.

Graphics module 132 includes various known software components for rendering and displaying graphics on touch screen 112 or other display, including components for changing the visual impact (e.g., brightness, transparency, saturation, contrast, or other visual property) of graphics that are displayed. As used herein, the term "graphics" includes any object that can be displayed to a user, including, without limitation, text, web pages, icons (such as user-interface objects including soft keys), digital images, videos, animations, and the like.

In some embodiments, graphics module 132 stores data representing graphics to be used. Each graphic is, optionally, assigned a corresponding code. Graphics module 132 receives, from applications etc., one or more codes specifying graphics to be displayed along with, if necessary, coordinate data and other graphic property data, and then generates screen image data to output to display controller 156.

Haptic feedback module 133 includes various software components for generating instructions used by tactile output generator(s) 167 to produce tactile outputs at one or more locations on device 100 in response to user interactions with device 100.

Text input module 134, which is, optionally, a component of graphics module 132, provides soft keyboards for entering text in various applications (e.g., contacts 137, e-mail 140, IM 141, browser 147, and any other application that needs text input).

GPS module 135 determines the location of the device and provides this information for use in various applications (e.g., to telephone 138 for use in location-based dialing; to camera 143 as picture/video metadata; and to applications that provide location-based services such as weather widgets, local yellow page widgets, and map/navigation widgets).

Applications 136 optionally include the following modules (or sets of instructions), or a subset or superset thereof:
  Contacts module 137 (sometimes called an address book or contact list);
  Telephone module 138;
  Video conference module 139;
  E-mail client module 140;
  Instant messaging (IM) module 141;
  Workout support module 142;
  Camera module 143 for still and/or video images;
  Image management module 144;
  Video player module;
  Music player module;
  Browser module 147;
  Calendar module 148;
  Widget modules 149, which optionally include one or more of: weather widget 149-1, stocks widget 149-2, calculator widget 149-3, alarm clock widget 149-4, dictionary widget 149-5, and other widgets obtained by the user, as well as user-created widgets 149-6;
  Widget creator module 150 for making user-created widgets 149-6;
  Search module 151;
  Video and music player module 152, which merges video player module and music player module;
  Notes module 153;
  Map module 154; and/or
  Online video module 155.

Examples of other applications 136 that are, optionally, stored in memory 102 include other word processing applications, other image editing applications, drawing applications, presentation applications, JAVA-enabled applications, encryption, digital rights management, voice recognition, and voice replication.

In conjunction with touch screen 112, display controller 156, contact/motion module 130, graphics module 132, and text input module 134, contacts module 137 are, optionally, used to manage an address book or contact list (e.g., stored in application internal state 192 of contacts module 137 in memory 102 or memory 370), including: adding name(s) to the address book; deleting name(s) from the address book; associating telephone number(s), e-mail address(es), physical address(es) or other information with a name; associating an image with a name; categorizing and sorting names; providing telephone numbers or e-mail addresses to initiate and/or facilitate communications by telephone 138, video conference module 139, e-mail 140, or IM 141; and so forth.

In conjunction with RF circuitry 108, audio circuitry 110, speaker 111, microphone 113, touch screen 112, display controller 156, contact/motion module 130, graphics module 132, and text input module 134, telephone module 138 are optionally, used to enter a sequence of characters corresponding to a telephone number, access one or more telephone numbers in contacts module 137, modify a telephone number that has been entered, dial a respective telephone number, conduct a conversation, and disconnect or hang up when the conversation is completed. As noted above, the wireless communication optionally uses any of a plurality of communications standards, protocols, and technologies.

In conjunction with RF circuitry 108, audio circuitry 110, speaker 111, microphone 113, touch screen 112, display controller 156, optical sensor 164, optical sensor controller 158, contact/motion module 130, graphics module 132, text input module 134, contacts module 137, and telephone module 138, video conference module 139 includes executable instructions to initiate, conduct, and terminate a video conference between a user and one or more other participants in accordance with user instructions.

In conjunction with RF circuitry 108, touch screen 112, display controller 156, contact/motion module 130, graphics module 132, and text input module 134, e-mail client module 140 includes executable instructions to create, send, receive, and manage e-mail in response to user instructions. In conjunction with image management module 144, e-mail client module 140 makes it very easy to create and send e-mails with still or video images taken with camera module 143.

In conjunction with RF circuitry 108, touch screen 112, display controller 156, contact/motion module 130, graphics module 132, and text input module 134, the instant messaging module 141 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, or IMPS for Internet-based instant messages), to receive instant messages, and to view received instant messages. In some embodiments, transmitted and/or received instant messages optionally include graphics, photos, audio files, video files and/or other attachments as are supported in an MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, or IMPS).

In conjunction with RF circuitry 108, touch screen 112, display controller 156, contact/motion module 130, graphics module 132, text input module 134, GPS module 135, map module 154, and music player module, workout support module 142 includes executable instructions to create workouts (e.g., with time, distance, and/or calorie burning goals); communicate with workout sensors (sports devices); receive workout sensor data; calibrate sensors used to monitor a workout; select and play music for a workout; and display, store, and transmit workout data.

In conjunction with touch screen 112, display controller 156, optical sensor(s) 164, optical sensor controller 158, contact/motion module 130, graphics module 132, and image management module 144, camera module 143 includes executable instructions to capture still images or video (including a video stream) and store them into memory 102, modify characteristics of a still image or video, or delete a still image or video from memory 102.

In conjunction with touch screen 112, display controller 156, contact/motion module 130, graphics module 132, text input module 134, and camera module 143, image management module 144 includes executable instructions to arrange, modify (e.g., edit), or otherwise manipulate, label, delete, present (e.g., in a digital slide show or album), and store still and/or video images.

In conjunction with RF circuitry 108, touch screen 112, display controller 156, contact/motion module 130, graphics module 132, and text input module 134, browser module 147 includes executable instructions to browse the Internet in accordance with user instructions, including searching, linking to, receiving, and displaying web pages or portions thereof, as well as attachments and other files linked to web pages.

In conjunction with RF circuitry 108, touch screen 112, display controller 156, contact/motion module 130, graphics module 132, text input module 134, e-mail client module 140, and browser module 147, calendar module 148 includes executable instructions to create, display, modify, and store calendars and data associated with calendars (e.g., calendar entries, to-do lists, etc.) in accordance with user instructions.

In conjunction with RF circuitry 108, touch screen 112, display controller 156, contact/motion module 130, graphics module 132, text input module 134, and browser module 147, widget modules 149 are mini-applications that are, optionally, downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 108, touch screen 112, display controller 156, contact/motion module 130, graphics module 132, text input module 134, and browser module 147, the widget creator module 150 are, optionally, used by a user to create widgets (e.g., turning a user-specified portion of a web page into a widget).

In conjunction with touch screen 112, display controller 156, contact/motion module 130, graphics module 132, and text input module 134, search module 151 includes executable instructions to search for text, music, sound, image, video, and/or other files in memory 102 that match one or more search criteria (e.g., one or more user-specified search terms) in accordance with user instructions.

In conjunction with touch screen 112, display controller 156, contact/motion module 130, graphics module 132, audio circuitry 110, speaker 111, RF circuitry 108, and browser module 147, video and music player module 152 includes executable instructions that allow the user to download and play back recorded music and other sound files stored in one or more file formats, such as MP3 or AAC files, and executable instructions to display, present, or otherwise play back videos (e.g., on touch screen 112 or on an external, connected display via external port 124). In some embodiments, device 100 optionally includes the functionality of an MP3 player, such as an iPod (trademark of Apple Inc.).

In conjunction with touch screen 112, display controller 156, contact/motion module 130, graphics module 132, and text input module 134, notes module 153 includes executable instructions to create and manage notes, to-do lists, and the like in accordance with user instructions.

In conjunction with RF circuitry 108, touch screen 112, display controller 156, contact/motion module 130, graphics module 132, text input module 134, GPS module 135, and browser module 147, map module 154 are, optionally, used to receive, display, modify, and store maps and data associated with maps (e.g., driving directions, data on stores and other points of interest at or near a particular location, and other location-based data) in accordance with user instructions.

In conjunction with touch screen 112, display controller 156, contact/motion module 130, graphics module 132, audio circuitry 110, speaker 111, RF circuitry 108, text input module 134, e-mail client module 140, and browser module 147, online video module 155 includes instructions that allow the user to access, browse, receive (e.g., by streaming and/or download), play back (e.g., on the touch screen or on an external, connected display via external port 124), send an e-mail with a link to a particular online video, and otherwise manage online videos in one or more file formats, such as H.264. In some embodiments, instant messaging module 141, rather than e-mail client module 140, is used to send a link to a particular online video. Additional description of the online video application can be found in U.S. Provisional Patent Application No. 60/936,562, "Portable Multifunction Device, Method, and Graphical User Interface for Playing Online Videos," filed Jun. 20, 2007, and U.S. patent application Ser. No. 11/968,067, "Portable Multifunction Device, Method, and Graphical User Interface for Playing Online Videos," filed Dec. 31, 2007, the contents of which are hereby incorporated by reference in their entirety.

Each of the above-identified modules and applications corresponds to a set of executable instructions for performing one or more functions described above and the methods described in this application (e.g., the computer-implemented methods and other information processing methods described herein). These modules (e.g., sets of instructions) need not be implemented as separate software programs, procedures, or modules, and thus various subsets of these modules are, optionally, combined or otherwise rearranged in various embodiments. For example, video player module is, optionally, combined with music player module into a single module (e.g., video and music player module 152, FIG. 1A). In some embodiments, memory 102 optionally stores a subset of the modules and data structures identified above. Furthermore, memory 102 optionally stores additional modules and data structures not described above.

In some embodiments, device 100 is a device where operation of a predefined set of functions on the device is performed exclusively through a touch screen and/or a touchpad. By using a touch screen and/or a touchpad as the primary input control device for operation of device 100, the number of physical input control devices (such as push buttons, dials, and the like) on device 100 is, optionally, reduced.

The predefined set of functions that are performed exclusively through a touch screen and/or a touchpad optionally include navigation between user interfaces. In some embodiments, the touchpad, when touched by the user, navigates device 100 to a main, home, or root menu from any user interface that is displayed on device 100. In such embodiments, a "menu button" is implemented using a touchpad. In some other embodiments, the menu button is a physical push button or other physical input control device instead of a touchpad.

Figure 1B:
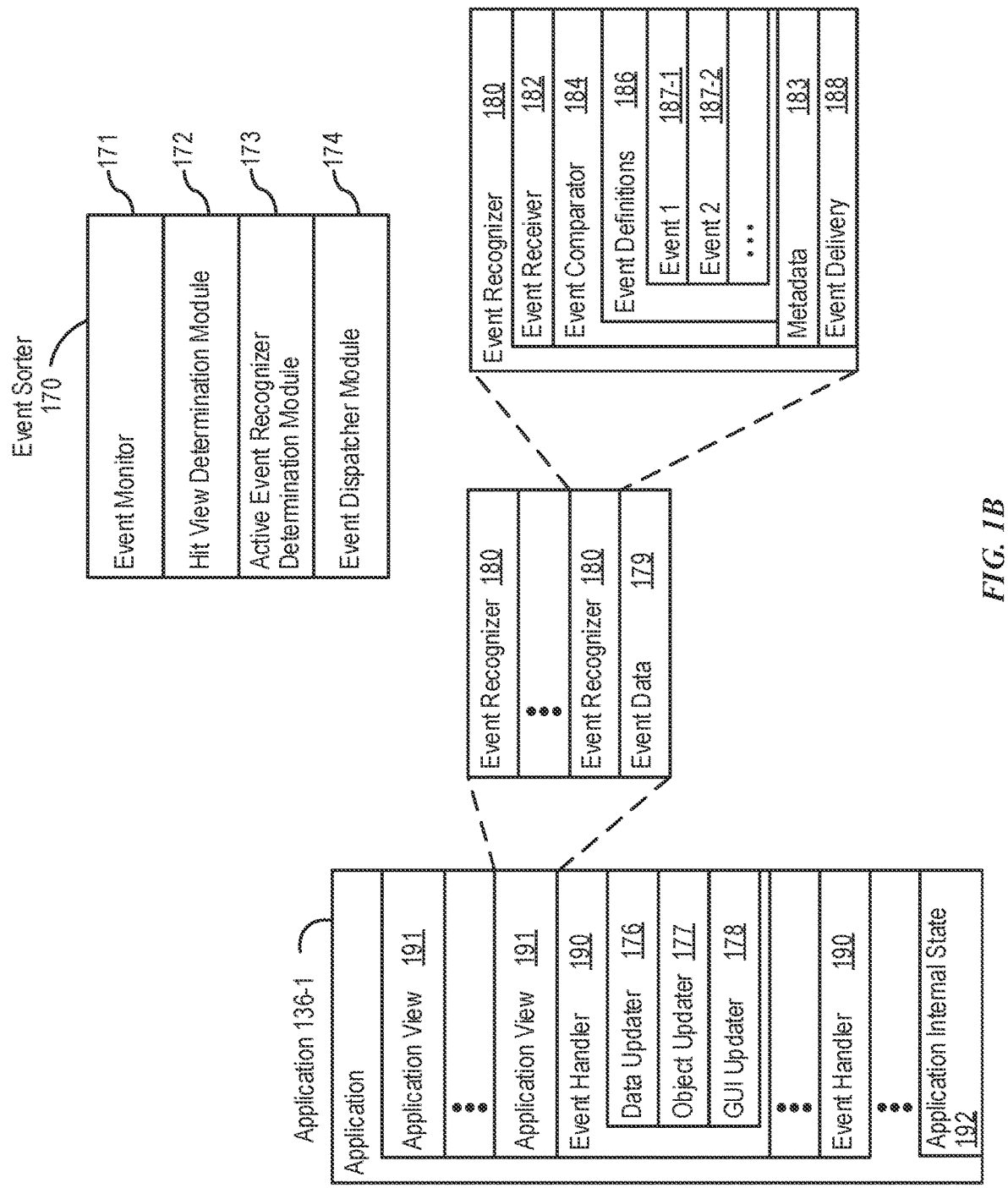
FIG. 1B is a block diagram illustrating exemplary components for event handling in accordance with some embodiments.

FIG. 1B is a block diagram illustrating exemplary components for event handling in accordance with some embodiments. In some embodiments, memory 102 (FIG. 1A) or 370 (FIG. 3) includes event sorter 170 (e.g., in operating system 126) and a respective application 136-1 (e.g., any of the aforementioned applications 137-151, 155, 380-390).

Event sorter 170 receives event information and determines the application 136-1 and application view 191 of application 136-1 to which to deliver the event information. Event sorter 170 includes event monitor 171 and event dispatcher module 174. In some embodiments, application 136-1 includes application internal state 192, which indicates the current application view(s) displayed on touch-sensitive display 112 when the application is active or executing. In some embodiments, device/global internal state 157 is used by event sorter 170 to determine which application(s) is (are) currently active, and application internal state 192 is used by event sorter 170 to determine application views 191 to which to deliver event information.

In some embodiments, application internal state 192 includes additional information, such as one or more of: resume information to be used when application 136-1 resumes execution, user interface state information that indicates information being displayed or that is ready for display by application 136-1, a state queue for enabling the user to go back to a prior state or view of application 136-1, and a redo/undo queue of previous actions taken by the user.

Event monitor 171 receives event information from peripherals interface 118. Event information includes information about a sub-event (e.g., a user touch on touch-sensitive display 112, as part of a multi-touch gesture). Peripherals interface 118 transmits information it receives from I/O subsystem 106 or a sensor, such as proximity sensor 166, accelerometer(s) 168, and/or microphone 113 (through audio circuitry 110). Information that peripherals interface 118 receives from I/O subsystem 106 includes information from touch-sensitive display 112 or a touch-sensitive surface.

In some embodiments, event monitor 171 sends requests to the peripherals interface 118 at predetermined intervals. In response, peripherals interface 118 transmits event information. In other embodiments, peripherals interface 118 transmits event information only when there is a significant event (e.g., receiving an input above a predetermined noise threshold and/or for more than a predetermined duration).

In some embodiments, event sorter 170 also includes a hit view determination module 172 and/or an active event recognizer determination module 173.

Hit view determination module 172 provides software procedures for determining where a sub-event has taken place within one or more views when touch-sensitive display 112 displays more than one view. Views are made up of controls and other elements that a user can see on the display.

Another aspect of the user interface associated with an application is a set of views, sometimes herein called application views or user interface windows, in which information is displayed and touch-based gestures occur. The application views (of a respective application) in which a touch is detected optionally correspond to programmatic levels within a programmatic or view hierarchy of the application. For example, the lowest level view in which a touch is detected is, optionally, called the hit view, and the set of events that are recognized as proper inputs are, optionally, determined based, at least in part, on the hit view of the initial touch that begins a touch-based gesture.

Hit view determination module 172 receives information related to sub-events of a touch-based gesture. When an application has multiple views organized in a hierarchy, hit view determination module 172 identifies a hit view as the lowest view in the hierarchy which should handle the sub-event. In most circumstances, the hit view is the lowest level view in which an initiating sub-event occurs (e.g., the first sub-event in the sequence of sub-events that form an event or potential event). Once the hit view is identified by the hit view determination module 172, the hit view typically receives all sub-events related to the same touch or input source for which it was identified as the hit view.

Active event recognizer determination module 173 determines which view or views within a view hierarchy should receive a particular sequence of sub-events. In some embodiments, active event recognizer determination module 173 determines that only the hit view should receive a particular sequence of sub-events. In other embodiments, active event recognizer determination module 173 determines that all views that include the physical location of a sub-event are actively involved views, and therefore determines that all actively involved views should receive a particular sequence of sub-events. In other embodiments, even if touch sub-events were entirely confined to the area associated with one particular view, views higher in the hierarchy would still remain as actively involved views.

Event dispatcher module 174 dispatches the event information to an event recognizer (e.g., event recognizer 180). In embodiments including active event recognizer determination module 173, event dispatcher module 174 delivers the event information to an event recognizer determined by active event recognizer determination module 173. In some embodiments, event dispatcher module 174 stores in an event queue the event information, which is retrieved by a respective event receiver 182.

In some embodiments, operating system 126 includes event sorter 170. Alternatively, application 136-1 includes event sorter 170. In yet other embodiments, event sorter 170 is a stand-alone module, or a part of another module stored in memory 102, such as contact/motion module 130.

In some embodiments, application 136-1 includes a plurality of event handlers 190 and one or more application views 191, each of which includes instructions for handling touch events that occur within a respective view of the application's user interface. Each application view 191 of the application 136-1 includes one or more event recognizers 180. Typically, a respective application view 191 includes a plurality of event recognizers 180. In other embodiments, one or more of event recognizers 180 are part of a separate module, such as a user interface kit or a higher level object from which application 136-1 inherits methods and other properties. In some embodiments, a respective event handler 190 includes one or more of: data updater 176, object updater 177, GUI updater 178, and/or event data 179 received from event sorter 170. Event handler 190 optionally utilizes or calls data updater 176, object updater 177, or GUI updater 178 to update the application internal state 192. Alternatively, one or more of the application views 191 include one or more respective event handlers 190. Also, in some embodiments, one or more of data updater 176, object updater 177, and GUI updater 178 are included in a respective application view 191.

A respective event recognizer 180 receives event information (e.g., event data 179) from event sorter 170 and identifies an event from the event information. Event recognizer 180 includes event receiver 182 and event comparator 184. In some embodiments, event recognizer 180 also includes at least a subset of: metadata 183, and event delivery instructions 188 (which optionally include sub-event delivery instructions).

Event receiver 182 receives event information from event sorter 170. The event information includes information about a sub-event, for example, a touch or a touch movement. Depending on the sub-event, the event information also includes additional information, such as location of the sub-event. When the sub-event concerns motion of a touch, the event information optionally also includes speed and direction of the sub-event. In some embodiments, events include rotation of the device from one orientation to another (e.g., from a portrait orientation to a landscape orientation, or vice versa), and the event information includes corresponding information about the current orientation (also called device attitude) of the device.

Event comparator 184 compares the event information to predefined event or sub-event definitions and, based on the comparison, determines an event or sub-event, or determines or updates the state of an event or sub-event. In some embodiments, event comparator 184 includes event definitions 186. Event definitions 186 contain definitions of events (e.g., predefined sequences of sub-events), for example, event 1 (187-1), event 2 (187-2), and others. In some embodiments, sub-events in an event (187) include, for example, touch begin, touch end, touch movement, touch cancellation, and multiple touching. In one example, the definition for event 1 (187-1) is a double tap on a displayed object. The double tap, for example, comprises a first touch (touch begin) on the displayed object for a predetermined phase, a first liftoff (touch end) for a predetermined phase, a second touch (touch begin) on the displayed object for a predetermined phase, and a second liftoff (touch end) for a predetermined phase. In another example, the definition for event 2 (187-2) is a dragging on a displayed object. The dragging, for example, comprises a touch (or contact) on the displayed object for a predetermined phase, a movement of the touch across touch-sensitive display 112, and liftoff of the touch (touch end). In some embodiments, the event also includes information for one or more associated event handlers 190.

In some embodiments, event definition 187 includes a definition of an event for a respective user-interface object. In some embodiments, event comparator 184 performs a hit test to determine which user-interface object is associated with a sub-event. For example, in an application view in which three user-interface objects are displayed on touch-sensitive display 112, when a touch is detected on touch-sensitive display 112, event comparator 184 performs a hit test to determine which of the three user-interface objects is associated with the touch (sub-event). If each displayed object is associated with a respective event handler 190, the event comparator uses the result of the hit test to determine which event handler 190 should be activated. For example, event comparator 184 selects an event handler associated with the sub-event and the object triggering the hit test.

In some embodiments, the definition for a respective event (187) also includes delayed actions that delay delivery of the event information until after it has been determined whether the sequence of sub-events does or does not correspond to the event recognizer's event type.

When a respective event recognizer 180 determines that the series of sub-events do not match any of the events in event definitions 186, the respective event recognizer 180 enters an event impossible, event failed, or event ended state, after which it disregards subsequent sub-events of the touch-based gesture. In this situation, other event recognizers, if any, that remain active for the hit view continue to track and process sub-events of an ongoing touch-based gesture.

In some embodiments, a respective event recognizer 180 includes metadata 183 with configurable properties, flags, and/or lists that indicate how the event delivery system should perform sub-event delivery to actively involved event recognizers. In some embodiments, metadata 183 includes configurable properties, flags, and/or lists that indicate how event recognizers interact, or are enabled to interact, with one another. In some embodiments, metadata 183 includes configurable properties, flags, and/or lists that indicate whether sub-events are delivered to varying levels in the view or programmatic hierarchy.

In some embodiments, a respective event recognizer 180 activates event handler 190 associated with an event when one or more particular sub-events of an event are recognized. In some embodiments, a respective event recognizer 180 delivers event information associated with the event to event handler 190. Activating an event handler 190 is distinct from sending (and deferred sending) sub-events to a respective hit view. In some embodiments, event recognizer 180 throws a flag associated with the recognized event, and event handler 190 associated with the flag catches the flag and performs a predefined process.

In some embodiments, event delivery instructions 188 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some embodiments, data updater 176 creates and updates data used in application 136-1. For example, data updater 176 updates the telephone number used in contacts module 137, or stores a video file used in video player module. In some embodiments, object updater 177 creates and updates objects used in application 136-1. For example, object updater 177 creates a new user-interface object or updates the position of a user-interface object. GUI updater 178 updates the GUI. For example, GUI updater 178 prepares display information and sends it to graphics module 132 for display on a touch-sensitive display.

In some embodiments, event handler(s) 190 includes or has access to data updater 176, object updater 177, and GUI updater 178. In some embodiments, data updater 176, object updater 177, and GUI updater 178 are included in a single module of a respective application 136-1 or application view 191. In other embodiments, they are included in two or more software modules.

It shall be understood that the foregoing discussion regarding event handling of user touches on touch-sensitive displays also applies to other forms of user inputs to operate multifunction devices 100 with input devices, not all of which are initiated on touch screens. For example, mouse movement and mouse button presses, optionally coordinated with single or multiple keyboard presses or holds; contact movements such as taps, drags, scrolls, etc. on touchpads; pen stylus inputs; movement of the device; oral instructions; detected eye movements; biometric inputs; and/or any combination thereof are optionally utilized as inputs corresponding to sub-events which define an event to be recognized.

Figure 2:
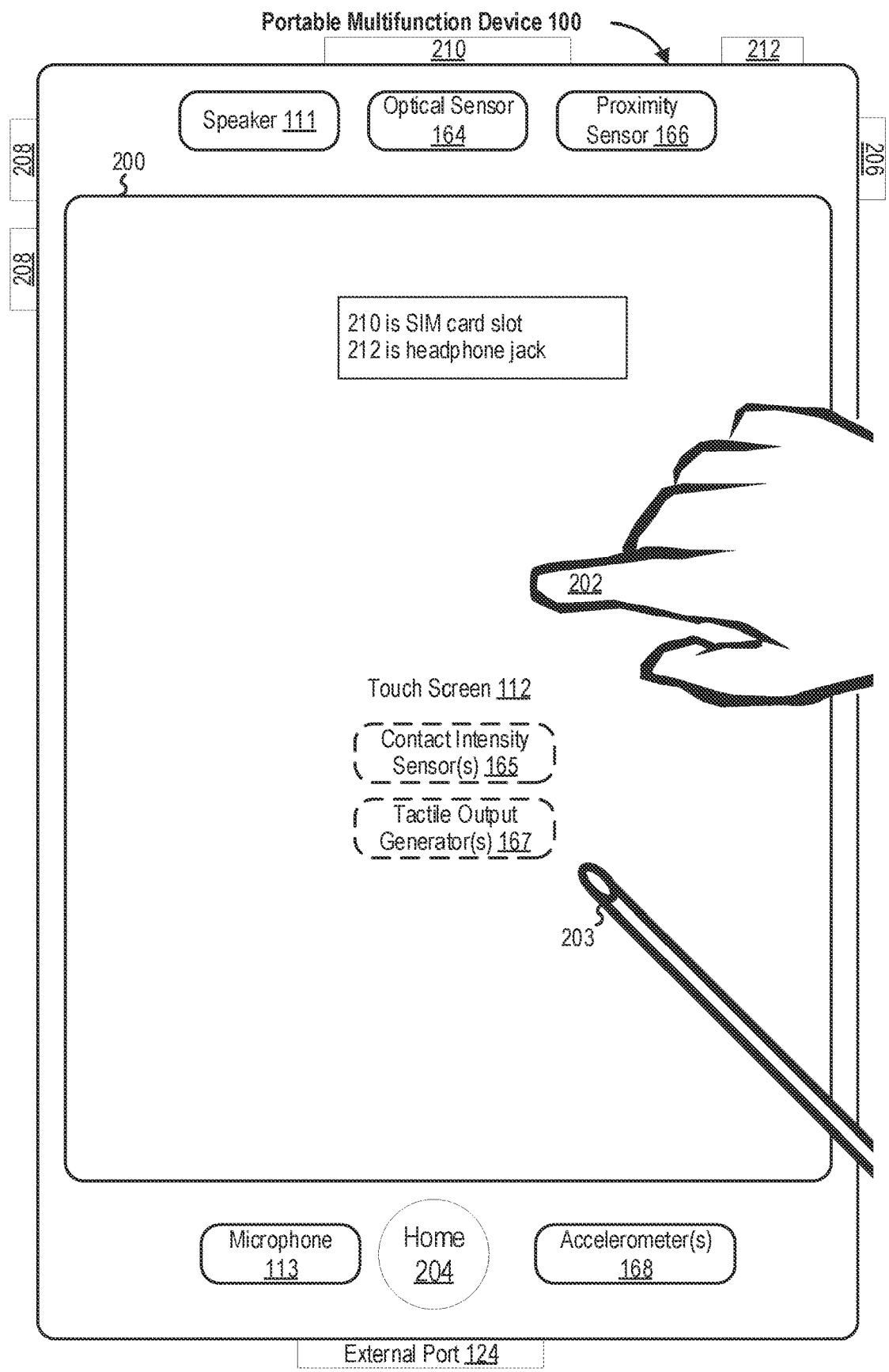
FIG. 2 illustrates a portable multifunction device having a touch screen in accordance with some embodiments.

FIG. 2 illustrates a portable multifunction device 100 having a touch screen 112 in accordance with some embodiments. The touch screen optionally displays one or more graphics within user interface (UI) 200. In this embodiment, as well as others described below, a user is enabled to select one or more of the graphics by making a gesture on the graphics, for example, with one or more fingers 202 (not drawn to scale in the figure) or one or more styluses 203 (not drawn to scale in the figure). In some embodiments, selection of one or more graphics occurs when the user breaks contact with the one or more graphics. In some embodiments, the gesture optionally includes one or more taps, one or more swipes (from left to right, right to left, upward and/or downward), and/or a rolling of a finger (from right to left, left to right, upward and/or downward) that has made contact with device 100. In some implementations or circumstances, inadvertent contact with a graphic does not select the graphic. For example, a swipe gesture that sweeps over an application icon optionally does not select the corresponding application when the gesture corresponding to selection is a tap.

Device 100 optionally also include one or more physical buttons, such as "home" or menu button 204. As described previously, menu button 204 is, optionally, used to navigate to any application 136 in a set of applications that are, optionally, executed on device 100. Alternatively, in some embodiments, the menu button is implemented as a soft key in a GUI displayed on touch screen 112.

In some embodiments, device 100 includes touch screen 112, menu button 204, push button 206 for powering the device on/off and locking the device, volume adjustment button(s) 208, subscriber identity module (SIM) card slot 210, headset jack 212, and docking/charging external port 124. Push button 206 is, optionally, used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 100 also accepts verbal input for activation or deactivation of some functions through microphone 113. Device 100 also, optionally, includes one or more contact intensity sensors 165 for detecting intensity of contacts on touch screen 112 and/or one or more tactile output generators 167 for generating tactile outputs for a user of device 100.

FIG. 3 is a block diagram of an exemplary multifunction device with a display and a touch-sensitive surface in accordance with some embodiments. Device 300 need not be portable. In some embodiments, device 300 is a laptop computer, a desktop computer, a tablet computer, a multimedia player device, a navigation device, an educational device (such as a child's learning toy), a gaming system, or a control device (e.g., a home or industrial controller). Device 300 typically includes one or more processing units (CPUs) 310, one or more network or other communications interfaces 360, memory 370, and one or more communication buses 320 for interconnecting these components. Communication buses 320 optionally include circuitry (sometimes called a chipset) that interconnects and controls communications between system components. Device 300 includes input/output (I/O) interface 330 comprising display 340, which is typically a touch screen display. I/O interface 330 also optionally includes a keyboard and/or mouse (or other pointing device) 350 and touchpad 355, tactile output generator 357 for generating tactile outputs on device 300 (e.g., similar to tactile output generator(s) 167 described above with reference to FIG. 1A), sensors 359 (e.g., optical, acceleration, proximity, touch-sensitive, and/or contact intensity sensors similar to contact intensity sensor(s) 165 described above with reference to FIG. 1A). Memory 370 includes high-speed random access memory, such as DRAM, SRAM, DDR RAM, or other random access solid state memory devices; and optionally includes non-volatile memory, such as one or more magnetic disk storage devices, optical disk storage devices, flash memory devices, or other non-volatile solid state storage devices. Memory 370 optionally includes one or more storage devices remotely located from CPU(s) 310. In some embodiments, memory 370 stores programs, modules, and data structures analogous to the programs, modules, and data structures stored in memory 102 of portable multifunction device 100 (FIG. 1A), or a subset thereof. Furthermore, memory 370 optionally stores additional programs, modules, and data structures not present in memory 102 of portable multifunction device 100. For example, memory 370 of device 300 optionally stores drawing module 380, presentation module 382, word processing module 384, website creation module 386, disk authoring module 388, and/or spreadsheet module 390, while memory 102 of portable multifunction device 100 (FIG. 1A) optionally does not store these modules.

Each of the above-identified elements in FIG. 3 is, optionally, stored in one or more of the previously mentioned memory devices. Each of the above-identified modules corresponds to a set of instructions for performing a function described above. The above-identified modules or programs (e.g., sets of instructions) need not be implemented as separate software programs, procedures, or modules, and thus various subsets of these modules are, optionally, combined or otherwise rearranged in various embodiments. In some embodiments, memory 370 optionally stores a subset of the modules and data structures identified above. Furthermore, memory 370 optionally stores additional modules and data structures not described above.

Attention is now directed towards embodiments of user interfaces that are, optionally, implemented on, for example, portable multifunction device 100.

Figure 4A:
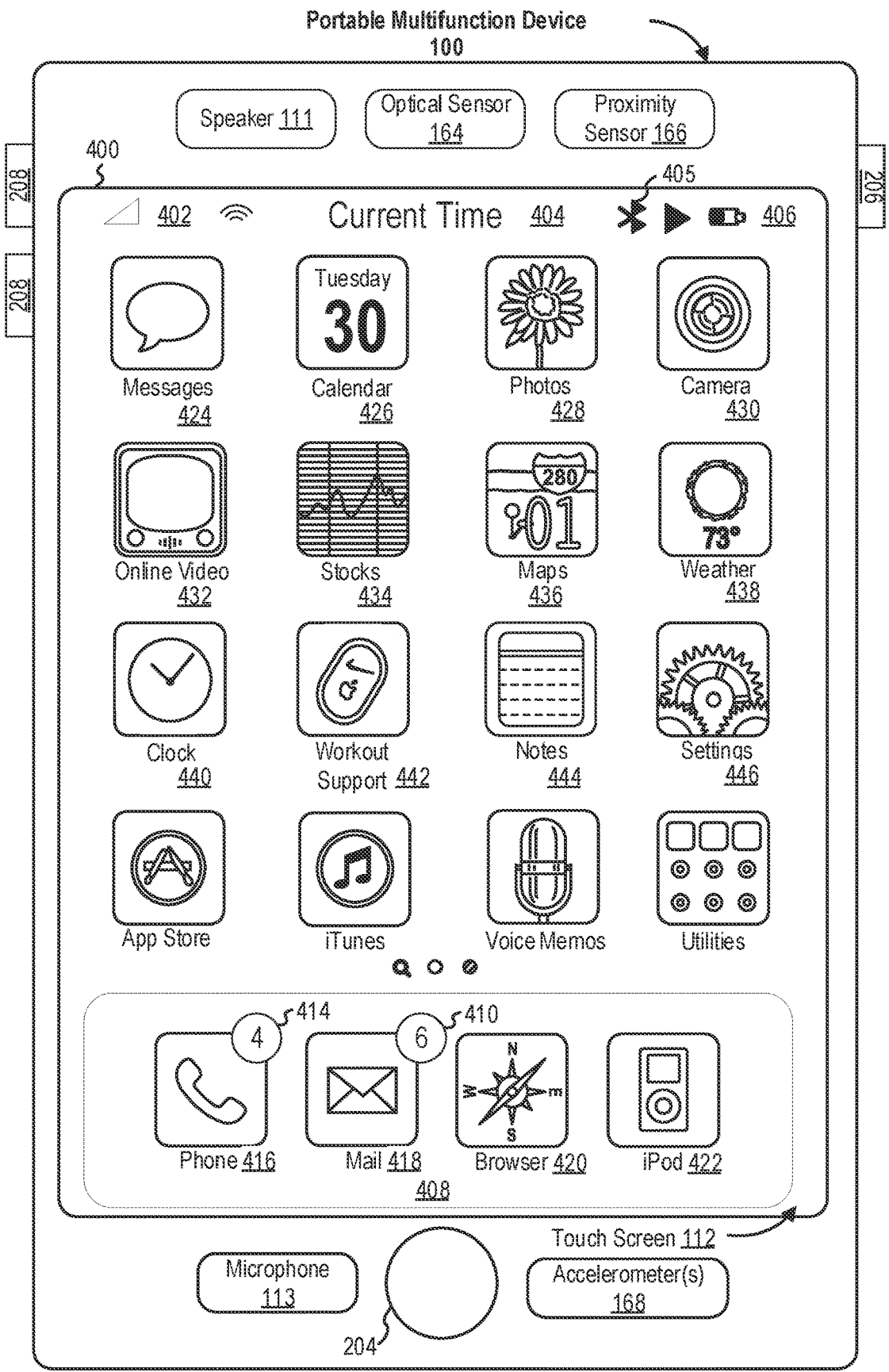
FIG. 4A illustrates an exemplary user interface for a menu of applications on a portable multifunction device in accordance with some embodiments.

FIG. 4A illustrates an exemplary user interface for a menu of applications on portable multifunction device 100 in accordance with some embodiments. Similar user interfaces are, optionally, implemented on device 300. In some embodiments, user interface 400 includes the following elements, or a subset or superset thereof:

Signal strength indicator(s) 402 for wireless communication(s), such as cellular and Wi-Fi signals;
Time 404;
Bluetooth indicator 405;
Battery status indicator 406;
Tray 408 with icons for frequently used applications, such as:
  Icon 416 for telephone module 138, labeled "Phone," which optionally includes an indicator 414 of the number of missed calls or voicemail messages;
  Icon 418 for e-mail client module 140, labeled "Mail," which optionally includes an indicator 410 of the number of unread e-mails;
  Icon 420 for browser module 147, labeled "Browser;" and
  Icon 422 for video and music player module 152, also referred to as iPod (trademark of Apple Inc.) module 152, labeled "iPod;" and
Icons for other applications, such as:
  Icon 424 for IM module 141, labeled "Messages;"
  Icon 426 for calendar module 148, labeled "Calendar;"
  Icon 428 for image management module 144, labeled "Photos;"
  Icon 430 for camera module 143, labeled "Camera;"
  Icon 432 for online video module 155, labeled "Online Video;"
  Icon 434 for stocks widget 149-2, labeled "Stocks;"
  Icon 436 for map module 154, labeled "Maps;"
  Icon 438 for weather widget 149-1, labeled "Weather;"
  Icon 440 for alarm clock widget 149-4, labeled "Clock;"
  Icon 442 for workout support module 142, labeled "Workout Support;"
  Icon 444 for notes module 153, labeled "Notes;" and
  Icon 446 for a settings application or module, labeled "Settings," which provides access to settings for device 100 and its various applications 136.

It should be noted that the icon labels illustrated in FIG. 4A are merely exemplary. For example, icon 422 for video and music player module 152 is labeled "Music" or "Music Player." Other labels are, optionally, used for various application icons. In some embodiments, a label for a respective application icon includes a name of an application corresponding to the respective application icon. In some embodiments, a label for a particular application icon is distinct from a name of an application corresponding to the particular application icon.

Figure 4B:
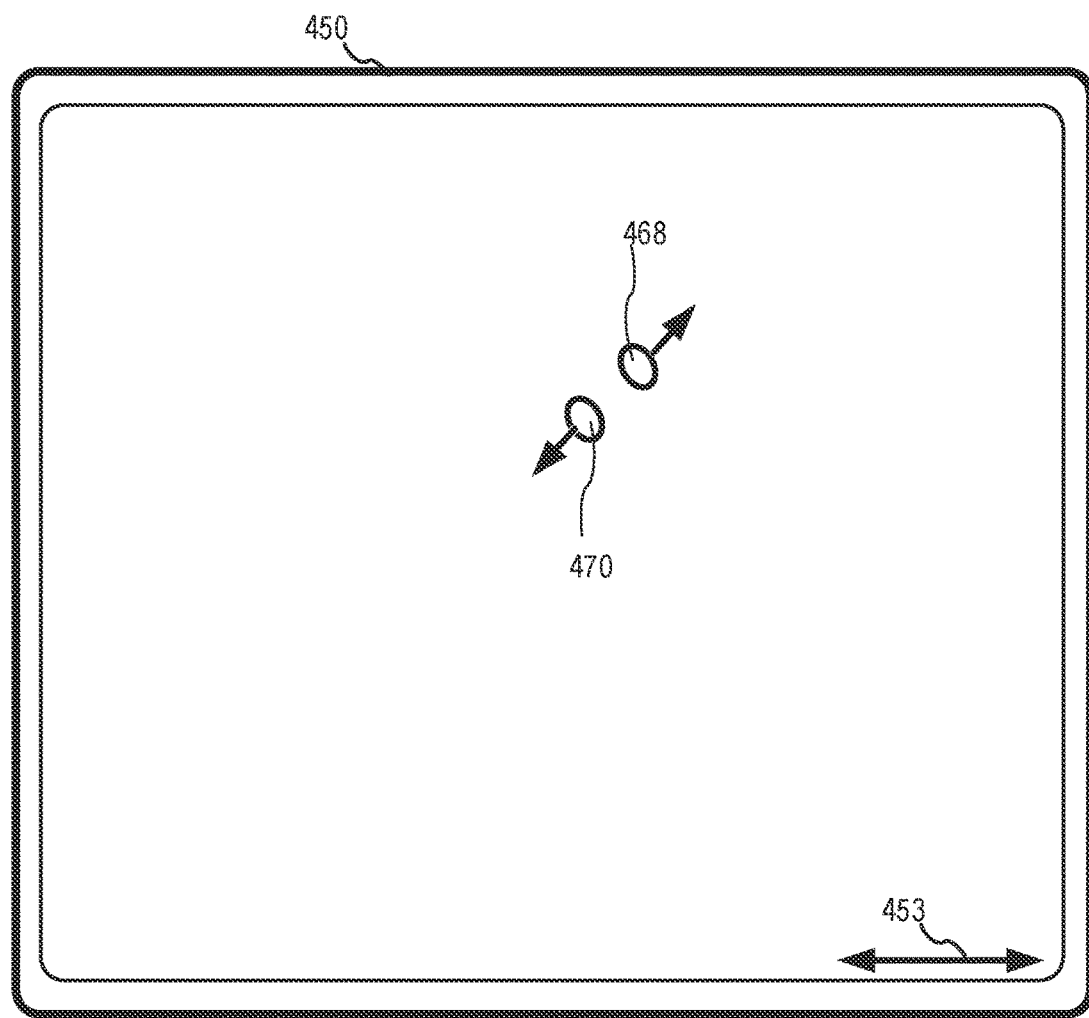
FIG. 4B illustrates an exemplary user interface for a multifunction device with a touch-sensitive surface that is separate from the display in accordance with some embodiments.
Figure 4B:
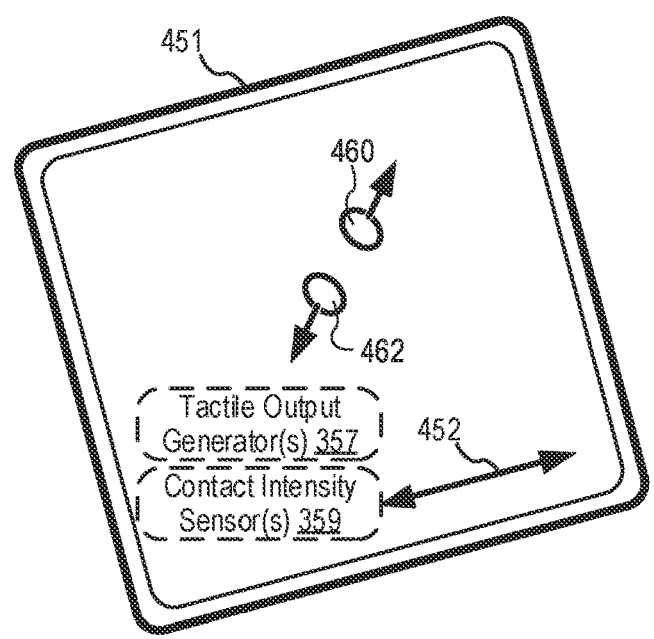

FIG. 4B illustrates an exemplary user interface on a device (e.g., device 300, FIG. 3) with a touch-sensitive surface 451 (e.g., a tablet or touchpad 355, FIG. 3) that is separate from the display 450 (e.g., touch screen display 112). Device 300 also, optionally, includes one or more contact intensity sensors (e.g., one or more of sensors 359) for detecting intensity of contacts on touch-sensitive surface 451 and/or one or more tactile output generators 357 for generating tactile outputs for a user of device 300.

Although some of the examples that follow will be given with reference to inputs on touch screen display 112 (where the touch-sensitive surface and the display are combined), in some embodiments, the device detects inputs on a touch-sensitive surface that is separate from the display, as shown in FIG. 4B. In some embodiments, the touch-sensitive surface (e.g., 451 in FIG. 4B) has a primary axis (e.g., 452 in FIG. 4B) that corresponds to a primary axis (e.g., 453 in FIG. 4B) on the display (e.g., 450). In accordance with these embodiments, the device detects contacts (e.g., 460 and 462 in FIG. 4B) with the touch-sensitive surface 451 at locations that correspond to respective locations on the display (e.g., in FIG. 4B, 460 corresponds to 468 and 462 corresponds to 470). In this way, user inputs (e.g., contacts 460 and 462, and movements thereof) detected by the device on the touch-sensitive surface (e.g., 451 in FIG. 4B) are used by the device to manipulate the user interface on the display (e.g., 450 in FIG. 4B) of the multifunction device when the touch-sensitive surface is separate from the display. It should be understood that similar methods are, optionally, used for other user interfaces described herein.

Additionally, while the following examples are given primarily with reference to finger inputs (e.g., finger contacts, finger tap gestures, finger swipe gestures), it should be understood that, in some embodiments, one or more of the finger inputs are replaced with input from another input device (e.g., a mouse-based input or stylus input). For example, a swipe gesture is, optionally, replaced with a mouse click (e.g., instead of a contact) followed by movement of the cursor along the path of the swipe (e.g., instead of movement of the contact). As another example, a tap gesture is, optionally, replaced with a mouse click while the cursor is located over the location of the tap gesture (e.g., instead of detection of the contact followed by ceasing to detect the contact). Similarly, when multiple user inputs are simultaneously detected, it should be understood that multiple computer mice are, optionally, used simultaneously, or a mouse and finger contacts are, optionally, used simultaneously.

Figure 5A:
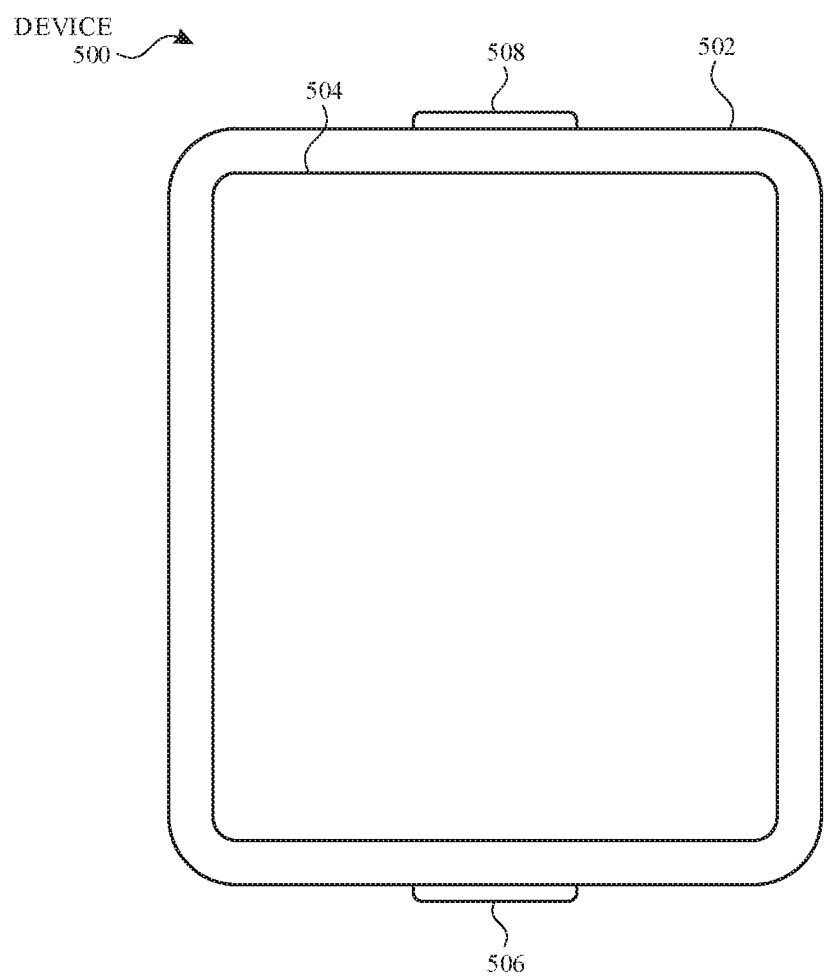
FIG. 5A illustrates a personal electronic device in accordance with some embodiments.

FIG. 5A illustrates exemplary personal electronic device 500. Device 500 includes body 502. In some embodiments, device 500 can include some or all of the features described with respect to devices 100 and 300 (e.g., FIGS. 1A-4B). In some embodiments, device 500 has touch-sensitive display screen 504, hereafter touch screen 504. Alternatively, or in addition to touch screen 504, device 500 has a display and a touch-sensitive surface. As with devices 100 and 300, in some embodiments, touch screen 504 (or the touch-sensitive surface) optionally includes one or more intensity sensors for detecting intensity of contacts (e.g., touches) being applied. The one or more intensity sensors of touch screen 504 (or the touch-sensitive surface) can provide output data that represents the intensity of touches. The user interface of device 500 can respond to touches based on their intensity, meaning that touches of different intensities can invoke different user interface operations on device 500.

Exemplary techniques for detecting and processing touch intensity are found, for example, in related applications: International Patent Application Serial No. PCT/US2013/040061, titled "Device, Method, and Graphical User Interface for Displaying User Interface Objects Corresponding to an Application," filed May 8, 2013, published as WIPO Publication No. WO/2013/169849, and International Patent Application Serial No. PCT/US2013/069483, titled "Device, Method, and Graphical User Interface for Transitioning Between Touch Input to Display Output Relationships," filed Nov. 11, 2013, published as WIPO Publication No. WO/2014/105276, each of which is hereby incorporated by reference in their entirety.

In some embodiments, device 500 has one or more input mechanisms 506 and 508. Input mechanisms 506 and 508, if included, can be physical. Examples of physical input mechanisms include push buttons and rotatable mechanisms. In some embodiments, device 500 has one or more attachment mechanisms. Such attachment mechanisms, if included, can permit attachment of device 500 with, for example, hats, eyewear, earrings, necklaces, shirts, jackets, bracelets, watch straps, chains, trousers, belts, shoes, purses, backpacks, and so forth. These attachment mechanisms permit device 500 to be worn by a user.

Figure 5B:
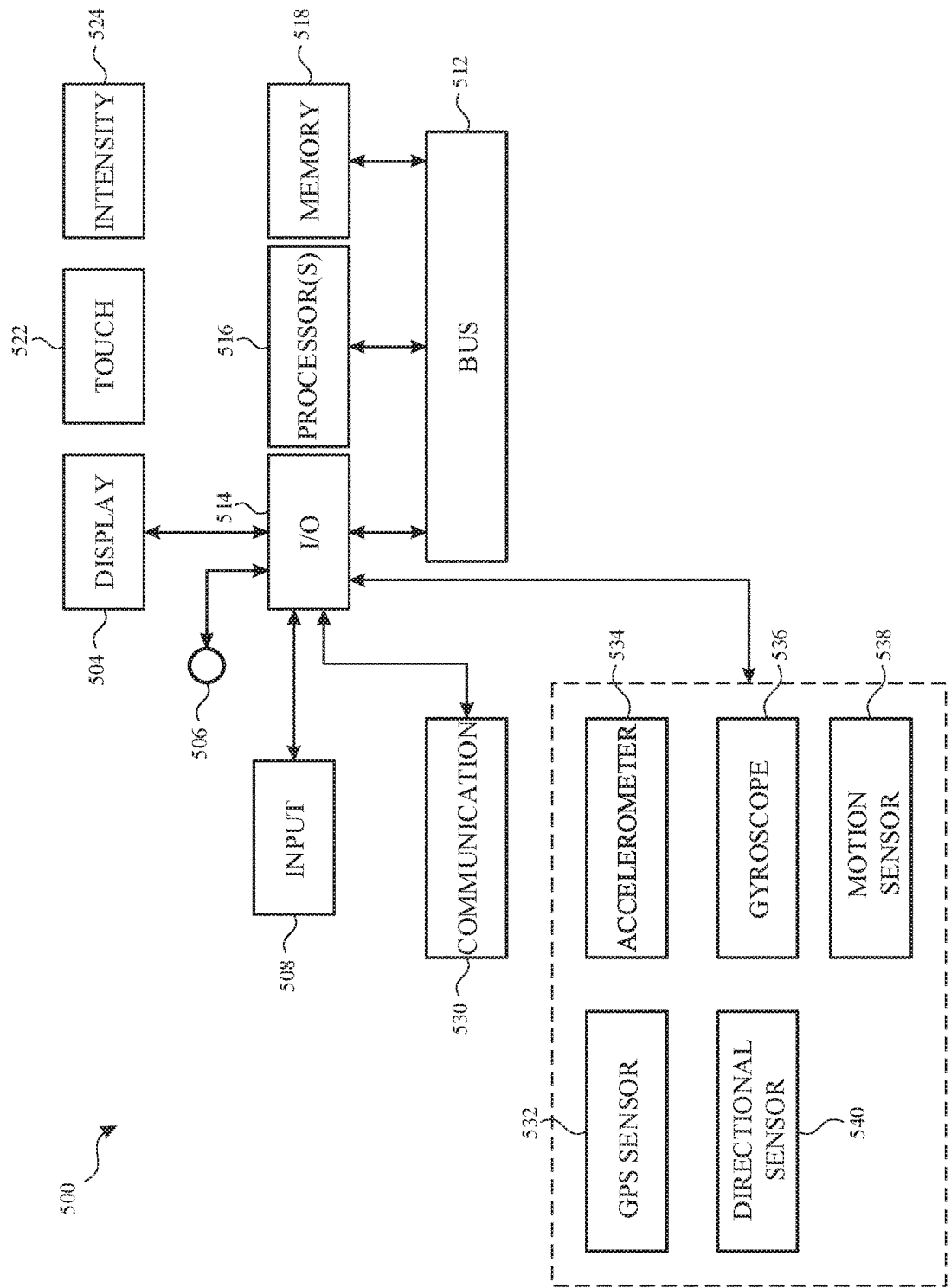
FIG. 5B is a block diagram illustrating a personal electronic device in accordance with some embodiments.

FIG. 5B depicts exemplary personal electronic device 500. In some embodiments, device 500 can include some or all of the components described with respect to FIGS. 1A, 1B, and 3. Device 500 has bus 512 that operatively couples I/O section 514 with one or more computer processors 516 and memory 518. I/O section 514 can be connected to display 504, which can have touch-sensitive component 522 and, optionally, intensity sensor 524 (e.g., contact intensity sensor). In addition, I/O section 514 can be connected with communication unit 530 for receiving application and operating system data, using Wi-Fi, Bluetooth, near field communication (NFC), cellular, and/or other wireless communication techniques. Device 500 can include input mechanisms 506 and/or 508. Input mechanism 506 is, optionally, a rotatable input device or a depressible and rotatable input device, for example. Input mechanism 508 is, optionally, a button, in some examples.

Input mechanism 508 is, optionally, a microphone, in some examples. Personal electronic device 500 optionally includes various sensors, such as GPS sensor 532, accelerometer 534, directional sensor 540 (e.g., compass), gyroscope 536, motion sensor 538, and/or a combination thereof, all of which can be operatively connected to I/O section 514.

Memory 518 of personal electronic device 500 can include one or more non-transitory computer-readable storage mediums, for storing computer-executable instructions, which, when executed by one or more computer processors 516, for example, can cause the computer processors to perform the techniques described below, including processes 700 and 900 (FIGS. 7A-7C and 9A-9B). A computer-readable storage medium can be any medium that can tangibly contain or store computer-executable instructions for use by or in connection with the instruction execution system, apparatus, or device. In some examples, the storage medium is a transitory computer-readable storage medium. In some examples, the storage medium is a non-transitory computer-readable storage medium. The non-transitory computer-readable storage medium can include, but is not limited to, magnetic, optical, and/or semiconductor storages. Examples of such storage include magnetic disks, optical discs based on CD, DVD, or Blu-ray technologies, as well as persistent solid-state memory such as flash, solid-state drives, and the like. Personal electronic device 500 is not limited to the components and configuration of FIG. 5B, but can include other or additional components in multiple configurations.

As used here, the term "affordance" refers to a user-interactive graphical user interface object that is, optionally, displayed on the display screen of devices 100, 300, and/or 500 (FIGS. 1A, 3, and 5A-5B). For example, an image (e.g., icon), a button, and text (e.g., hyperlink) each optionally constitute an affordance.

As used herein, the term "focus selector" refers to an input element that indicates a current part of a user interface with which a user is interacting. In some implementations that include a cursor or other location marker, the cursor acts as a "focus selector" so that when an input (e.g., a press input) is detected on a touch-sensitive surface (e.g., touchpad 355 in FIG. 3 or touch-sensitive surface 451 in FIG. 4B) while the cursor is over a particular user interface element (e.g., a button, window, slider, or other user interface element), the particular user interface element is adjusted in accordance with the detected input. In some implementations that include a touch screen display (e.g., touch-sensitive display system 112 in FIG. 1A or touch screen 112 in FIG. 4A) that enables direct interaction with user interface elements on the touch screen display, a detected contact on the touch screen acts as a "focus selector" so that when an input (e.g., a press input by the contact) is detected on the touch screen display at a location of a particular user interface element (e.g., a button, window, slider, or other user interface element), the particular user interface element is adjusted in accordance with the detected input. In some implementations, focus is moved from one region of a user interface to another region of the user interface without corresponding movement of a cursor or movement of a contact on a touch screen display (e.g., by using a tab key or arrow keys to move focus from one button to another button); in these implementations, the focus selector moves in accordance with movement of focus between different regions of the user interface. Without regard to the specific form taken by the focus selector, the focus selector is generally the user interface element (or contact on a touch screen display) that is controlled by the user so as to communicate the user's intended interaction with the user interface (e.g., by indicating, to the device, the element of the user interface with which the user is intending to interact). For example, the location of a focus selector (e.g., a cursor, a contact, or a selection box) over a respective button while a press input is detected on the touch-sensitive surface (e.g., a touchpad or touch screen) will indicate that the user is intending to activate the respective button (as opposed to other user interface elements shown on a display of the device).

As used in the specification and claims, the term "characteristic intensity" of a contact refers to a characteristic of the contact based on one or more intensities of the contact. In some embodiments, the characteristic intensity is based on multiple intensity samples. The characteristic intensity is, optionally, based on a predefined number of intensity samples, or a set of intensity samples collected during a predetermined time period (e.g., 0.05, 0.1, 0.2, 0.5, 1, 2, 5, 10 seconds) relative to a predefined event (e.g., after detecting the contact, prior to detecting liftoff of the contact, before or after detecting a start of movement of the contact, prior to detecting an end of the contact, before or after detecting an increase in intensity of the contact, and/or before or after detecting a decrease in intensity of the contact). A characteristic intensity of a contact is, optionally, based on one or more of: a maximum value of the intensities of the contact, a mean value of the intensities of the contact, an average value of the intensities of the contact, a top 10 percentile value of the intensities of the contact, a value at the half maximum of the intensities of the contact, a value at the 90 percent maximum of the intensities of the contact, or the like. In some embodiments, the duration of the contact is used in determining the characteristic intensity (e.g., when the characteristic intensity is an average of the intensity of the contact over time). In some embodiments, the characteristic intensity is compared to a set of one or more intensity thresholds to determine whether an operation has been performed by a user. For example, the set of one or more intensity thresholds optionally includes a first intensity threshold and a second intensity threshold. In this example, a contact with a characteristic intensity that does not exceed the first threshold results in a first operation, a contact with a characteristic intensity that exceeds the first intensity threshold and does not exceed the second intensity threshold results in a second operation, and a contact with a characteristic intensity that exceeds the second threshold results in a third operation. In some embodiments, a comparison between the characteristic intensity and one or more thresholds is used to determine whether or not to perform one or more operations (e.g., whether to perform a respective operation or forgo performing the respective operation), rather than being used to determine whether to perform a first operation or a second operation.

In some embodiments, a portion of a gesture is identified for purposes of determining a characteristic intensity. For example, a touch-sensitive surface optionally receives a continuous swipe contact transitioning from a start location and reaching an end location, at which point the intensity of the contact increases. In this example, the characteristic intensity of the contact at the end location is, optionally, based on only a portion of the continuous swipe contact, and not the entire swipe contact (e.g., only the portion of the swipe contact at the end location). In some embodiments, a smoothing algorithm is, optionally, applied to the intensities of the swipe contact prior to determining the characteristic intensity of the contact. For example, the smoothing algorithm optionally includes one or more of: an unweighted sliding-average smoothing algorithm, a triangular smoothing algorithm, a median filter smoothing algorithm, and/or an exponential smoothing algorithm. In some circumstances, these smoothing algorithms eliminate narrow spikes or dips in the intensities of the swipe contact for purposes of determining a characteristic intensity.

The intensity of a contact on the touch-sensitive surface is, optionally, characterized relative to one or more intensity thresholds, such as a contact-detection intensity threshold, a light press intensity threshold, a deep press intensity threshold, and/or one or more other intensity thresholds. In some embodiments, the light press intensity threshold corresponds to an intensity at which the device will perform operations typically associated with clicking a button of a physical mouse or a trackpad. In some embodiments, the deep press intensity threshold corresponds to an intensity at which the device will perform operations that are different from operations typically associated with clicking a button of a physical mouse or a trackpad. In some embodiments, when a contact is detected with a characteristic intensity below the light press intensity threshold (e.g., and above a nominal contact-detection intensity threshold below which the contact is no longer detected), the device will move a focus selector in accordance with movement of the contact on the touch-sensitive surface without performing an operation associated with the light press intensity threshold or the deep press intensity threshold. Generally, unless otherwise stated, these intensity thresholds are consistent between different sets of user interface figures.

An increase of characteristic intensity of the contact from an intensity below the light press intensity threshold to an intensity between the light press intensity threshold and the deep press intensity threshold is sometimes referred to as a "light press" input. An increase of characteristic intensity of the contact from an intensity below the deep press intensity threshold to an intensity above the deep press intensity threshold is sometimes referred to as a "deep press" input. An increase of characteristic intensity of the contact from an intensity below the contact-detection intensity threshold to an intensity between the contact-detection intensity threshold and the light press intensity threshold is sometimes referred to as detecting the contact on the touch-surface. A decrease of characteristic intensity of the contact from an intensity above the contact-detection intensity threshold to an intensity below the contact-detection intensity threshold is sometimes referred to as detecting liftoff of the contact from the touch-surface. In some embodiments, the contact-detection intensity threshold is zero. In some embodiments, the contact-detection intensity threshold is greater than zero.

In some embodiments described herein, one or more operations are performed in response to detecting a gesture that includes a respective press input or in response to detecting the respective press input performed with a respective contact (or a plurality of contacts), where the respective press input is detected based at least in part on detecting an increase in intensity of the contact (or plurality of contacts) above a press-input intensity threshold. In some embodiments, the respective operation is performed in response to detecting the increase in intensity of the respective contact above the press-input intensity threshold (e.g., a "down stroke" of the respective press input). In some embodiments, the press input includes an increase in intensity of the respective contact above the press-input intensity threshold and a subsequent decrease in intensity of the contact below the press-input intensity threshold, and the respective operation is performed in response to detecting the subsequent decrease in intensity of the respective contact below the press-input threshold (e.g., an "up stroke" of the respective press input).

In some embodiments, the device employs intensity hysteresis to avoid accidental inputs sometimes termed "jitter," where the device defines or selects a hysteresis intensity threshold with a predefined relationship to the press-input intensity threshold (e.g., the hysteresis intensity threshold is X intensity units lower than the press-input intensity threshold or the hysteresis intensity threshold is 75%, 90%, or some reasonable proportion of the press-input intensity threshold). Thus, in some embodiments, the press input includes an increase in intensity of the respective contact above the press-input intensity threshold and a subsequent decrease in intensity of the contact below the hysteresis intensity threshold that corresponds to the press-input intensity threshold, and the respective operation is performed in response to detecting the subsequent decrease in intensity of the respective contact below the hysteresis intensity threshold (e.g., an "up stroke" of the respective press input). Similarly, in some embodiments, the press input is detected only when the device detects an increase in intensity of the contact from an intensity at or below the hysteresis intensity threshold to an intensity at or above the press-input intensity threshold and, optionally, a subsequent decrease in intensity of the contact to an intensity at or below the hysteresis intensity, and the respective operation is performed in response to detecting the press input (e.g., the increase in intensity of the contact or the decrease in intensity of the contact, depending on the circumstances).

For ease of explanation, the descriptions of operations performed in response to a press input associated with a press-input intensity threshold or in response to a gesture including the press input are, optionally, triggered in response to detecting either: an increase in intensity of a contact above the press-input intensity threshold, an increase in intensity of a contact from an intensity below the hysteresis intensity threshold to an intensity above the press-input intensity threshold, a decrease in intensity of the contact below the press-input intensity threshold, and/or a decrease in intensity of the contact below the hysteresis intensity threshold corresponding to the press-input intensity threshold. Additionally, in examples where an operation is described as being performed in response to detecting a decrease in intensity of a contact below the press-input intensity threshold, the operation is, optionally, performed in response to detecting a decrease in intensity of the contact below a hysteresis intensity threshold corresponding to, and lower than, the press-input intensity threshold.

Figure 5C:
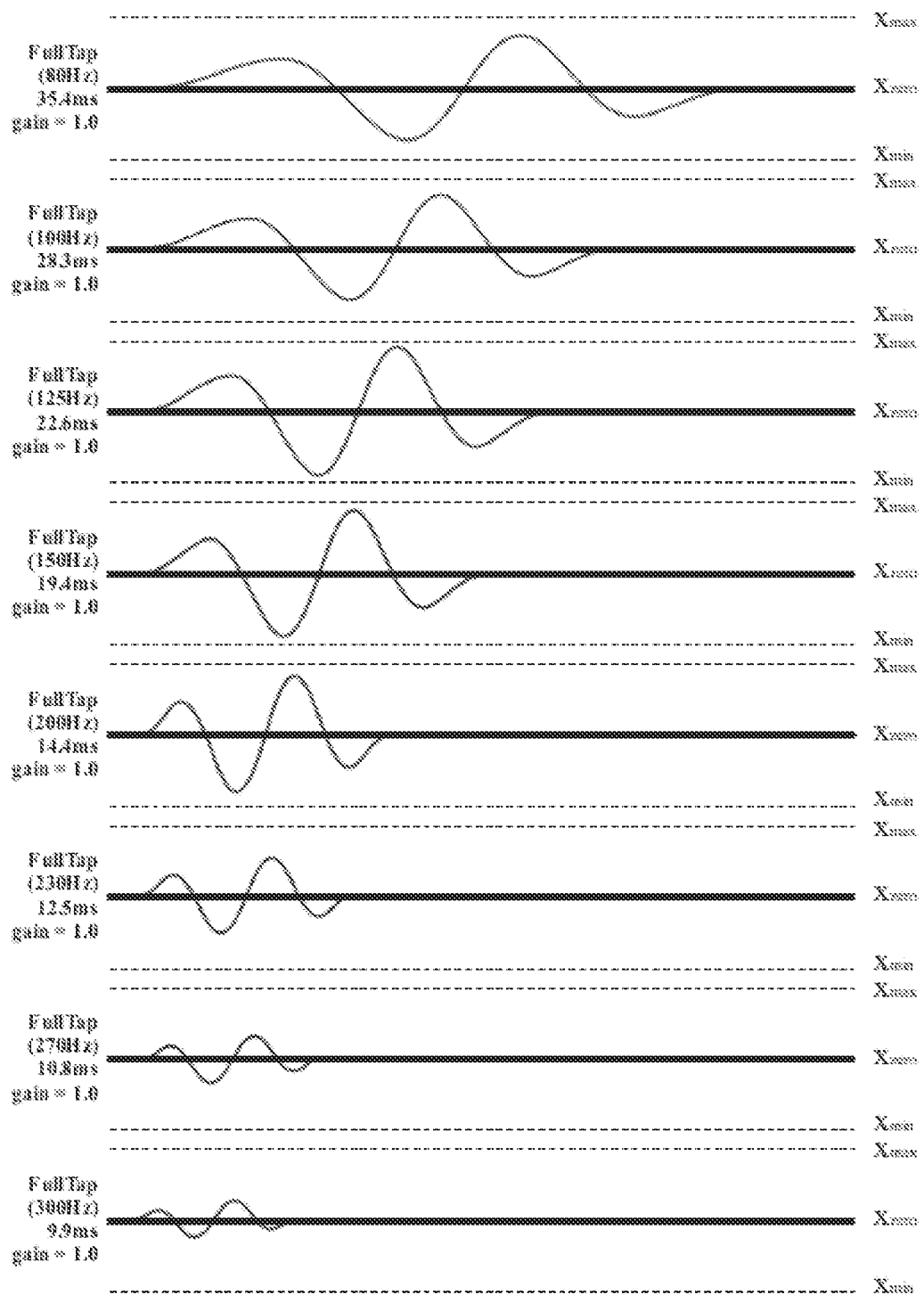
FIGS. 5C-5H illustrate example tactile output patterns that have a particular waveform, in accordance with some embodiments.
Figure 5D:
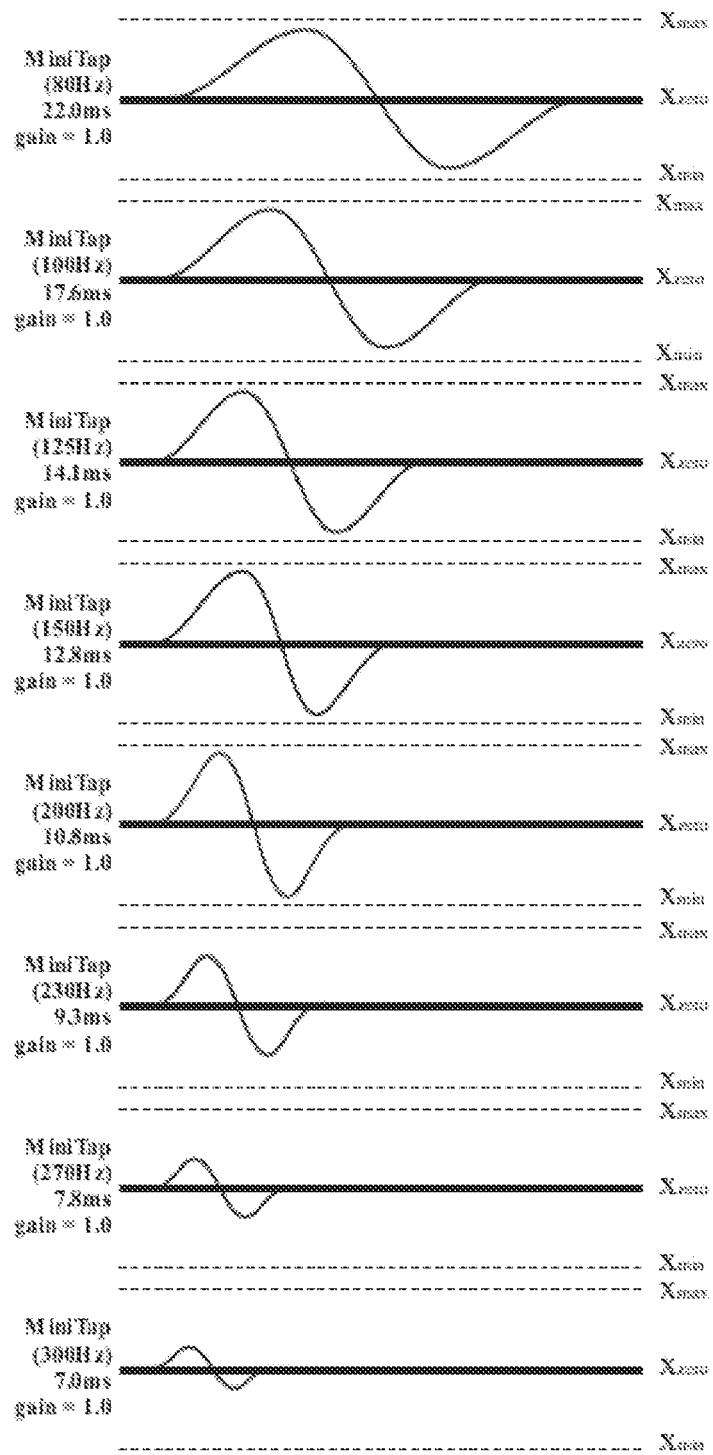
Figure 5E:
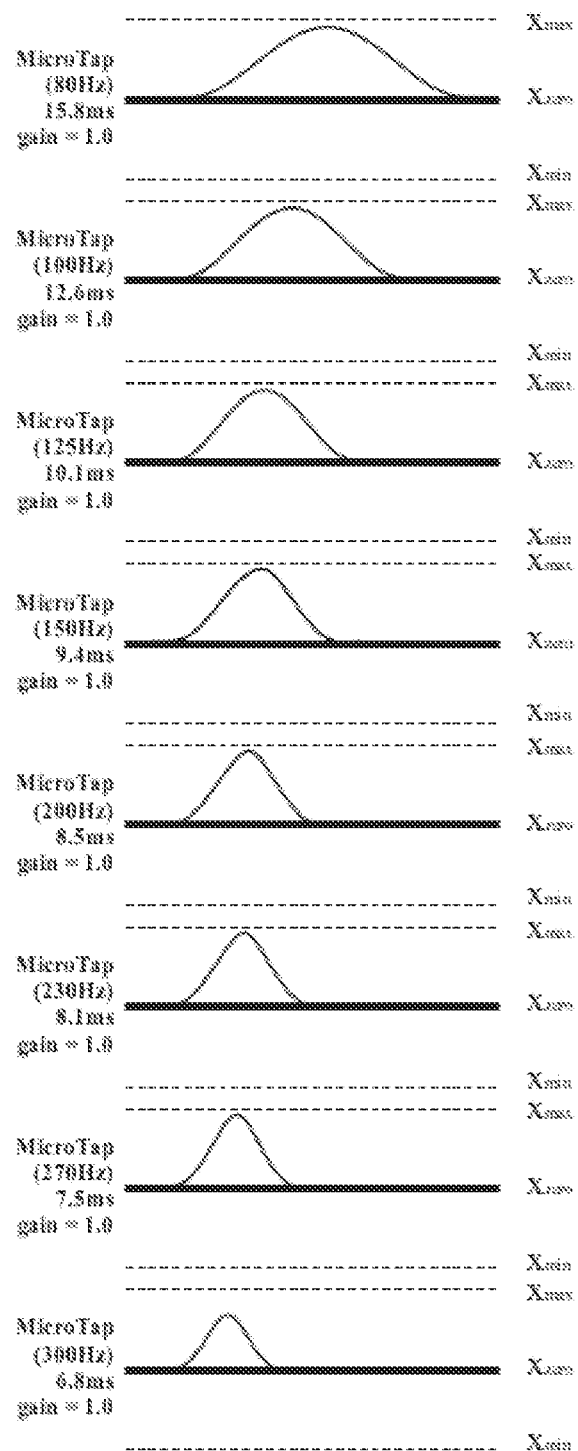
Figure 5F:
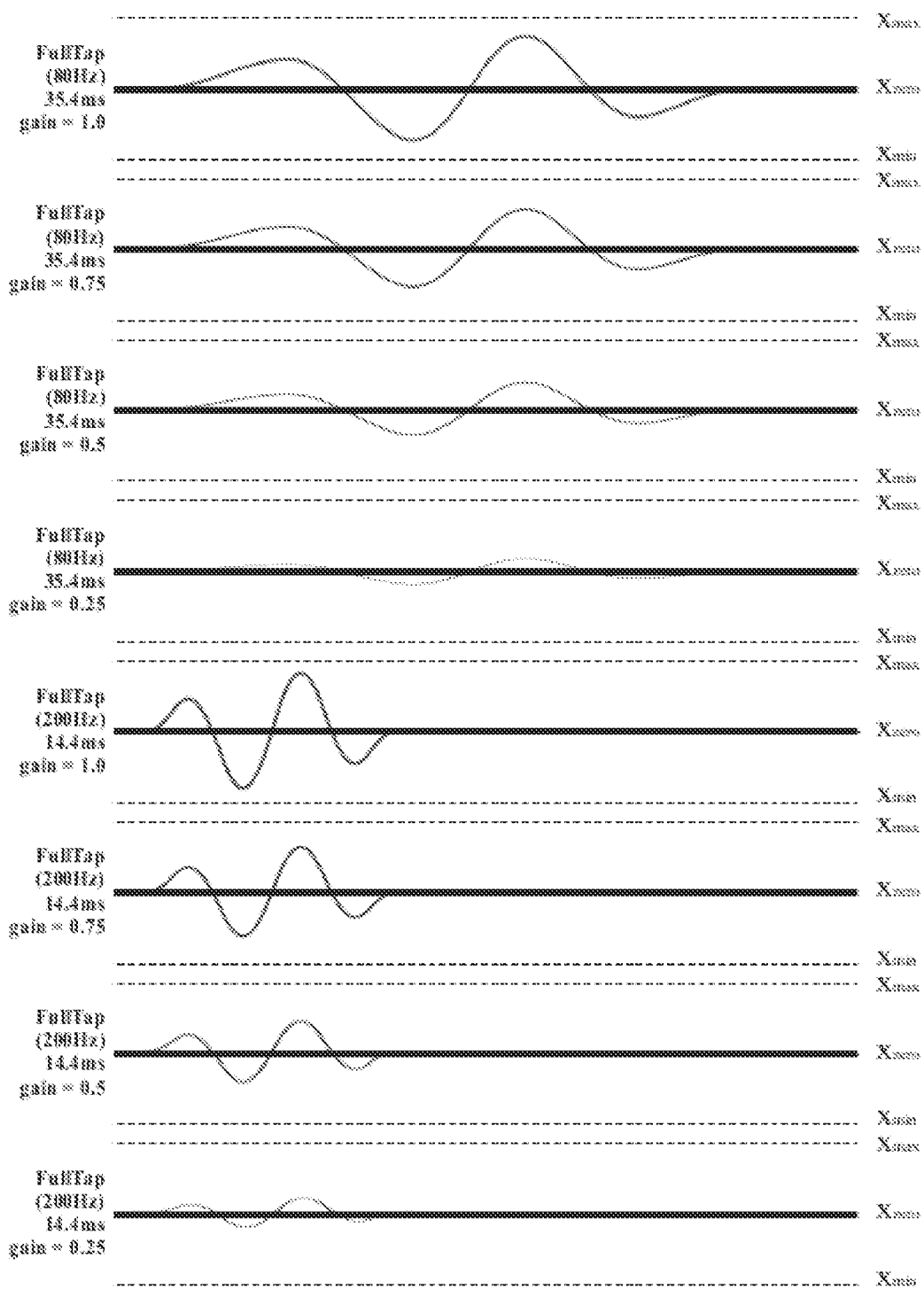
Figure 5G:
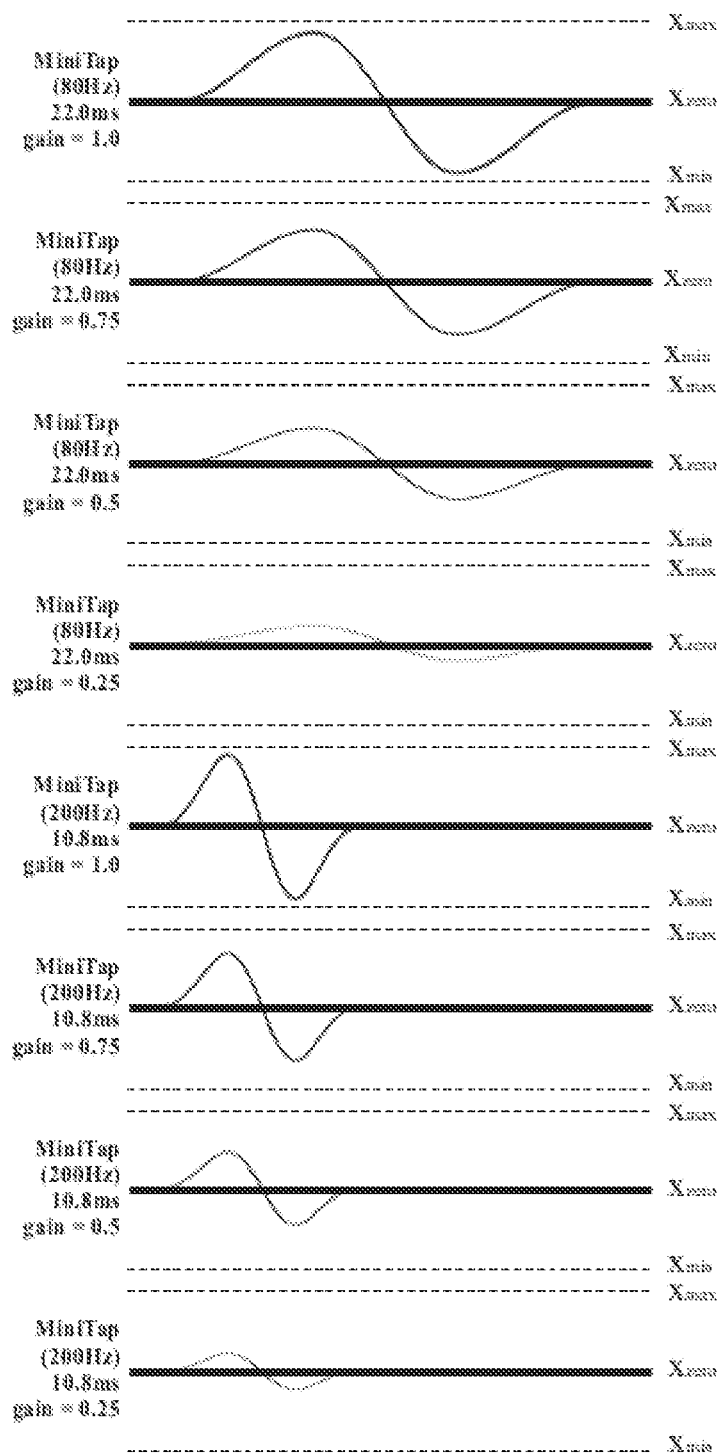
Figure 5H:
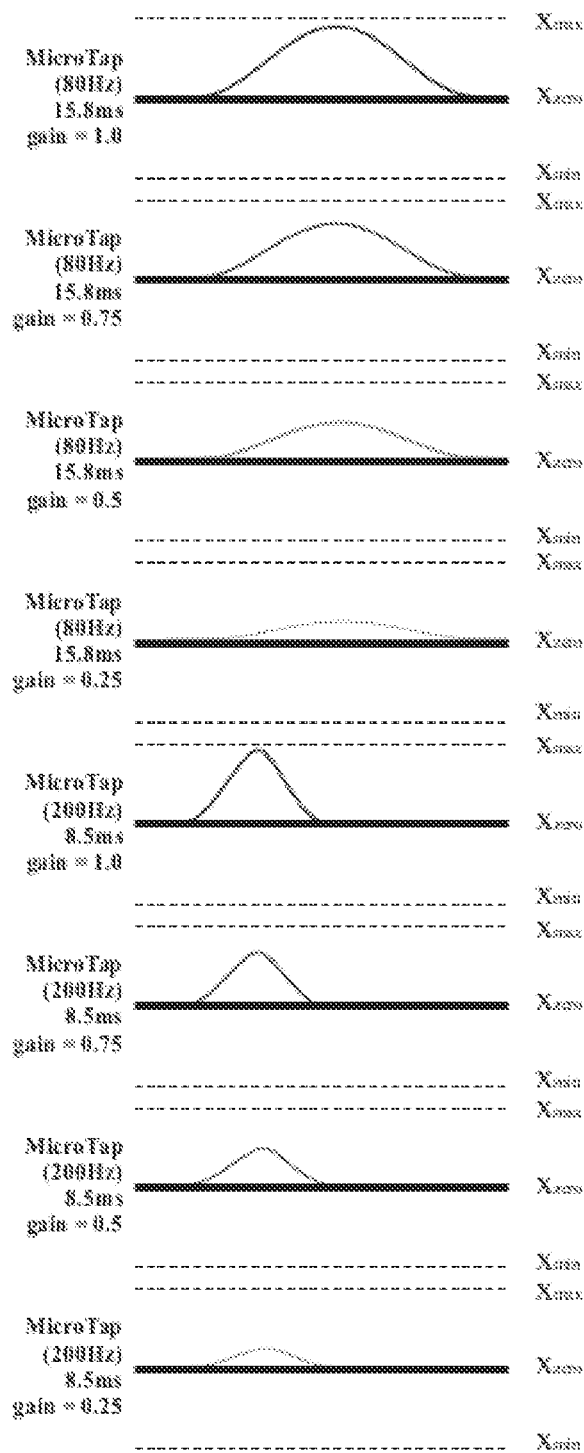

FIGS. 5C-5E provide a set of sample tactile output patterns that may be used, either individually or in combination, either as is or through one or more transformations (e.g., modulation, amplification, truncation, etc.), to create suitable haptic feedback in various scenarios and for various purposes, such as those mentioned above and those described with respect to the user interfaces and methods discussed herein. This example of a palette of tactile outputs shows how a set of three waveforms and eight frequencies can be used to produce an array of tactile output patterns. In addition to the tactile output patterns shown in these figures, each of these tactile output patterns is optionally adjusted in amplitude by changing a gain value for the tactile output pattern, as shown, for example for FullTap 80 Hz, FullTap 200 Hz, MiniTap 80 Hz, MiniTap 200 Hz, MicroTap 80 Hz, and MicroTap 200 Hz in FIGS. 5F-5H, which are each shown with variants having a gain of 1.0, 0.75, 0.5, and 0.25. As shown in FIGS. 5F-5H, changing the gain of a tactile output pattern changes the amplitude of the pattern without changing the frequency of the pattern or changing the shape of the waveform. In some embodiments, changing the frequency of a tactile output pattern also results in a lower amplitude as some tactile output generators are limited by how much force can be applied to the moveable mass and thus higher frequency movements of the mass are constrained to lower amplitudes to ensure that the acceleration needed to create the waveform does not require force outside of an operational force range of the tactile output generator (e.g., the peak amplitudes of the FullTap at 230 Hz, 270 Hz, and 300 Hz are lower than the amplitudes of the FullTap at 80 Hz, 100 Hz, 125 Hz, and 200 Hz).

FIGS. 5C-5H show tactile output patterns that have a particular waveform. The waveform of a tactile output pattern represents the pattern of physical displacements relative to a neutral position (e.g., Xzero) versus time that a moveable mass goes through to generate a tactile output with that tactile output pattern. For example, a first set of tactile output patterns shown in FIG. 5C (e.g., tactile output patterns of a "FullTap") each have a waveform that includes an oscillation with two complete cycles (e.g., an oscillation that starts and ends in a neutral position and crosses the neutral position three times). A second set of tactile output patterns shown in FIG. 5D (e.g., tactile output patterns of a "MiniTap") each have a waveform that includes an oscillation that includes one complete cycle (e.g., an oscillation that starts and ends in a neutral position and crosses the neutral position one time). A third set of tactile output patterns shown in FIG. 5E (e.g., tactile output patterns of a "MicroTap") each have a waveform that includes an oscillation that include one half of a complete cycle (e.g., an oscillation that starts and ends in a neutral position and does not cross the neutral position). The waveform of a tactile output pattern also includes a start buffer and an end buffer that represent the gradual speeding up and slowing down of the moveable mass at the start and at the end of the tactile output. The example waveforms shown in FIGS. 5C-5H include Xmin and Xmax values which represent the maximum and minimum extent of movement of the moveable mass. For larger electronic devices with larger moveable masses, there may be larger or smaller minimum and maximum extents of movement of the mass. The examples shown in FIGS. 5C-5H describe movement of a mass in one dimension, however similar principles would also apply to movement of a moveable mass in two or three dimensions.

As shown in FIGS. 5C-5E, each tactile output pattern also has a corresponding characteristic frequency that affects the "pitch" of a haptic sensation that is felt by a user from a tactile output with that characteristic frequency. For a continuous tactile output, the characteristic frequency represents the number of cycles that are completed within a given period of time (e.g., cycles per second) by the moveable mass of the tactile output generator. For a discrete tactile output, a discrete output signal (e.g., with 0.5, 1, or 2 cycles) is generated, and the characteristic frequency value specifies how fast the moveable mass needs to move to generate a tactile output with that characteristic frequency. As shown in FIGS. 5C-5H, for each type of tactile output (e.g., as defined by a respective waveform, such as FullTap, MiniTap, or MicroTap), a higher frequency value corresponds to faster movement(s) by the moveable mass, and hence, in general, a shorter time to complete the tactile output (e.g., including the time to complete the required number of cycle(s) for the discrete tactile output, plus a start and an end buffer time). For example, a FullTap with a characteristic frequency of 80 Hz takes longer to complete than FullTap with a characteristic frequency of 100 Hz (e.g., 35.4 ms vs. 28.3 ms in FIG. 5C). In addition, for a given frequency, a tactile output with more cycles in its waveform at a respective frequency takes longer to complete than a tactile output with fewer cycles its waveform at the same respective frequency. For example, a FullTap at 150 Hz takes longer to complete than a MiniTap at 150 Hz (e.g., 19.4 ms vs. 12.8 ms), and a MiniTap at 150 Hz takes longer to complete than a MicroTap at 150 Hz (e.g., 12.8 ms vs. 9.4 ms). However, for tactile output patterns with different frequencies this rule may not apply (e.g., tactile outputs with more cycles but a higher frequency may take a shorter amount of time to complete than tactile outputs with fewer cycles but a lower frequency, and vice versa). For example, at 300 Hz, a FullTap takes as long as a MiniTap (e.g., 9.9 ms).

As shown in FIGS. 5C-5E, a tactile output pattern also has a characteristic amplitude that affects the amount of energy that is contained in a tactile signal, or a "strength" of a haptic sensation that may be felt by a user through a tactile output with that characteristic amplitude. In some embodiments, the characteristic amplitude of a tactile output pattern refers to an absolute or normalized value that represents the maximum displacement of the moveable mass from a neutral position when generating the tactile output. In some embodiments, the characteristic amplitude of a tactile output pattern is adjustable, e.g., by a fixed or dynamically determined gain factor (e.g., a value between 0 and 1), in accordance with various conditions (e.g., customized based on user interface contexts and behaviors) and/or preconfigured metrics (e.g., input-based metrics, and/or user-interface-based metrics). In some embodiments, an input-based metric (e.g., an intensity-change metric or an input-speed metric) measures a characteristic of an input (e.g., a rate of change of a characteristic intensity of a contact in a press input or a rate of movement of the contact across a touch-sensitive surface) during the input that triggers generation of a tactile output. In some embodiments, a user-interface-based metric (e.g., a speed-across-boundary metric) measures a characteristic of a user interface element (e.g., a speed of movement of the element across a hidden or visible boundary in a user interface) during the user interface change that triggers generation of the tactile output. In some embodiments, the characteristic amplitude of a tactile output pattern may be modulated by an "envelope" and the peaks of adjacent cycles may have different amplitudes, where one of the waveforms shown above is further modified by multiplication by an envelope parameter that changes over time (e.g., from 0 to 1) to gradually adjust amplitude of portions of the tactile output over time as the tactile output is being generated.

Although specific frequencies, amplitudes, and waveforms are represented in the sample tactile output patterns in FIGS. 5C-5E for illustrative purposes, tactile output patterns with other frequencies, amplitudes, and waveforms may be used for similar purposes. For example, waveforms that have between 0.5 to 4 cycles can be used. Other frequencies in the range of 60 Hz-400 Hz may be used as well.

Attention is now directed towards embodiments of user interfaces ("UI") and associated processes that are implemented on an electronic device, such as portable multifunction device 100, device 300, or device 500.

FIGS. 6A-6P illustrate exemplary user interfaces for managing output of a non-visual indication of a current time, in accordance with some embodiments. The user interfaces in these figures are used to illustrate the processes described below, including the processes in FIGS. 7A-7C.

FIG. 6A illustrates an electronic device 600 (e.g., similar to multifunction device 100, device 300, or device 500 described above). In some embodiments, electronic device 600 is a wearable electronic device (e.g., a smartwatch). Electronic device 600 has a display device 699 (e.g., similar to display system 112 described above).

In FIG. 6A, electronic device 600 is displaying, on display device 699, a first watch face user interface 602 that includes a time user interface element 604 (e.g., a clock face or dial) indicating the current time (in this example, 10:09). In some embodiments, electronic device 600 includes and/or has access to a plurality of watch face user interfaces that can be selected to display the current time on electronic device 600. In some embodiments, a respective watch face user interface of the plurality of watch face user interfaces are different from one another based on the design, style, and/or layout of the respective watch face user interface, as described in greater detail below. In some embodiments first watch face user interface 602 includes one or more menu items (e.g., calendar menu item 606) corresponding to one or more applications (e.g., a calendar application) that are installed on electronic device 600.

In FIG. 6A, silent mode is deactivated on electronic device 600 (e.g., such that audio outputs corresponding to notifications and/or other types of alerts and feedback are not suppressed). While silent mode is deactivated on electronic device 600 and while displaying first watch face user interface 602 with time user interface element indicating the current time (in this example, 10:09), electronic device 600 detects, via display device 699, an input 601. In some embodiments, input 601 is a two-finger tap-and-hold input or a two-finger press-and-hold input on display device 699, where the two-finger input is maintained on display device 699 for at least a predetermined time period (e.g., at least 0.2 seconds, at least 0.3 seconds, at least 0.5 seconds).

Figure 6B:
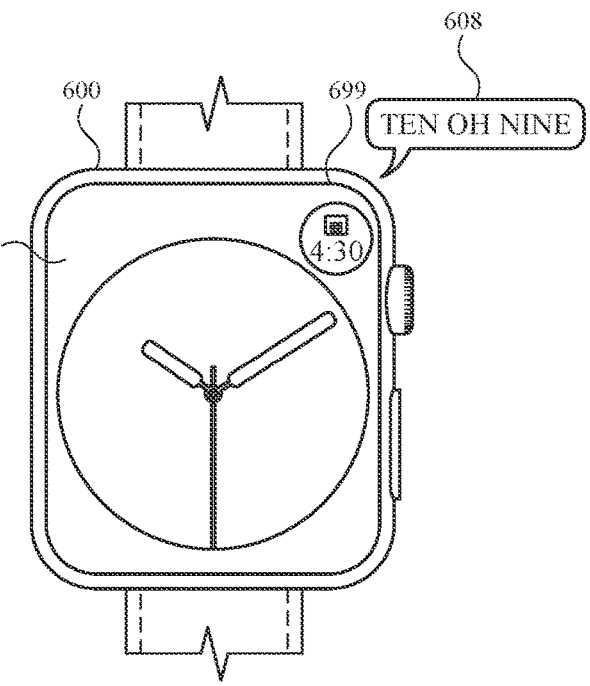

In FIG. 6B, in response to detecting input 601 (while silent mode is deactivated on and electronic device 600 is displaying first watch face user interface 602), electronic device 600 generates (e.g., via one or more speakers of electronic device 600, such as speaker 111) an audio output 608 that corresponds to a verbal utterance (e.g., an audio representation of one or more words (e.g., using a synthetic voice)) of the current time (in this example, 10:09) in a first type of voice (e.g., a voice having a certain accent, timbre, vocal register). In some embodiments, audio output 608 is uttered on an hour-and-minute basis (in this example, "ten oh nine").

Figure 6C:
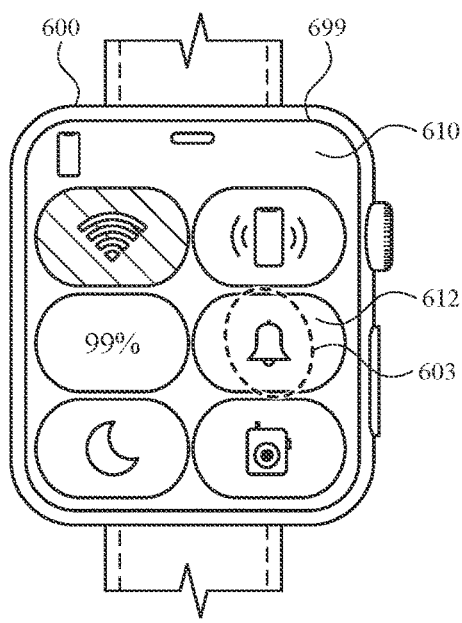

FIG. 6C illustrates electronic device 600 displaying, on display 699, a control user interface 610 (e.g., a user interface of a control center). In some embodiments, control user interface 610 includes a plurality of control mode affordances for activating or deactivating a control of electronic device 600 (e.g., WiFi mode, vibration mode, power reserve mode, silent mode, do not disturb mode, walkie-talkie mode), including a silent mode control affordance 612. As previously mentioned, silent mode is deactivated on electronic device 600 (e.g., such that audio outputs corresponding to notifications and/or other types of alerts and feedback are not suppressed). In some embodiments, electronic device 600 displays silent mode control affordance 612 with a first visual characteristic (e.g., a symbol, such as a bell symbol, displayed on the affordance) when silent mode is deactivated on electronic device 600.

In FIG. 6C, while displaying control user interface 610, including silent mode control affordance 612, with silent mode deactivated, electronic device 600 detects, via display device 699, an input 603 (e.g., a tap gesture, a tap input) on silent mode control affordance 612.

Figure 6D:
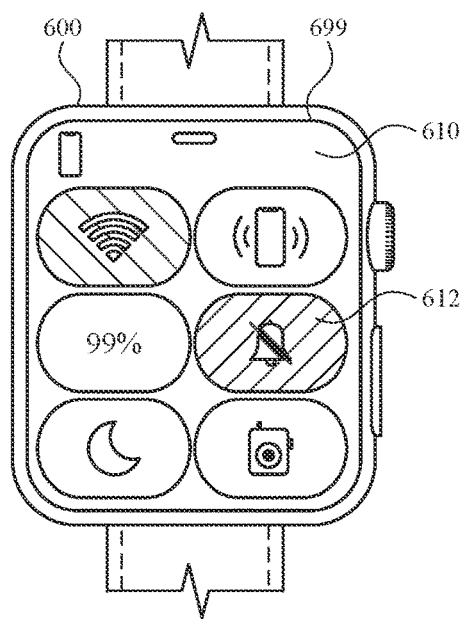

In FIG. 6D, in response to detecting user activation of input 603 on silent mode control affordance 612, electronic device 600 activates silent mode on electronic device 600 (e.g., such that audio outputs corresponding to notifications and/or other types of alerts and feedback are suppressed). In some embodiments, electronic device 600 displays silent mode control affordance 612 with a second visual characteristic different from the first visual characteristic (e.g., the symbol, such as the bell symbol, crossed out on the affordance; a shading of the affordance).

Figure 6E:
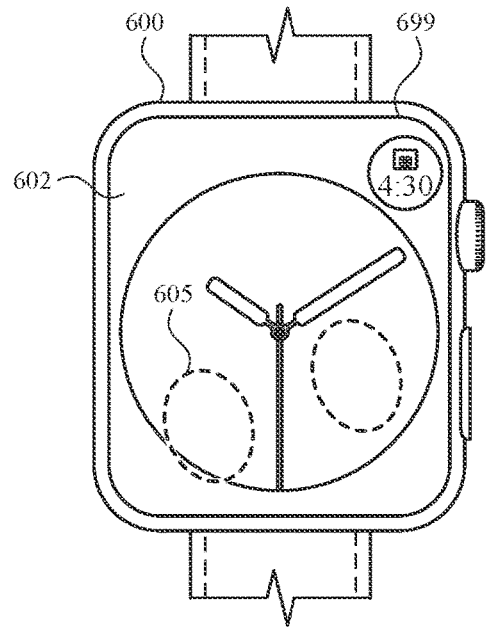

FIG. 6E illustrates electronic device 600 again displaying, on display device 699, first watch face user interface 602 while silent mode is activated on electronic device 600 and time user interface element 604 indicating the current time (in this example, 10:09).

In FIG. 6E, while displaying first watch face user interface 602 with silent mode activated, electronic device 600 detects, via display device 699, an input 605 that is the same input type as input 601 described above with reference to FIG. 6A (e.g., a two-finger tap-and-hold input or a two-finger press-and-hold input on display device 699, where the two-finger input is maintained on display device 699 for at least a predetermined time period (e.g., at least 0.2 seconds, at least 0.3 seconds, at least 0.5 seconds)).

Figure 6F:
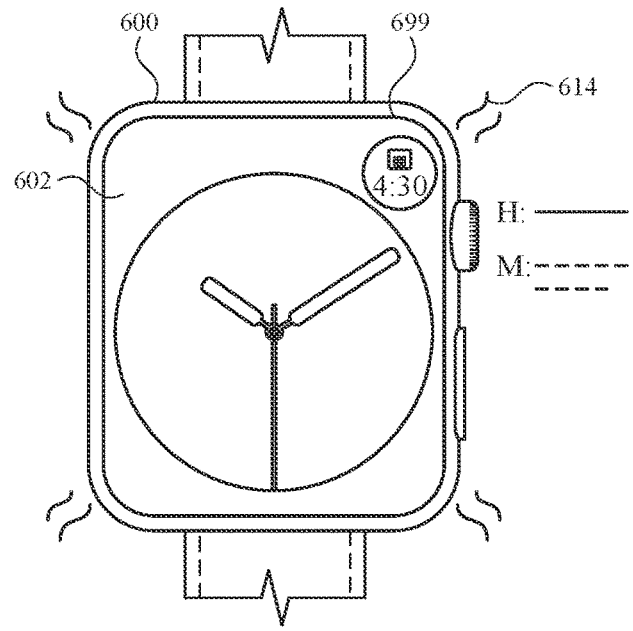

In FIG. 6F, in response to detecting input 605 (while silent mode is activated and electronic device 600 is displaying first watch face user interface 602), electronic device 600 generates, via one or more tactile output generators (e.g., tactile output generators 167) of electronic device 600, a tactile output sequence 614 (e.g., a tactile time feedback) that is indicative of the current time (in this example, 10:09) without generating an audio output (e.g., without generating audio output 608).

In some embodiments, tactile output sequence 614 that is indicative of the current time (in this example, 10:09) comprises an hour-portion that is determined based on an hour value of the current time, and/or a minute-portion that is determined based on a minute value of the current time. In some embodiments, the hour-portion includes a tens-place subportion corresponding to a tens digit of the hour value of the current time and/or a ones-place subportion corresponding to a ones digit of the hour value of the current time. Similarly, in some embodiments, the minute-portion includes a tens-place subportion corresponding to a tens digit of the minute value of the current time and/or a ones-place subportion corresponding to a ones digit of the minute value of the current time.

In some embodiments, generating the hour-portion of tactile output sequence 614 comprises generating one or more tens-hour-type tactile outputs based on the tens-place subportion of the hour value (if the tens-place subportion of the hour value is applicable based on the current time) and one or more ones-hour-type tactile outputs based on the ones-place subportion of the hour value (if the ones-place subportion of the hour value is applicable based on the current time). In some embodiments, a single tens-hour-type tactile output of tactile output sequence 614 is stronger (e.g., has a greater output intensity; has a greater magnitude and/or amplitude) and/or longer (e.g., has a longer duration) than a single ones-hour-type tactile output of tactile output sequence 614.

In some embodiments, generating the minute-portion of tactile output sequence 614 comprises generating one or more tens-minute-type tactile outputs based on the tens-place subportion of the minute value (if the tens-place subportion of the minute value is applicable based on the current time) and one or more ones-minute-type tactile outputs based on the ones-place subportion of the minute value (if the ones-place subportion of the minute value is applicable based on the current time). In some embodiments, a single tens-minute-type tactile output of tactile output sequence 614 is stronger (e.g., has a greater output intensity; has a greater magnitude and/or amplitude) and/or longer (e.g., has a longer duration) than a single ones-minute-type tactile output of tactile output sequence 614. In some embodiments, both a single tens-hour-type tactile output of tactile output sequence 614 and a single ones-hour-type tactile output of tactile output sequence 614 are stronger (e.g., has a greater output intensity; has a greater magnitude and/or amplitude) and/or longer (e.g., has a longer duration) than both a single tens-minute-type tactile output of tactile output sequence 614 and a single ones-minute-type tactile output of tactile output sequence 614. Additional examples and formats for tactile output of time can be found in U.S. Pat. No. 10,156,904, issued Dec. 18, 2018, which is incorporated by reference in its entirety and, especially, for the disclosure of FIGS. 6D-6I and the corresponding description.

In FIG. 6F, the output of 10:09 corresponds to a longer single output representing the hours (10) followed, after a pause, by nine shorter outputs representing the minutes (9).

Figure 6G:
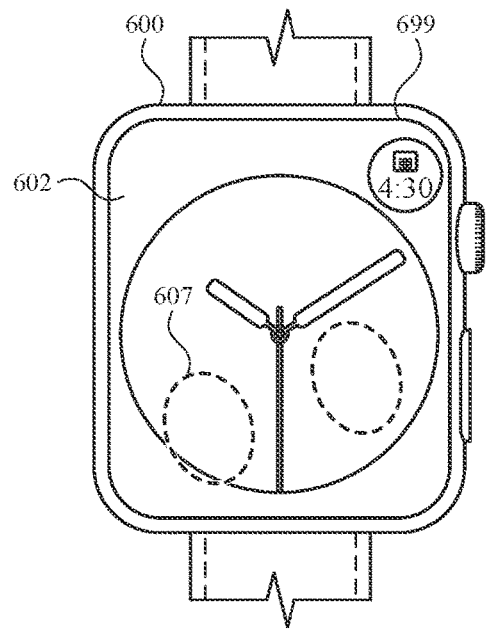
Figure 6H:
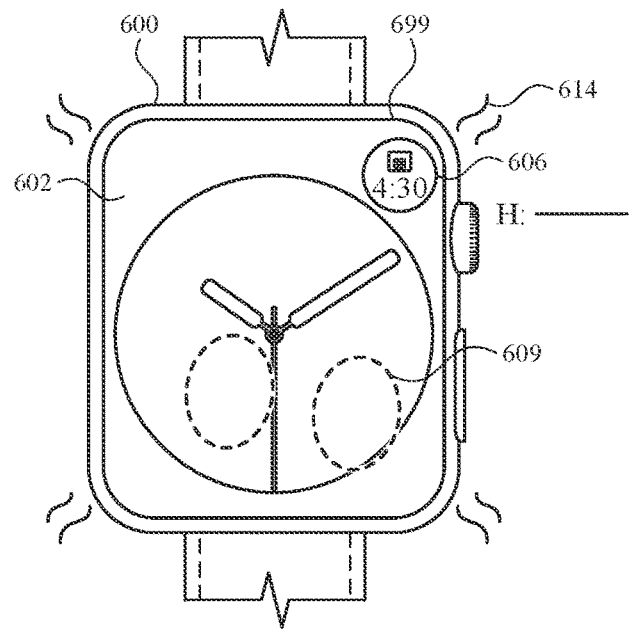

FIG. 6G illustrates electronic device 600 again displaying, on display device 699, first watch face user interface 602 while silent mode is activated on electronic device 600, as first depicted in FIG. 6E.

In FIG. 6G, while displaying first watch face user interface 602 with silent mode activated, electronic device 600 detects, via display device 699, an input 607 that is the same input type as inputs 601 and 605 described above with reference to FIGS. 6A and 6E, respectively (e.g., a two-finger tap-and-hold input or a two-finger press-and-hold input on display device 699, where the two-finger input is maintained on display device 699 for at least a predetermined time period (e.g., at least 0.2 seconds, at least 0.3 seconds, at least 0.5 seconds)).

In FIG. 6G, in response to detecting input 607 (while silent mode is activated and electronic device 600 is displaying first watch face user interface 602), electronic device 600 begins generating, via one or more tactile output generators (e.g., tactile output generators 167) of electronic device 600, tactile output sequence 614 that is indicative of the current time (in this example, 10:09).

In FIG. 6G, while generating tactile output sequence 614, electronic device 600 detects, via display device 699, an input 609. In some embodiments, input 609 corresponds to a two-finger tap gesture or tap input on display device 699. In some embodiments, input 609 corresponds to a cover gesture (e.g., a gesture covering all of or at least a portion of display device 699) on display device 699. In some embodiments, in response to detecting input 609 while generating tactile output sequence 614, electronic device 600 ceases generating tactile output sequence 614. That is, in response to detecting input 609 after having generated an initial portion of tactile output sequence 614, electronic device 600 forgoes generating a remaining portion of tactile output sequence 614. Thus, input 609 corresponds to an input that enforces a ceasing or termination of tactile output sequence 614.

Figure 6I:
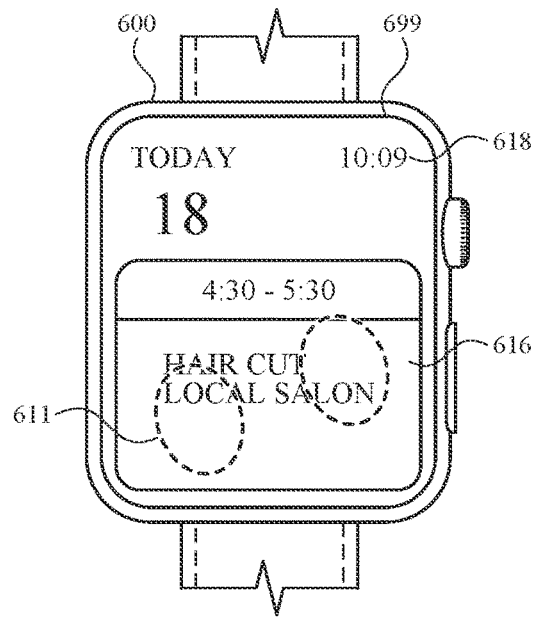

FIG. 6I illustrates electronic device 600 displaying, on display device 699, an application user interface 616 corresponding to an application (in this example, the calendar application) that is installed on electronic device 600. In some embodiments, electronic device 600 displays application user interface 616 corresponding to the application (in this example, the calendar application) in response to detecting a selection of a menu item (e.g., calendar menu item 606) displayed on first watch face user interface 602.

In FIG. 6I, application user interface 616 does not correspond to a type of watch face user interface. In some embodiments, a watch face user interface corresponds to a user interface that includes a time user interface element (e.g., time user interface element 604) as the main and/or central feature of the user interface (e.g., such that the time user interface element is (e.g., prominently) displayed at or near a center region of display device 699 and/or covers a larger area of the user interface than other user interface elements or objects displayed in the user interface; such that the main functional purpose of the user interface is to display the current time). In some embodiments, first application user interface 616 includes a mini-time user interface element 618 that is displayed in a corner region (e.g., top-right corner region) of display device 699, but first application user interface 616 does not correspond to a type of watch face user interface (e.g., because mini-time user interface element 618 is not the main and central feature of the user interface and the main functional purpose of first application user interface 616 is not to display the current time, but to display calendar information).

In FIG. 6I, while displaying application user interface 616, electronic device 600 detects, via display device 699, an input 611 that is the same input type as inputs 601, 605, and 607 described above with reference to FIGS. 6A, 6E, and 6G, respectively (e.g., a two-finger tap-and-hold input or a two-finger press-and-hold input on display device 699, where the two-finger input is maintained on display device 699 for at least a predetermined time period (e.g., at least 0.2 seconds, at least 0.3 seconds, at least 0.5 seconds)).

Figure 6J:

In FIG. 6J, in response to detecting input 611 (and while displaying application user interface 616), electronic device 600 does not generate a non-visual output of time (e.g., an audio or tactile output sequence (e.g., does not generate tactile output sequence 614) that is indicative of the current time (in this example, 10:09).

Figure 6K:
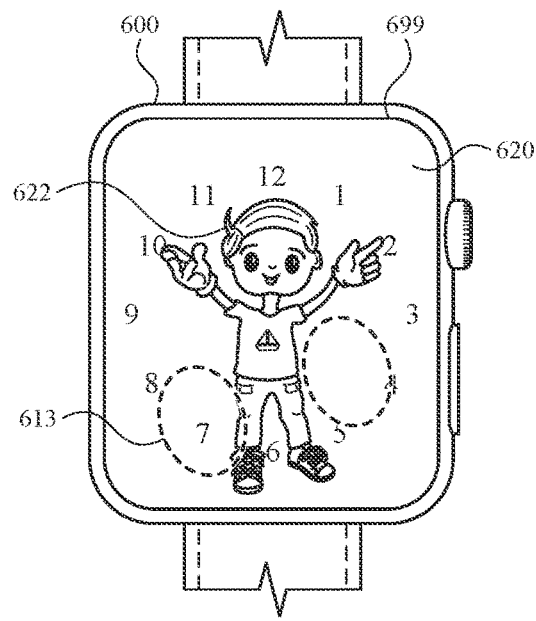

FIG. 6K illustrates electronic device 600 displaying, on display device 699, a second watch face user interface 620 that is a type of watch face user interface but is of a different type than (e.g., different in the design, style, and/or layout from) first watch face user interface 602. Second watch face user interface 620 includes a time user interface element 622 (e.g., a clock face or dial) indicating the current time (in this example, 10:09). Time user interface element 622 of second watch face user interface 620 is a different type of (e.g., is a different category of) watch face user interface from (e.g., has a different design, style, and/or layout from) time user interface element 604 of first watch face user interface 602. In some embodiments, two different watch face user interfaces are different types of watch face user interfaces if they respectively belong to different categories of watch face user interface designs, styles, and/or layouts (e.g., a clock face or dial-style watch face user interface, a digital clock-style watch face user interface, a graphical character-based watch face user interface, an animation-based watch face user interface, an infographic watch face user interface, a photos-based watch face user interface). In this example, first watch user interface 602 corresponds to a clock face or dial-style watch face user interface, while second watch face user interface 620 corresponds to a graphical character-based watch face user interface.

In FIG. 6K, silent mode is deactivated on electronic device 600. While silent mode is deactivated and while displaying second watch face user interface 620, electronic device 600 detects an input 613 that is the same input type as inputs 601, 605, 607, and 611 described above with reference to FIGS. 6A, 6E, 6G, and 6I, respectively (e.g., a two-finger tap-and-hold input or a two-finger press-and-hold input on display device 699, where the two-finger input is maintained on display device 699 for at least a predetermined time period (e.g., at least 0.2 seconds, at least 0.3 seconds, at least 0.5 seconds)).

Figure 6L:
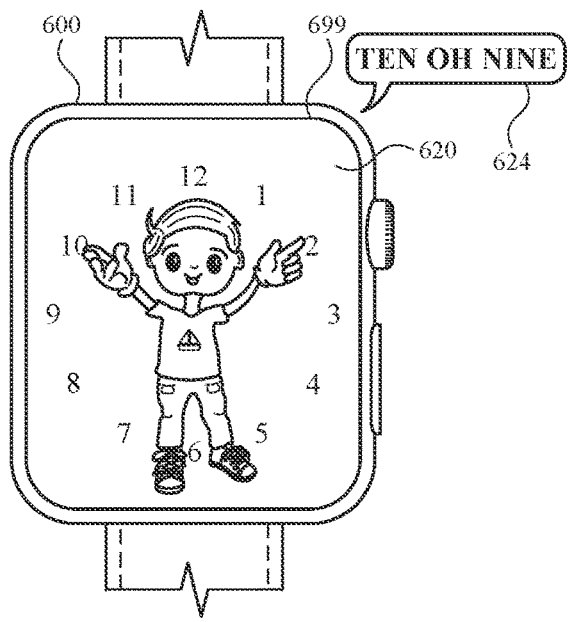

In FIG. 6L, in response to detecting input 613 (while silent mode is deactivated and while displaying second watch face user interface 620), electronic device 600 generates (e.g., via one or more speakers of electronic device 600, such as speaker 111) an audio output 624 that corresponds to a verbal utterance of the current time (in this example, 10:09) in a second type of voice that is different from the first type of voice of audio output 608 described above with reference to FIG. 6B (e.g., a different sex, tone, and/or pitch of the voice). In some embodiments, audio output 624 is uttered on an hour-and-minute basis (in this example, "ten oh nine").

Figure 6M:
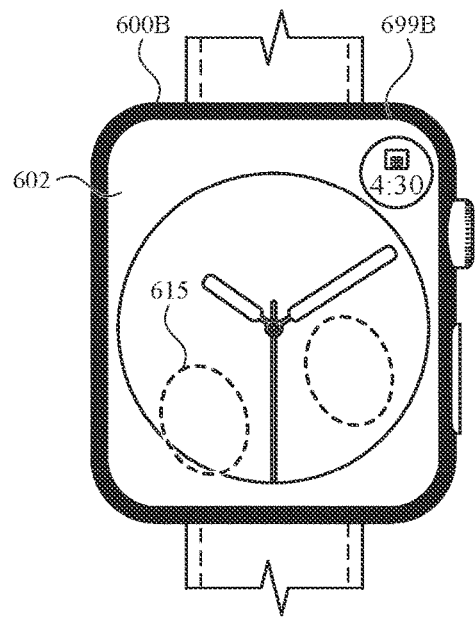
Figure 6N:
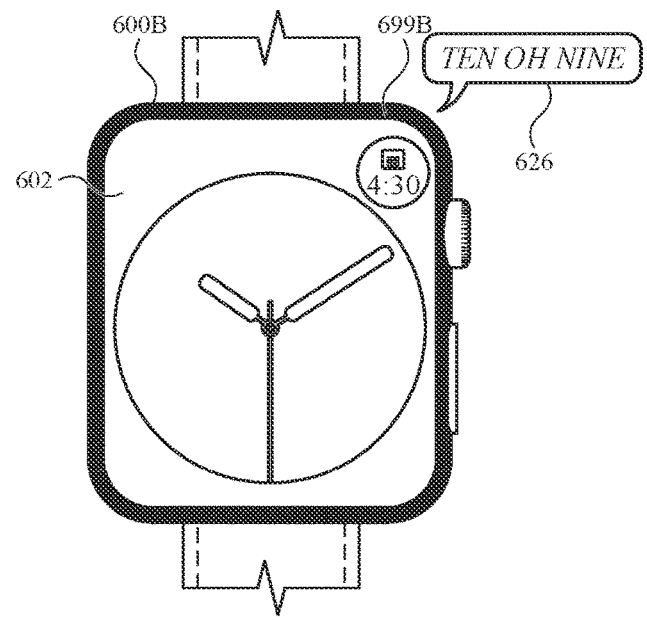

FIGS. 6M-6N illustrate an electronic device 600B that is a related but different type of (e.g., a different model of; a different version of; a different size of) device as electronic device 600. In some embodiments, electronic device 600B is a wearable electronic device (e.g., a smartwatch). In some embodiments, electronic device 600B is running the same operating system as electronic device 600.

In FIG. 6M, electronic device 600 is displaying, on a display device 699B, first watch face user interface 602, including time user interface element 604 (e.g., a clock face or dial) indicating the current time (in this example, 10:09). As can be recognized by a comparison between FIGS. 6A and 6M, first watch face user interface 602 when displayed on electronic device 600B is visually the same as (or very similar to) first watch face user interface 602 when displayed on electronic device 600.

In FIG. 6M, while displaying first watch face user interface 602 and while silent mode is deactivated on electronic device 600B, electronic device 600B detects, via display device 699B, an input 615 that is the same input type as inputs 601, 605, 607, 611, and 613 described above with reference to FIGS. 6A, 6E, 6G, 6I, and 6K, respectively (e.g., a two-finger tap-and-hold input or a two-finger press-and-hold input on display device 699B, where the two-finger input is maintained on display device 699B for at least a predetermined time period (e.g., at least 0.2 seconds, at least 0.3 seconds, at least 0.5 seconds)).

In FIG. 6N, in response to detecting input 615 (while displaying first watch face user interface 602 and while silent mode is deactivated), electronic device 600B generates (e.g., via one or more speakers of electronic device 600B, such as speaker 111) an audio output 626 that corresponds to a verbal utterance of the current time (in this example, 10:09) in a third type of voice that is different from the first type of voice of audio output 608 described above with reference to FIG. 6B (e.g., a different sex, tone, and/or pitch of the voice) and different from the second type of voice of audio output 624 described above with reference to FIG. 6L (e.g., a different sex, tone, and/or pitch for the voice). In some embodiments, audio output 626 is uttered on an hour-and-minute basis (in this example, "ten oh nine").

Figure 6O:
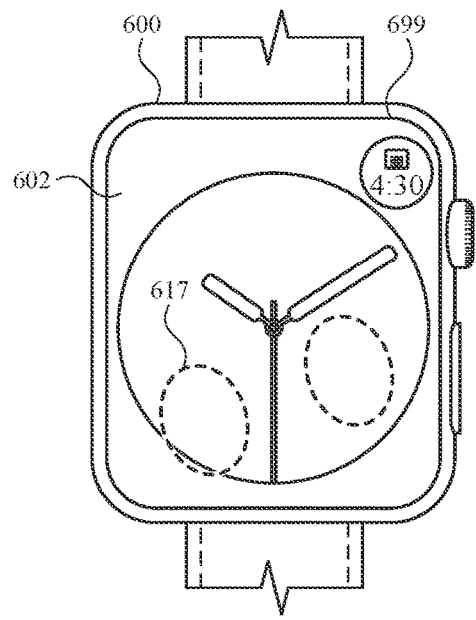

FIG. 6O again illustrates electronic device 600 displaying first watch face user interface 602 while silent mode is activated, as first described above with reference to FIGS. 6E-6F. In FIGS. 6E-6F, a tactile output speed setting of electronic device 600 was configured to be at a first speed setting. In FIGS. 6O-6P, the tactile output speed setting of electronic device 600 is configured to be at a second speed setting that is slower than the first speed setting. In some embodiments, the tactile output speed setting controls the time period (e.g., duration) between individual tactile outputs within a tactile output sequence generated by electronic device 600. For example, if the tactile output speed setting increases, the time period between individual tactile outputs within a tactile output sequence decreases such that the tactile output sequence is, overall, generated more quickly by electronic device 600; conversely, if the tactile output speed setting decreases, the time period between individual tactile outputs within a tactile output sequence increases such that the tactile output sequence is, overall, generated more slowly by electronic device 600.

In FIG. 6O, while displaying first watch face user interface 602, while silent mode is activated, and while the speed tactile output speed setting is at the second speed setting, electronic device 600 detects, via display device 699, an input 617 that is the same input type as inputs 601, 605, 607, 611, 613, and 615 described above with reference to FIGS. 6A, 6E, 6G, 6I, 6K, and 6M, respectively (e.g., a two-finger tap-and-hold input or a two-finger press-and-hold input on display device 699, where the two-finger input is maintained on display device 699 for at least a predetermined time period (e.g., at least 0.2 seconds, at least 0.3 seconds, at least 0.5 seconds)).

In FIG. 6P, in response to detecting input 617 (while electronic device 600 is displaying first watch face user interface 602, while silent mode is activated, and while the tactile output speed setting is at the second speed setting), electronic device 600 generates, via one or more tactile output generators (e.g., tactile output generators 167) of electronic device 600, a tactile output sequence 628 (e.g., a tactile time feedback) that is indicative of the current time (in this example, 10:09) without generating an audio output that is indicative of the current time, where tactile output sequence 628 is generated such that the time period (e.g., duration) between individual tactile outputs in tactile output sequence 628 is greater (e.g., longer) than the time period between individual tactile outputs in tactile output sequence 614. Thus, while both tactile output sequence 614 in FIG. 6F and tactile output sequence 628 in FIG. 6P both indicate the same current time (in these examples, 10:09), the tactile output sequence 614 is generated at a faster pace than tactile output sequence 628.

FIGS. 7A-7C are a flow diagram illustrating a method for managing output of a non-visual indication of a current time, in accordance with some embodiments. Method 700 is performed at an electronic device (e.g., 100, 600, 600B, 300, 500) with one or more input devices, a first non-visual output device, (e.g., an audio speaker; a tactile output generator; a haptic output generator) and a second non-visual output device (e.g., a non-visual output device different from the first non-visual output device). In some embodiments, the electronic device is a wearable electronic device (e.g., a smartwatch). Some operations in method 700 are, optionally, combined, the orders of some operations are, optionally, changed, and some operations are, optionally, omitted.

As described below, method 700 provides an intuitive way for managing output of the current time. The method reduces the cognitive burden on a user for managing output of the current time, thereby creating a more efficient human-machine interface. For battery-operated computing devices, enabling a user to manage output of the current time faster and more efficiently conserves power and increases the time between battery charges.

The electronic device (e.g., 600, 600B) detects (702), via the one or more input devices (e.g., 699), an input (e.g., 601, 605, 607, 611, 613, 615, 617; a set of contacts detected on a touch-sensitive surface of the electronic device).

In response to detecting the input (e.g., 601, 605, 607, 611, 613, 615, 617) (704), in accordance with a determination that the input meets a set of non-visual time output criteria (e.g., the input includes a predetermined number of contacts), the electronic device (e.g., 600, 600B) initiates output (706) (e.g., partially outputting, without completing output) of a non-visual indication of a current time (e.g., 608, 614, 624, 626, 628). Initiating output of the non-visual indication of the current time in response to detecting the input and in accordance with a determination that the input meets a set of non-visual time output criteria enables a user to conveniently request for an indication of the current time. Performing an operation when a set of conditions has been met without requiring further user input enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

Initiating output of the non-visual indication of the current time (e.g., 608, 614, 624, 626, 628) includes, in accordance with a determination that a first set of output type criteria are met (e.g., that the device is configured to operate in a first mode (e.g., an audio output-enabled mode); the audio device is configured to operate in a default mode (e.g., a mode in which audio output is not disabled)), the electronic device (e.g., 600, 600B) initiating output (708), via the first non-visual output device, of a first type (e.g., an audio indication (e.g., a spoken indication of the current time); a tactile or haptic indication) of non-visual indication of the current time (e.g., 608, 624, 626) (e.g., without outputting, via the second non-visual output device, a non-visual indication of the current time of the second type). Initiating output of the first type (e.g., an audio indication) of non-visual indication of the current time enables a user to conveniently request for and recognize the current time in a manner that suits the user's current situation or surroundings. Providing improved feedback enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In response to detecting the input (e.g., 601, 605, 607, 611, 613, 615, 617) (704), in accordance with a determination that the input meets a set of non-visual time output criteria (e.g., the input includes a predetermined number of contacts), the electronic device (e.g., 600, 600B) initiates output (706) (e.g., partially outputting, without completing output) of a non-visual indication of a current time (e.g., 608, 614, 624, 626, 628). Initiating output of the non-visual indication of the current time in response to detecting the input and in accordance with a determination that the input meets a set of non-visual time output criteria enables a user to conveniently request for an indication of the current time. Performing an operation when a set of conditions has been met without requiring further user input enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

Initiating output of the non-visual indication of the current time (e.g., 608, 614, 624, 626, 628) includes, in accordance with a determination that a second set of output type criteria are met (e.g., that the device is configured to operate in a second mode (e.g., an audio output-disabled mode), the electronic device (e.g., 600, 600B) initiating output (710), via the second non-visual output device, of a second type of non-visual indication of the current time (e.g., 614, 628), different from the first type of non-visual indication of the current time (e.g., without outputting, via the first non-visual output device, a non-visual indication of the current time of the first type). In some embodiments, the second set of output type criteria are met when the first set of output type criteria are not met. Initiating output of the second type (e.g., a haptic indication) of non-visual indication of the current time enables a user to conveniently request for and recognize the current time in a manner that suits the user's current situation or surroundings. Providing improved feedback enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, in response to detecting the input (e.g., 601, 605, 607, 611, 613, 615, 617) (704) (704), in accordance with a determination that the input does not meet the set of non-visual time output criteria, the electronic device (e.g., 600, 600B) forgoes initiating output (712) of the non-visual indication of the current time (e.g., forgoing initiating output of any non-visual indication of the current time). Forgoing initiating the output of the non-visual indication of the current time in accordance with a determination that the input does not meet the set of non-visual time output criteria enables the electronic device to save power usage and thus improve battery life of the device by forgoing performing an unnecessary operation, thereby enhancing the operability of the device and making the user-device interface more efficient.

In some embodiments, the electronic device (e.g., 600, 600B) initiating output of the non-visual indication of the current time (e.g., 608, 614, 624, 626, 628) includes the electronic device completing (e.g., completely outputting) the non-visual indication of the current time.

In some embodiments, the electronic device (e.g., 100) includes a display device (e.g., 699; a display device that includes a touch-sensitive surface (e.g., a touch screen display)). In some embodiments, the set of non-visual time output criteria includes a criterion that is met when the input (e.g., 601, 605, 607, 611, 613, 615, 617) is received while the electronic device (e.g., 600, 600B) is displaying, via the display device (e.g., 699), a predetermined user interface (e.g., 602, 620; watch interface; an interface that includes one or more elements that provide a visual indication of the current time). In some embodiments, the input (e.g., 601, 605, 607, 611, 613, 615, 617) is a gesture (e.g., a two finger tap) on the touch-screen display while a watch face user interface is displayed. In some embodiments, when the input is detected while the electronic device (e.g., 600, 600B) is not displaying the predetermined user interface (e.g., 602, 620; displaying an application user interface or not displaying any user interface), the electronic device (e.g., 100) forgoes outputting the non-visual time output criteria. Forgoing outputting the non-visual indication of the current time when the input is detected while the electronic device (e.g., 600, 600B) is not displaying the predetermined user interface enables the electronic device to save power usage and thus improve battery life of the device by forgoing performing an unnecessary operation, thereby enhancing the operability of the device and making the user-device interface more efficient.

In some embodiments, the electronic device (e.g., 600, 600B) includes a touch-sensitive surface (e.g., 699; a touch-screen display). In some embodiments, the set of non-visual time output criteria includes a criterion that is met when the input (e.g., 601, 605, 607, 611, 613, 615, 617) is a touch gesture including a predetermined number of contacts that is detected on the touch-sensitive surface (e.g., a two-finger tap gesture). In some embodiments, the predetermined number of contacts is a single contact. In some embodiments, the predetermined number of contacts is two contacts. In some embodiments, the predetermined number of contacts is two or more contacts.

In some embodiments, the first non-visual output device is a tactile output device. In some embodiments, the first type of non-visual indication of the current time is a tactile output that indicates the current time (e.g., 614, 628). In some embodiments, the first set of output type criteria includes a criterion that is met when the electronic device (e.g., 600, 600B) is currently configured (e.g., is currently in a mode) to suppress (e.g., forgo from issuing) audio outputs. In some embodiments, the electronic device (e.g., 600, 600B) is currently in a silent mode (e.g., manually set to be in the silent mode, automatically set to be in the silent mode (e.g., a preset or prescheduled do not disturb mode of operation)) which causes the device to forgo generating audio alerts for notifications and system events that would be generated when the device is not configured to suppress audio outputs. Automatically forgoing generating audio alerts for the current time and instead providing a tactile output for the current time when the electronic device is in silent mode enhances user convenience by providing feedback of the current time to the user in a manner that best suits the user's current situation and/or surroundings. Providing improved feedback enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, the first non-visual output device is an audio output device (e.g., a speaker device; an electroacoustic transducer). In some embodiments, the first type of non-visual indication of the current time is an audio representation of one or more words (e.g., a recorded utterance (e.g., human utterance in a predetermined language); a synthetic utterance)) indicating the current time (e.g., 608, 624, 626).

In some embodiments, the electronic device (e.g., 600, 600B) includes a display device (e.g., 699). In some embodiments, the electronic device (e.g., 600, 600B) initiating output of the audio representation of one or more words indicating the current time (e.g., 608, 624, 646) includes, in accordance with a determination that the electronic device is currently configured to display (e.g., configured to display upon occurrence of a condition that corresponds to a trigger for displaying a watch face), via the display device (e.g., 699), a first watch face (e.g., 602), the electronic device initiating output of the audio representation of one or more words using a first voice (e.g., a first selected recorded voice; a first selected synthetic voice (e.g., a synthetic voice having a low pitch range; a synthetic voice having a fast delivery pace)). In some embodiments, the electronic device (e.g., 600, 600B) initiating output of the audio representation of one or more words indicating the current time (e.g., 608, 624, 626) includes, in accordance with a determination that the electronic device is currently configured to display (e.g., configured to display upon occurrence of a condition that corresponds to a trigger for displaying a watch face), via the display device (e.g., 699), a second watch face (e.g., 620) that is different from the first watch face, initiating output of the audio representation of one or more words using a second voice (e.g., a second selected recorded voice; a second selected synthetic voice (e.g., a synthetic voice having a high pitch range; a synthetic voice having a slow delivery pace)) that is different from the first voice. Using different voices for the audio representations based on the type of the displayed watch face enables a user to change the type of voice used for the audio representations if desired. Providing additional control options without cluttering the UI with additional displayed controls enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, the electronic device (e.g., 600, 600B) initiating output of the audio representation of one or more words indicating the current time (e.g., 608, 624, 626) includes, in accordance with a determination that the electronic device has a first hardware configuration (e.g., hardware specification (e.g., a specific audio output device configuration (e.g., an audio output device capable of outputting a first type of utterance); a specific processor configuration), the electronic device (e.g., 600, 600B) initiating output of the audio representation of one or more words using a third voice (e.g., a first selected recorded voice; a first selected synthetic voice (e.g., a synthetic voice having a low pitch range; a synthetic voice having a fast delivery pace)). In some embodiments, the electronic device (e.g., 600B) initiating output of the audio representation of one or more words indicating the current time (e.g., 608, 624, 626) includes, in accordance with a determination that the electronic device has a second hardware configuration (e.g., an audio output device that is not capable of outputting a specific type of utterance) that is different from the first hardware configuration, the electronic device (e.g., 600B) initiating output of the audio representation of one or more words using a fourth voice (e.g., a second selected recorded voice; a second selected synthetic voice (e.g., a synthetic voice having a high pitch range; a synthetic voice having a slow delivery pace)) that is different from the third voice.

In some embodiments, after initiating output of the non-visual indication of the current time (e.g., 608, 614, 624, 626, 628) and prior to completing output of the non-visual indication of the current time (e.g., while output of the non-visual indication of the current time is ongoing), the electronic device (e.g., 600, 600B) detects (714) a second input (e.g., 609; a gesture detected on a touch-screen display of the electronic device (e.g., a specific gesture configured to interrupt outputs; a repeat of the first input; a cessation of the first input, when the first input is a continuous gesture); an input detected via one or more motion sensors of the device indicating motion of the device in a predefined manner (e.g., the device being turned into a downward orientation)), the second input corresponding to a request to interrupt outputting of the non-visual indication of the current time. In some embodiments, in response to detecting the second input (e.g., 609), the electronic device (e.g., 600, 600B) ceases to output (716) (e.g., ceasing to output prior to the completion of output) the non-visual indication of the current time (e.g., 608, 614, 624, 626, 628) before completing output of the non-visual indication of the current time (e.g., sending an instruction to the first and/or the second non-visual output device to cease output). Ceasing to output the non-visual indication of the current time in response to detecting the second input enables a user to quickly and easily stop a non-visual indication (e.g., an audio output) that is being generated. Providing additional control options without cluttering the UI with additional displayed controls enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, the second non-visual output device is a tactile output device (e.g., a tactile output generator). In some embodiments, the second type of non-visual indication of the current time is a tactile output (e.g., a tactile output pattern) indicating the current time (e.g., 614, 628).

In some embodiments, initiating output of the second type of non-visual indication of the current time includes initiating the tactile output of the current time (e.g., 614, 628) at a first speed (718) (e.g., the tactile output includes a series of tactile output elements outputted at a first frequency). In some embodiments, after initiating the tactile output of the current time (e.g., 614, 628) at the first speed, the electronic device (e.g., 600, 600B) detects (720) a set of one or more inputs corresponding to a request to adjust the speed of tactile outputs indicating the current time (e.g., a set of inputs that include interacting with a tactile output speed adjustment user interface). In some embodiments, in response to receiving the set of one or more inputs, the electronic device (e.g., 600, 600B) adjusts (722) a speed of tactile outputs indicating the current time (e.g., 614, 628) from being configured to output at the first speed to being configured to output at a second speed that is different from the first speed (e.g., a slower speed, a reduced frequency of output of a series of tactile output elements that form the tactile output indicating the current time). In some embodiments, after receiving the set of one or more inputs, the electronic device (e.g., 600, 600B) detects (724) a third input corresponding to request to output a tactile output indicating the current time (e.g., 614, 628). In some embodiments, in response to detecting the third input, the electronic device (e.g., 100) initiates (726) a second instance of a tactile output of the current time (e.g., 614, 628) at the second speed. Enabling a user to change the speed at which a tactile output is generated allows the user to manipulate the output speed such that the user can more easily understand and/or recognize the current time based on the provided output. Providing improved feedback enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, the electronic device (e.g., 100) includes a touch-sensitive surface (e.g., 699), the input (e.g., 601, 605, 607, 611, 613, 615, 617) including one or more contacts detected on the touch-sensitive surface (728). In some embodiments, after initiating output of the non-visual indication of the current time (e.g., 608, 614, 624, 626, 628) and prior to completing output of the non-visual indication of the current time (e.g., while output of the non-visual indication of the current time is ongoing), the electronic device (e.g., 600, 600B) detects (730) that the one or more contacts are no longer detected on the touch-sensitive surface. In some embodiments, after detecting that the one or more contacts (e.g., 601, 605, 607, 611, 613, 615, 617) are no longer detected on the touch-sensitive surface (e.g., 699), the electronic device (e.g., 600, 600B) completes output (732) of the non-visual indication of the current time. In some embodiments, in response to detecting that the one or more contacts are no longer detected on the touch-sensitive surface (e.g., 699), the electronic device (e.g., 600, 600B) completes (e.g., forgoes ceasing of the output) output of the non-visual indication of the current time (e.g., 608, 614, 624, 626, 628).

Note that details of the processes described above with respect to method 700 (e.g., FIGS. 7A-7C) are also applicable in an analogous manner to the methods described below. For example, method 900 optionally includes one or more of the characteristics of the various methods described above with reference to method 700. For example, the input causing an electronic device (e.g., 600, 600B) to generate an audio output (e.g., 608, 624, 626) and/or a tactile output sequence (e.g., 614, 628) that are indicative of a current time described in method 700 can be included in method 900 to enable a user to quickly and easily request for the current time at any time using the electronic device. For brevity, these details are not repeated below.

FIGS. 8A-8H illustrate exemplary user interfaces for managing output of a non-visual alert at a predetermined time(s), in accordance with some embodiments. The user interfaces in these figures are used to illustrate the processes described below, including the processes in FIGS. 9A-9B.

Figure 8A:
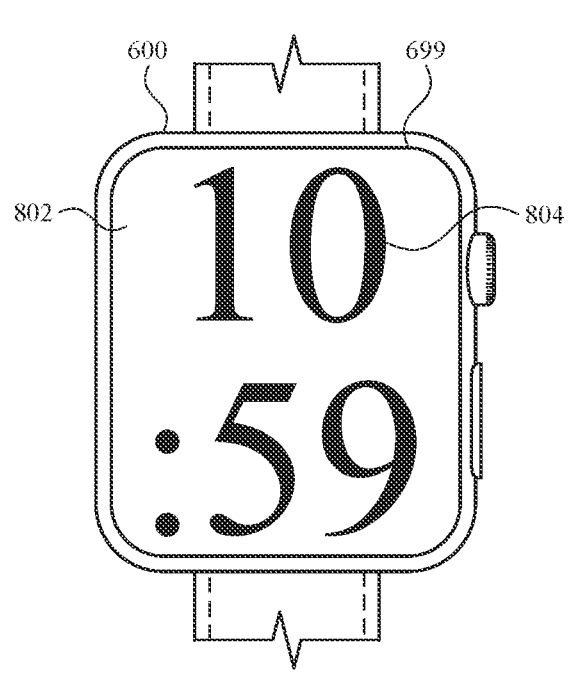
Figure 9A:
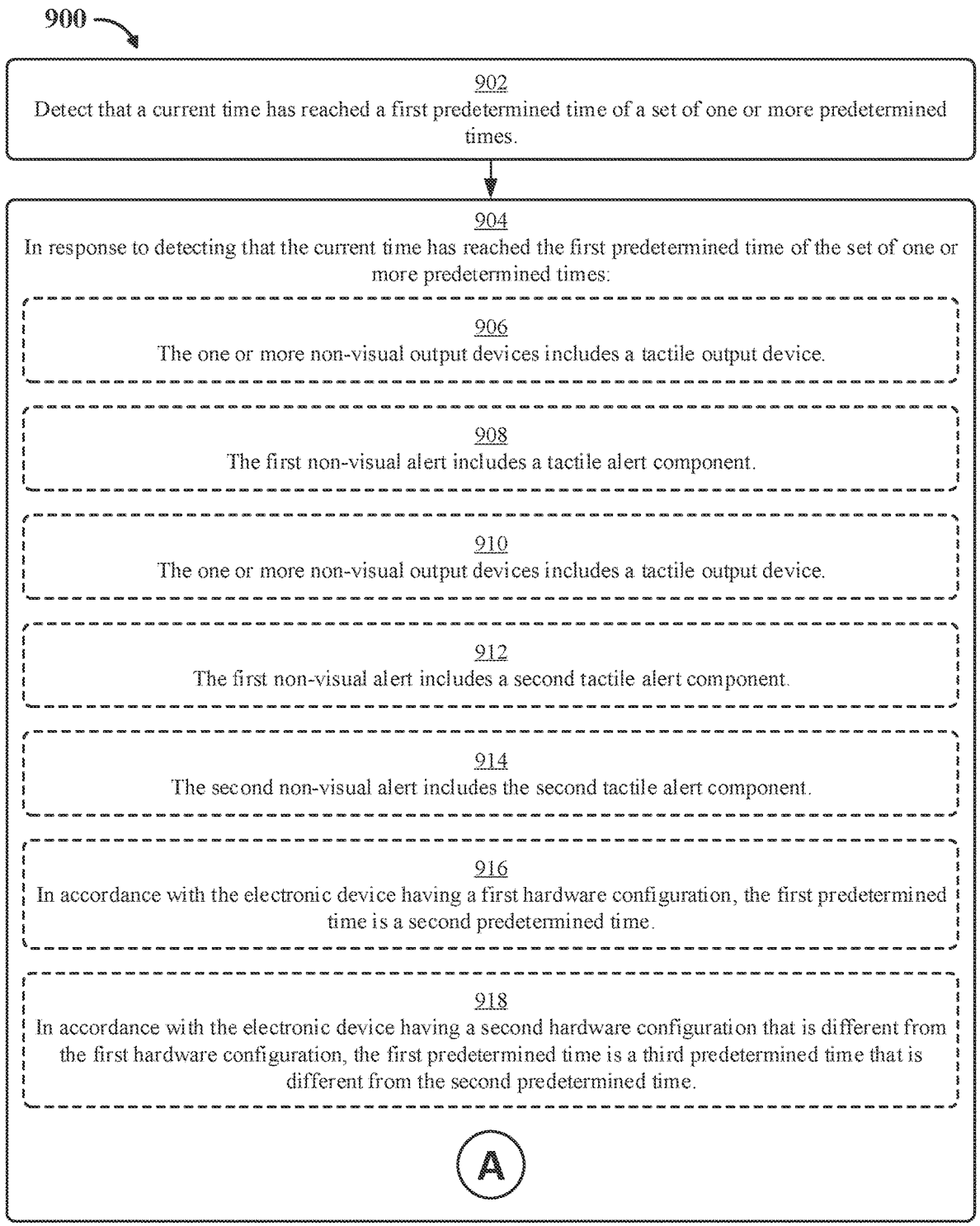

FIG. 8A illustrates electronic device 600 displaying, on display device 699, a third watch face user interface 802 that is a different type of watch face user interface from first watch face user interface 602 (first described above with reference to FIG. 6A) and second watch face user interface 620 (first described above with reference to FIG. 6K). Third watch face user interface 802 includes a time user interface element 804 (e.g., a digital clock) indicating the current time (in this example, 10:59). In some embodiments, silent mode is deactivated on electronic device 600. In FIG. 8A, the current time is a first time (in this example, 10:59), as indicated by time user interface element 804 of third watch face user interface 802.

Figure 8B:
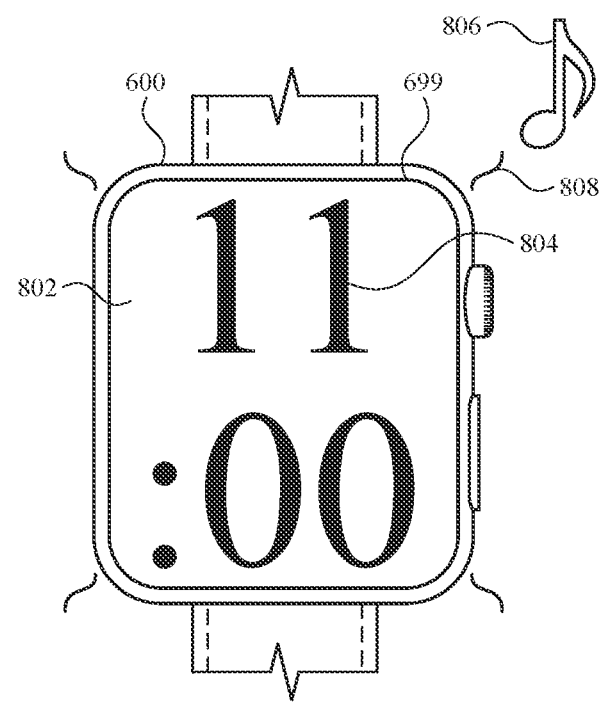

In FIG. 8B, the current time has reached (e.g., has turned to) a second time (in this example, 11:00:00) that corresponds to one of a first set of predetermined times (e.g., the top of every hour), as indicated by time user interface element 804 of third watch face user interface 802.

In some embodiments, while displaying third watch face user interface 802, in response to detecting and/or in accordance with a determination that the current time has reached (e.g., has turned to) the second time (in this example, 11:00:00), where the second time corresponds to one of the first set of predetermined times (e.g., the top of every hour), electronic device 600 generates (e.g., via one or more speakers of electronic device 600, such as speaker 111) a first type of audio notification output 806 (e.g., a first type of notification tone; a first type of bell sound; a first type of ring sound; a tone corresponding to a first musical note).

In some embodiments, while displaying third watch face user interface 802, in response to detecting and/or in accordance with a determination that the current time is now (e.g., has reached, has turned to, has changed to) the second time (in this example, 11:00:00), where the second time corresponds to the first set of predetermined times (e.g., the top of every hour), electronic device 600 generates (e.g., in addition to and/or alternatively to first type of audio notification output 806), via one or more tactile output generators (e.g., tactile output generators 167) of electronic device 600, a tactile output sequence 808 (e.g., a haptic notification).

Figure 8C:
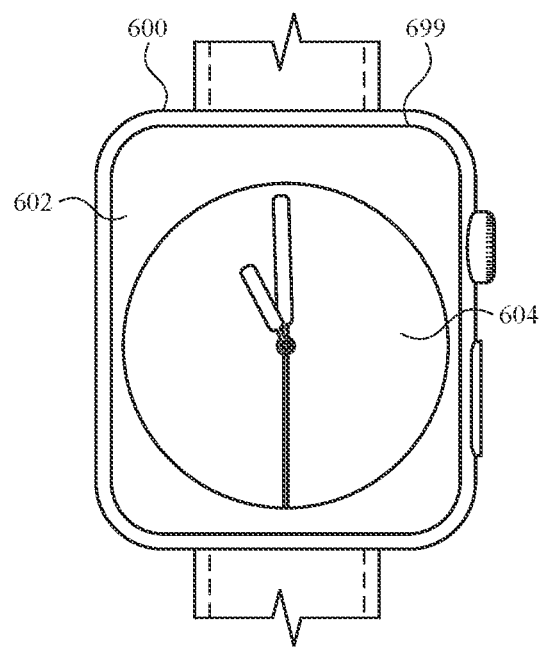

FIG. 8C illustrates electronic device 600 displaying, on display device 699, first watch face user interface 602, where first watch face user interface 602 is a different type of (e.g., a different category of) watch face user interface from third watch face user interface 802. In some embodiments, first watch face user interface 602 and third watch face user interface 802 are different types of (e.g., are not similar) watch face user interfaces when they respectively belong to different categories of watch face user interface designs, styles, and/or layouts (e.g., a clock face or dial-style watch face user interface, a digital clock-style watch face user interface, a graphical character-based watch face user interface, an animation-based watch face user interface, an infographic watch face user interface, a photos-based watch face user interface). In some embodiments, silent mode is deactivated on electronic device 600. In FIG. 8C, the current time is the first time, as indicated by time user interface element 604 of first watch face user interface 602.

Figure 8D:
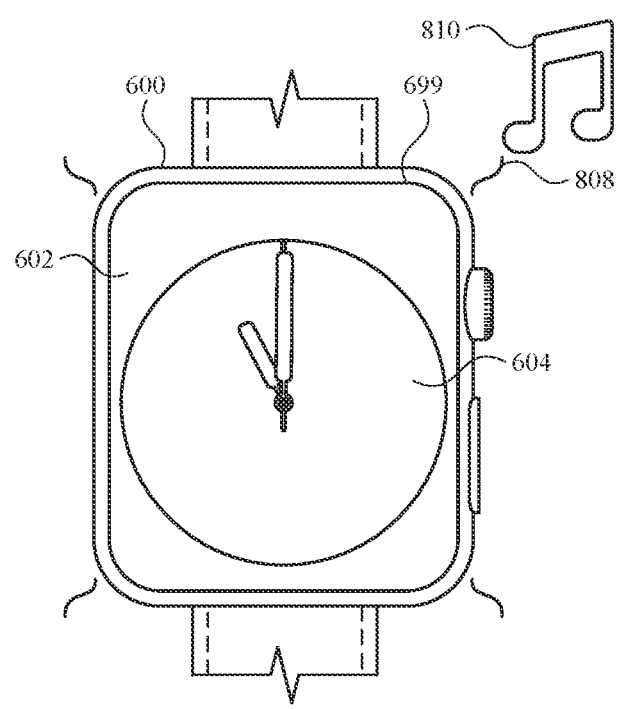

In FIG. 8D, the current time has reached (e.g., has turned to) the second time (in this example, 11:00:00), where the second time corresponds to one of the first set of predetermined times (e.g., the top of every hour), as indicated by time user interface element 604 of first watch face user interface 602. As discussed, in some embodiments, first watch face user interface 602 is a different type of (e.g., is a different category of) watch face user interface from third watch face user interface 802.

In some embodiments, while displaying first watch face user interface 602, in response to detecting and/or in accordance with a determination that the current time has reached (e.g., has turned to) the second time (in this example, 11:00:00), where the second time is one of the first set of predetermined times (e.g., the top of every hour), electronic device 600 generates (e.g., via one or more speakers of electronic device 600, such as speaker 111) a second type of audio notification output 810 (e.g., a second type of notification tone; a second type of bell sound; a second type of ring sound), where second type of audio notification output 810 is different from first type of audio notification output 806 (e.g., a different notification tone as compared to 806; a different bell sound; a different ring sound; a different musical note).

Thus, in some embodiments, electronic device 600 generates a different type of audio notification output (e.g., first type of audio notification output 806 or second type of audio notification output 810) in response to detecting and/or in accordance with a determination that the current time has reached (e.g., has turned to) a time that corresponds to one of the first set of predetermined times (e.g., the top of every hour) based on whether electronic device 600 is displaying first watch face user interface 602 or third watch face user interface 802. That is, in some embodiments, the type of audio notification output (e.g., first type of audio notification output 806 or second type of audio notification output 810) that is generated by electronic device 600 is based on the type of watch face user interface that is being displayed by electronic device 600.

In some embodiments, while displaying first watch face user interface 602, in response to detecting and/or in accordance with a determination that the current time has reached (e.g., has turned to) the second time (in this example, 11:00:00), where the second time is one of the first set of predetermined times (e.g., the top of every hour), electronic device 600 generates (e.g., in addition to and/or alternatively to second type of audio notification output 810), via one or more tactile output generators (e.g., tactile output generators 167) of electronic device 600, tactile output sequence 808 (e.g., a haptic notification).

Thus, in some embodiments, electronic device 600 generates the same tactile output sequence (e.g., tactile output sequence 808) in response to detecting and/or in accordance with a determination that the current time has reached (e.g., has turned to) a time that corresponds to one of the first set of predetermined times (e.g., the top of every hour) irrespective of whether electronic device 600 is displaying first watch face user interface 602, as in FIG. 8D, or third watch face user interface 802, as in FIG. 8B. That is, in some embodiments, electronic device 600 generates the same type of tactile output sequence (e.g., tactile output sequence 808)

in response to detecting and/or in accordance with a determination that the current time has reached (e.g., has turned to) a time that corresponds to one of the first set of predetermined times (e.g., the top of every hour) irrespective of the type of (e.g., category of) watch face user interface that is being displayed by electronic device 600.

FIG. 8E illustrates electronic device 600 displaying, on display device 699, first watch face user interface 602 while the current time has reached (e.g., has turned to) a third time (in this example, 12:00:00), where the third time corresponds to one of the first set of predetermined times (e.g., the top of every hour).

In some embodiments, while displaying first watch face user interface 602, in response to detecting and/or in accordance with a determination that the current time has reached (e.g., has turned to) the third time (in this example, 12:00:00), where the third time is one of the first set of predetermined times (e.g., the top of every hour), electronic device 600 generates (e.g., via one or more speakers of electronic device 600, such as speaker 111) second type of audio notification output 810 (e.g., the second type of notification tone; the second type of bell sound; the second type of ring sound). In FIGS. 8D and 8E, because the second time (in the example of FIG. 8D, 11:00:00) and the third time (in the example of FIG. 8E, 12:00:00) both correspond to a time that is one of the first set of predetermined times (e.g., the top of every hour), and because electronic device 600 is displaying the same watch face user interface (e.g., first watch face user interface 602), electronic device 600 generates the same type of audio notification output (e.g., second type of audio notification output 810).

In some embodiments, while displaying first watch face user interface 602, in response to detecting and/or in accordance with a determination that the current time has reached (e.g., has turned to) the third time, where the third time corresponds to one of the first set of predetermined times (e.g., the top of every hour), electronic device 600 generates (e.g., in addition to and/or alternatively to second type of audio notification output 810), via one or more tactile output generators (e.g., tactile output generators 167) of electronic device 600, tactile output sequence 808 (e.g., a haptic notification).

In FIG. 8F, the current time has reached (e.g., has turned to) a fourth time (in this example, 12:30:00), where the fourth time corresponds to one of a second set of predetermined times (e.g., the bottom of every hour).

In some embodiments, while displaying first watch face user interface 602, in response to detecting and/or in accordance with a determination that the current time is now (e.g., has reached, has turned to, has changed to) the fourth time (in this example, 12:30:00), where the fourth time is one of the second set of predetermined times (e.g., the bottom of every hour), electronic device 600 generates (e.g., via one or more speakers of electronic device 600, such as speaker 111) a third type of audio notification output 812 (e.g., a third type of notification tone; a third type of bell sound; a third type of ring sound) that is different from second type of audio notification output 810. In FIGS. 8E and 8F, while electronic device 600 is displaying the same watch face user interface (e.g., first watch face user interface 602), because the third time (in the example of FIG. 8E, 12:00:00) and the fourth time (in the example of FIG. 8F, 12:30:00) correspond to one of the first set of predetermined times and one of the second set of predetermined times, respectively, and thus do not correspond to the same set of predetermined times, electronic device 600 generates different types of audio notification outputs (e.g., second type of audio notification output 810 in FIG. 8E and third type of audio notification output 812 in FIG. 8F).

In some embodiments, while displaying first watch face user interface 602, in response to detecting and/or in accordance with a determination that the current time has reached (e.g., has turned to) the fourth time (in this example, 12:30:00), where the fourth time corresponds to one of the second set of predetermined times (e.g., the bottom of every hour), electronic device 600 generates (e.g., in addition to and/or alternatively to second type of audio notification output 812), via one or more tactile output generators (e.g., tactile output generators 167) of electronic device 600, tactile output sequence 808 (e.g., a haptic notification).

FIG. 8G illustrates electronic device 600 displaying, on display device 699, a fourth watch face user interface 814 having a time user interface element 816 when the current time has reached (e.g., has turned to) the fourth time (in this example, 12:00:00), where the fourth time corresponds to one of the first set of predetermined times (e.g., the top of every hour), as in FIG. 8E.

In some embodiments, fourth watch face user interface 814 is a similar type of (e.g., the same category of) watch face user interface to first watch face user interface 602. In some embodiments, fourth watch face user interface 814 and first watch face user interface 602 are similar types of watch face user interfaces when they both belong to the same category of watch face user interface designs, styles, and/or layouts (e.g., a clock face or dial-style watch face user interface, a digital clock-style watch face user interface, a graphical character-based watch face user interface, an animation-based watch face user interface, an infographic watch face user interface, a photos-based watch face user interface). For example, fourth watch face user interface 814 and first watch face user interface 602 are similar watch face user interfaces because time user interface element 816 of fourth watch face user interface 814 and time user interface element 604 of first watch face user interface 602 are both of a category corresponding to clock face or dial-style watch face user interfaces.

In some embodiments, while displaying fourth watch face user interface 814, in response to detecting and/or in accordance with a determination that the current time is (e.g., has reached, has turned to, has changed to) the third time (in this example, 12:00:00), where the third time is one of the first set of predetermined times (e.g., the top of every hour), electronic device 600 generates (e.g., via one or more speakers of electronic device 600, such as speaker 111) second type of audio notification output 810 (e.g., the second type of notification tone; the second type of bell sound; the second type of ring sound). In FIGS. 8E and 8G, because the current time has turned to the third time (in the example of FIGS. 8E and 8G, 12:00:00), where the third time is one of the first set of predetermined times (e.g., the top of every hour), and because electronic device 600 is displaying similar watch face user interfaces (e.g., first watch face user interface 602 in FIG. 8E and fourth watch face user interface in FIG. 8G), electronic device 600 generates the same type of audio notification output (e.g., second type of audio notification output 810) in both FIGS. 8E and 8G.

In some embodiments, while displaying first watch face user interface 602, in response to detecting and/or in accordance with a determination that the current time has reached (e.g., has turned to) the third time (in this example, 12:00:00), where the third time corresponds to one of the first set of predetermined times (e.g., the top of every hour), electronic device 600 generates (e.g., in addition to and/or alternatively to second type of audio notification output 810), via one or more tactile output generators (e.g., tactile output generators 167) of electronic device 600, tactile output sequence 808 (e.g., a haptic notification).

In FIG. 8H, the current time has reached (e.g., has turned to) the fourth time (in this example, 12:30:00), where the fourth time corresponds to one of the second set of predetermined times (e.g., the bottom of every hour), as in FIG. 8F.

In some embodiments, while displaying fourth watch face user interface 814, in response to detecting and/or in accordance with a determination that the current time has reached (e.g., has turned to) the fourth time (in this example, 12:30:00), where the fourth time is one of the second set of predetermined times (e.g., the bottom of every hour), electronic device 600 generates (e.g., via one or more speakers of electronic device 600, such as speaker 111) third type of audio notification output 812 (e.g., the third type of notification tone; the third type of bell sound; the third type of ring sound). In FIGS. 8F and 8H, because the current time has reached (e.g., has turned to) the fourth time (in the examples of FIGS. 8F and 8H, 12:30:00), where the fourth time is one of the second set of predetermined times (e.g., the bottom of every hour), and because electronic device 600 is displaying similar watch face user interfaces (e.g., first watch face user interface 602 in FIG. 8F and fourth watch face user interface in FIG. 8H), electronic device 600 generates the same type of audio notification output (e.g., third type of audio notification output 812) in both FIGS. 8F and 8G.

In some embodiments, while displaying first watch face user interface 602, in response to detecting and/or in accordance with a determination that the current time has reached (e.g., has turned to) the fourth time (in this example, 12:30:00), where the fourth time corresponds to one of the second set of predetermined times (e.g., the bottom of every hour), electronic device 600 generates (e.g., in addition to and/or alternatively to third type of audio notification output 812), via one or more tactile output generators (e.g., tactile output generators 167) of electronic device 600, tactile output sequence 808 (e.g., a haptic notification).

FIGS. 9A-9B are a flow diagram illustrating a method for managing output of a non-visual alert at a predetermined time(s), in accordance with some embodiments. Method 900 is performed at an electronic device (e.g., 100, 600, 600B, 300, 500) with one or more non-visual output devices (e.g., an audio speaker; a tactile output generator; a haptic output generator) and a display device. In some embodiments, the electronic device is a wearable electronic device (e.g., a smartwatch). Some operations in method 900 are, optionally, combined, the orders of some operations are, optionally, changed, and some operations are, optionally, omitted.

As described below, method 900 provides an intuitive way for managing output of the current time. The method reduces the cognitive burden on a user for managing output of the current time, thereby creating a more efficient human-machine interface. For battery-operated computing devices, enabling a user to manage output of the current time faster and more efficiently conserves power and increases the time between battery charges.

The electronic device (e.g., 600) detects (902) that a current time has reached (e.g., is equal to) a first predetermined time of a set of one or more predetermined times (e.g., the top of every hour (e.g., 12 PM, 1 PM), the bottom of every hour (e.g., 12:30 PM, 1:30 PM)).

In response to detecting that the current time has reached the first predetermined time of the set of one or more predetermined times (904), in accordance with a determination that the electronic device (e.g., 600) is currently configured to display (e.g., configured to display upon occurrence of a condition that corresponds to a trigger for displaying a watch face), via the display device (e.g., 699), a first watch face (e.g., 602, 802, 814), the electronic device outputs (924), via the one or more non-visual output devices, a first non-visual alert (e.g., 806, 808, 810, 812; a set or series of one or more audio tones and/or a set or series of one or more tactile outputs). By (e.g., automatically) outputting the first non-visual alert in response to detecting that the current time has reached the first predetermined time of the set of one or more predetermined times if the electronic device is displaying the first watch face, the electronic device performs an operation when a set of conditions has been met without requiring further user input, which in turn enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently. In some embodiments, if the display device (e.g., 699) of the electronic device (e.g., 600) was in an off state, outputting the first non-visual alert does not cause the electronic device to activate, enable, or other cause the display device to change to an on state.

In some embodiments, the one or more non-visual output devices includes an audio output device (e.g., a speaker device; an electroacoustic transducer). In some embodiments, the first non-visual alert (e.g., 806, 810, 812) includes an audio alert component (e.g., a musical tone). In some embodiments, an audio alert is only issued when the electronic device (e.g., 600) is not muted/in a silent mode. Issuing the audio alert only when the electronic device is not in a muted or silent mode enables the electronic device to reduce power usage and thus improve battery life of the device, thereby enhancing the operability of the device and making the user-device interface more efficient. Further, issuing the audio alert only when the electronic device is not in a muted or silent mode does not inconvenience a user when the user's current situation and/or surrounds are not suited for audio alerts. Providing improved feedback enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, the one or more non-visual output devices includes a tactile output device (e.g., a tactile output generator) (906). In some embodiments, the first non-visual alert (e.g., 808) includes a tactile alert component (908). In some embodiments, the alert includes a tactile alert component irrespective of whether the electronic device (e.g., 600) is muted/in a silent mode. In some embodiments, the non-visual alert (e.g., 806, 808, 810, 812) includes both an audio and tactile alert component (e.g., when the electronic device is not muted/in a silent mode). Including a tactile alert component in the first non-visual alert enables a user to recognize or be hinted at of the current time even when audio alerts are disabled on the electronic device. Providing improved feedback enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In response to detecting that the current time has reached the first predetermined time of the set of one or more predetermined times (904), in accordance with a determination that the electronic device (e.g., 600) is currently configured to display (e.g., configured to display upon occurrence of a condition that corresponds to trigger for displaying a watch face and/or currently displaying a watch face), via the display device (e.g., 699), a second watch face (e.g., 802) that is different from the first watch face (e.g., 602; the second watch face includes at least a first watch face element (e.g., user interface element) that is not included in the first watch face), the electronic device outputs (926), via the one or more non-visual output devices, a second non-visual alert (e.g., 806; a set or series of one or more audio tones and/or a set or series of one or more tactile outputs) that is different from the first non-visual alert (e.g., 810; the second non-visual alert is a different set or series of one or more audio tones). In some embodiments, the first and second non-visual alerts (e.g., 806, 810) are a series of audio tones (e.g., a tune or a set of notes) that are selected to be harmonious/harmonically compatible (e.g., not dissonant), when outputted simultaneously (e.g., outputted simultaneously by different electronic devices at the same location)). Providing different types of non-visual alerts (e.g., different types of audio tones) based on the type of displayed watch face enables a user to change and control the type of non-visual alert. Providing additional control options without cluttering the UI with additional displayed controls enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, the one or more non-visual output devices includes a tactile output device (e.g., a tactile output generator) (910). In some embodiments, the first non-visual alert includes a second tactile alert component (912). In some embodiments, the second non-visual alert includes the second tactile alert component (e.g., the same tactile alert component is included in non-visual alerts, irrespective of (e.g., independent of) watch face that the electronic device (e.g., 600) is currently configured to display) (914).

In some embodiments, the set of one or more predetermined times includes a plurality of predetermined times separated by a predetermined time interval (e.g., every hour (e.g., at the top of every hour); every half hour (e.g., at the top and the bottom of every hour)).

In some embodiments, the plurality of predetermined times includes a first subset of predetermined times that correspond to the top of each hour of the day and a second subset of predetermined times that correspond to the bottom of each hour of the day. In some embodiments, the first subset of predetermined times correspond to non-visual alerts of a first type (e.g., alerts that include a top-of-the-hour audio component). In some embodiments, the second subset of predetermined times correspond to non-visual alerts of a second type that are different than the first type (e.g., alerts that include a bottom-of-the-hour audio component that has a different audio characteristic (e.g., frequency, tone, melody) from the top-of-the-hour component). Providing different types of non-visual alerts for the first subset of predetermined times and the second subset of predetermined times enables a user to more easily recognize or be hinted at of the current time based on the non-visual alert. Providing improved feedback enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, in accordance with the electronic device (e.g., 600) having a first hardware configuration (e.g., a hardware configuration wherein the one or more non-visual output devices are capable of outputting non-visual alerts with a first timing (e.g., a first output warm up time requirement that affects the timing of outputs upon receipt of an initiation signal; 10 milliseconds), the first predetermined time is a second predetermined time (916). In some embodiments, in accordance with the electronic device (e.g., 600) having a second hardware configuration (e.g., a hardware configuration wherein the one or more non-visual output devices are capable of outputting non-visual alerts with a second timing (e.g., a second output warm up time requirement that affects the timing of outputs upon receipt of an initiation signal that is longer than the first output warm up time requirement; 20 milliseconds) that is different from the first hardware configuration, the first predetermined time is a third predetermined time that is different from the second predetermined time (918).

In some embodiments, in accordance with the electronic device (e.g., 600) having a third hardware configuration (e.g., a hardware configuration wherein the one or more non-visual output devices are capable of outputting non-visual alerts with a first output warm up time requirement that affects the timing of outputs upon receipt of an initiation signal), the electronic device (e.g., 100) outputting the first non-visual alert includes waiting for a first delay period (e.g., 0 milliseconds, a non-zero period (e.g., 5 milliseconds, 10 millisecond)) to elapse before outputting the first non-visual alert (920). In some embodiments, in accordance with the electronic device (e.g., 600) having a fourth hardware configuration that is different from the third hardware configuration, the electronic device outputting the first non-visual alert includes waiting for a second delay period (e.g., 0 milliseconds, a non-zero period (e.g., 5 milliseconds, 10 millisecond)) that is different from the first delay period to elapse before outputting the first non-visual alert (922). In some embodiments, the electronic device (e.g., 600) includes instructions for adjusting to different hardware capabilities by imposing a delay that is selected based on the hardware of the device.

In some embodiments, in response to detecting that the current time has reached the first predetermined time of the set of one or more predetermined times (904), in accordance with a determination that the electronic device (e.g., 600) is currently configured to display (e.g., configured to display upon occurrence of a condition that corresponds to a trigger for displaying a watch face), via the display device (e.g., 699), a third watch face that is different from the first watch face (e.g., 602) and different from the second watch face (e.g., 802) (e.g., the third watch face includes at least a second watch face element (e.g., user interface element) that is not included in the first watch face or in the second watch face), the electronic device (e.g., 600) outputs (928), via the one or more non-visual output devices, the first non-visual alert (e.g., a set or series of one or more audio tones and/or a set or series of one or more tactile outputs). In some embodiments, a group of different watch faces share the same non-visual alert. Generating the same non-visual alert for a group of different watch faces provides consistency, which in turn enables a user to more easily recognize and/or be hinted at of the current time based on the non-visual alert. Providing improved feedback enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

Note that details of the processes described above with respect to method 900 (e.g., FIGS. 9A-9B) are also applicable in an analogous manner to the methods described above. For example, method 700 optionally includes one or more of the characteristics of the various methods described above with reference to method 900. For example, the one or more audio tones (e.g., 806, 810, 812) and/or tactile outputs (e.g., 808) described in method 900 can be included in method 700 to provide a user with periodic notifications of a current time without the user needing to always manually request for the current time. For brevity, these details are not repeated below.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the techniques and their practical applications. Others skilled in the art are thereby enabled to best utilize the techniques and various embodiments with various modifications as are suited to the particular use contemplated.

Although the disclosure and examples have been fully described with reference to the accompanying drawings, it is to be noted that various changes and modifications will become apparent to those skilled in the art. Such changes and modifications are to be understood as being included within the scope of the disclosure and examples as defined by the claims.

What is claimed is:

1. An electronic device, comprising:
one or more non-visual output devices;
a display device;
one or more processors; and
memory storing one or more programs configured to be executed by the one or more processors, the one or more programs including instructions for:
detecting that a current time has reached a predetermined time of a set of one or more predetermined times; and
in response to detecting that the current time has reached the predetermined time of the set of one or more predetermined times:
in accordance with a determination that the electronic device is currently configured to display, via the display device, a first watch face that is selected to display a current time, outputting, via the one or more non-visual output devices, a first non-visual alert; and
in accordance with a determination that the electronic device is currently configured to display, via the display device, a second watch face that is selected to display a current time, and that is different from the first watch face, outputting, via the one or more non-visual output devices, a second non-visual alert that is different from the first non-visual alert.

2. The electronic device of claim 1, wherein:
the one or more non-visual output devices includes an audio output device; and
the first non-visual alert includes an audio alert component.

3. The electronic device of claim 1, wherein:
the one or more non-visual output devices includes an tactile output device; and
the first non-visual alert includes a tactile alert component.

4. The electronic device of claim 1, wherein:
the one or more non-visual output devices includes a tactile output device;
the first non-visual alert includes a second tactile alert component; and
the second non-visual alert includes the second tactile alert component.

5. The electronic device of claim 1, wherein the set of one or more predetermined times includes a plurality of predetermined times separated by a predetermined time interval.

6. The electronic device of claim 5, wherein:
the plurality of predetermined times includes a first subset of predetermined times that correspond to the top of each hour of the day and a second subset of predetermined times that correspond to the bottom of each hour of the day;
the first subset of predetermined times correspond to non-visual alerts of a first type; and
the second subset of predetermined times correspond to non-visual alerts of a second type that are different than the first type.

7. The electronic device of claim 1, wherein:
in accordance with the electronic device having a first hardware configuration, the predetermined time is a second predetermined time; and
in accordance with the electronic device having a second hardware configuration that is different from the first hardware configuration, the predetermined time is a third predetermined time that is different from the second predetermined time.

8. The electronic device of claim 1, the one or more programs further including instructions for:
in accordance with the electronic device having a third hardware configuration, outputting the first non-visual alert includes waiting for a first delay period to elapse before outputting the first non-visual alert; and
in accordance with the electronic device having a fourth hardware configuration that is different from the third hardware configuration, outputting the first non-visual alert includes waiting for a second delay period that is different from the first delay period to elapse before outputting the first non-visual alert.

9. The electronic device of claim 1, further comprising the one or more programs further including instructions for:
in response to detecting that the current time has reached the predetermined time of the set of one or more predetermined times:
in accordance with a determination that the electronic device is currently configured to display, via the display device, a third watch face that is different from the first watch face and different from the second watch face, outputting, via the one or more non-visual output devices, the first non-visual alert.

10. A non-transitory computer-readable storage medium storing one or more programs configured to be executed by one or more processors of an electronic device with one or more non-visual output devices and a display device, the one or more programs including instructions for:

detecting that a current time has reached a predetermined time of a set of one or more predetermined times; and in response to detecting that the current time has reached the predetermined time of the set of one or more predetermined times:

in accordance with a determination that the electronic device is currently configured to display, via the display device, a first watch face that is selected to display a current time, outputting, via the one or more non-visual output devices, a first non-visual alert; and in accordance with a determination that the electronic device is currently configured to display, via the display device, a second watch face that is selected to display a current time, and that is different from the first watch face, outputting, via the one or more non-visual output devices, a second non-visual alert that is different from the first non-visual alert.

11. The non-transitory computer-readable storage medium of claim 10, wherein:

the one or more non-visual output devices includes an audio output device; and the first non-visual alert includes an audio alert component.

12. The non-transitory computer-readable storage medium of claim 10, wherein:

the one or more non-visual output devices includes an tactile output device; and the first non-visual alert includes a tactile alert component.

13. The non-transitory computer-readable storage medium of claim 10, wherein:

the one or more non-visual output devices includes a tactile output device;

the first non-visual alert includes a second tactile alert component; and the second non-visual alert includes the second tactile alert component.

14. The non-transitory computer-readable storage medium of claim 10, wherein the set of one or more predetermined times includes a plurality of predetermined times separated by a predetermined time interval.

15. The non-transitory computer-readable storage medium of claim 14, wherein:

the plurality of predetermined times includes a first subset of predetermined times that correspond to the top of each hour of the day and a second subset of predetermined times that correspond to the bottom of each hour of the day;

the first subset of predetermined times correspond to non-visual alerts of a first type; and the second subset of predetermined times correspond to non-visual alerts of a second type that are different than the first type.

16. The non-transitory computer-readable storage medium of claim 10, wherein:

in accordance with the electronic device having a first hardware configuration, the predetermined time is a second predetermined time; and in accordance with the electronic device having a second hardware configuration that is different from the first hardware configuration, the predetermined time is a third predetermined time that is different from the second predetermined time.

17. The non-transitory computer-readable storage medium of claim 10, the one or more programs further including instructions for:

in accordance with the electronic device having a third hardware configuration, outputting the first non-visual alert includes waiting for a first delay period to elapse before outputting the first non-visual alert; and in accordance with the electronic device having a fourth hardware configuration that is different from the third hardware configuration, outputting the first non-visual alert includes waiting for a second delay period that is different from the first delay period to elapse before outputting the first non-visual alert.

18. The non-transitory computer-readable storage medium of claim 10, the one or more programs further including instructions for:

in response to detecting that the current time has reached the predetermined time of the set of one or more predetermined times:

in accordance with a determination that the electronic device is currently configured to display, via the display device, a third watch face that is different from the first watch face and different from the second watch face, outputting, via the one or more non-visual output devices, the first non-visual alert.

19. A method comprising:

at an electronic device with one or more non-visual output devices and a display device:

detecting that a current time has reached a predetermined time of a set of one or more predetermined times; and in response to detecting that the current time has reached the predetermined time of the set of one or more predetermined times, performing one or more operations responsive to the detected current time, including:

in accordance with a determination that the electronic device is currently configured to display, via the display device, a first watch face that is selected to display a current time, outputting, via the one or more non-visual output devices, a first non-visual alert; and in accordance with a determination that the electronic device is currently configured to display, via the display device, a second watch face that is selected to display a current time, and that is different from the first watch face, outputting, via the one or more non-visual output devices, a second non-visual alert that is different from the first non-visual alert; and repeating the detecting that a current time has reached the predetermined time, and the performing one or more operations responsive to the detected current time multiple times, including:

at least one time where the electronic device is currently configured to display the first watch face that is selected to display a current time; and at least one time where the electronic device is currently configured to display the second watch face that is selected to display a current time.

20. The method of claim 19, wherein:

the one or more non-visual output devices includes an audio output device; and the first non-visual alert includes an audio alert component.

21. The method of claim 19, wherein:

the one or more non-visual output devices includes a tactile output device; and the first non-visual alert includes a tactile alert component.

22. The method of claim 19, wherein:

the one or more non-visual output devices includes a tactile output device;

the first non-visual alert includes a second tactile alert component; and the second non-visual alert includes the second tactile alert component.

23. The method of claim 19, wherein the set of one or more predetermined times includes a plurality of predetermined times separated by a predetermined time interval.

24. The method of claim 23, wherein:

the plurality of predetermined times includes a first subset of predetermined times that correspond to the top of each hour of the day and a second subset of predetermined times that correspond to the bottom of each hour of the day;

the first subset of predetermined times correspond to non-visual alerts of a first type; and the second subset of predetermined times correspond to non-visual alerts of a second type that are different than the first type.

25. The method of claim 19, wherein:

in accordance with the electronic device having a first hardware configuration, the predetermined time is a second predetermined time; and in accordance with the electronic device having a second hardware configuration that is different from the first hardware configuration, the predetermined time is a third predetermined time that is different from the second predetermined time.

26. The method of claim 19, further comprising:

in accordance with the electronic device having a third hardware configuration, outputting the first non-visual alert includes waiting for a first delay period to elapse before outputting the first non-visual alert; and in accordance with the electronic device having a fourth hardware configuration that is different from the third hardware configuration, outputting the first non-visual alert includes waiting for a second delay period that is different from the first delay period to elapse before outputting the first non-visual alert.

27. The method of claim 19, further comprising:

in response to detecting that the current time has reached the predetermined time of the set of one or more predetermined times:

in accordance with a determination that the electronic device is currently configured to display, via the display device, a third watch face that is different from the first watch face and different from the second watch face, outputting, via the one or more non-visual output devices, the first non-visual alert.

* * * * *

UNITED STATES PATENT AND TRADEMARK OFFICE
CERTIFICATE OF CORRECTION

PATENT NO. : 11,460,925 B2  Page 1 of 1
APPLICATION NO. : 17/306342
DATED : October 4, 2022
INVENTOR(S) : Christopher B. Fleizach et al.

It is certified that error appears in the above-identified patent and that said Letters Patent is hereby corrected as shown below:

In the Claims

Column 54, Lines 7 & 8, Claim 3, delete "an tactile output device;" and insert --a tactile output device;--.

Signed and Sealed this
Twenty-fourth Day of September, 2024

Katherine Kelly Vidal
*Director of the United States Patent and Trademark Office*